United States Patent
Larson et al.

(10) Patent No.: US 12,005,631 B2
(45) Date of Patent: Jun. 11, 2024

(54) PRINTHEAD AND METHOD OF PRINTING MULTIMATERIAL FILAMENTS INCLUDING ORIENTED, TWISTED AND/OR HELICAL FEATURES

(71) Applicant: President and Fellows of Harvard College, Cambridge, MA (US)

(72) Inventors: Natalie M. Larson, Cambridge, MA (US); Jochen Mueller, Baltimore, MD (US); Jennifer A. Lewis, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 0 days.

(21) Appl. No.: 17/982,877

(22) Filed: Nov. 8, 2022

(65) Prior Publication Data
US 2023/0143048 A1    May 11, 2023

Related U.S. Application Data

(60) Provisional application No. 63/280,741, filed on Nov. 18, 2021, provisional application No. 63/277,446, filed on Nov. 9, 2021.

(51) Int. Cl.
*B29C 64/118*    (2017.01)
*B29C 64/209*    (2017.01)
(Continued)

(52) U.S. Cl.
CPC .......... *B29C 64/118* (2017.08); *B29C 64/209* (2017.08); *B29C 64/255* (2017.08);
(Continued)

(58) Field of Classification Search
CPC ... B29C 48/266; B29C 48/301; B29C 64/255; B28B 3/2609; B28B 3/2636; B28B 3/269
See application file for complete search history.

(56) References Cited

U.S. PATENT DOCUMENTS

| | | | | |
|---|---|---|---|---|
| 1,824,482 A | * | 9/1931 | Hartmann | B28B 3/26 425/319 |
| 5,529,471 A | * | 6/1996 | Khoshevis | B29C 41/36 425/150 |

(Continued)

FOREIGN PATENT DOCUMENTS

DE    102016206981 A1  * 10/2017

OTHER PUBLICATIONS

Siebold et al, "Coextrusion based Multi-Material Additive Manufacturing for Ceramics," in Acadia 2019: Ubiquity and Autonomy: Paper Proceedings of the 39th Annual Conference of the Association for Computer Aided Design in Architecture, (2019) pp. 576-585.
(Continued)

*Primary Examiner* — Timothy Kennedy
(74) *Attorney, Agent, or Firm* — Crowell & Moring LLP

(57) ABSTRACT

A printhead comprises a plurality of ink cartridges and a nozzle, where the nozzle and the ink cartridges are configured to rotate together about an axis during printing. The nozzle includes a nozzle body comprising an inlet end, an outlet end, and one or more internal passageways extending through the nozzle body from the inlet end to the outlet end. The one or more internal passageways terminate at one or more outlets at or near the outlet end. The nozzle also includes plurality of nozzle inlets at the inlet end for delivery of flowable inks into the internal passageways, where each nozzle inlet is in fluid communication with a dispensing end of one of the ink cartridges.

20 Claims, 44 Drawing Sheets

(51) Int. Cl.
B29C 64/255 (2017.01)
B29C 64/264 (2017.01)
B29C 64/336 (2017.01)
B33Y 10/00 (2015.01)
B33Y 30/00 (2015.01)

(52) U.S. Cl.
CPC .......... B29C 64/264 (2017.08); B29C 64/336 (2017.08); B33Y 10/00 (2014.12); B33Y 30/00 (2014.12)

(56) References Cited

U.S. PATENT DOCUMENTS

| | | | | |
|---|---|---|---|---|
| 6,153,034 | A * | 11/2000 | Lipsker | B33Y 30/00 |
| | | | | 156/167 |
| 9,550,319 | B2 * | 1/2017 | Larsen | B33Y 30/00 |
| 10,946,588 | B2 | 3/2021 | Lewis et al. | |
| 11,207,831 | B2 | 12/2021 | Lewis et al. | |
| 2016/0346997 | A1 | 12/2016 | Lewis et al. | |
| 2019/0358983 | A1 * | 11/2019 | Busbee | B29C 64/106 |
| 2020/0061910 | A1 | 2/2020 | Lewis et al. | |

OTHER PUBLICATIONS

Carpi, F., Migliore, A., Serra, G. & Rossi, D. D. Helical dielectric elastomer actuators. *Smart Mater. Struct.* 14, 1210-1216 (2005).

Chatterjee, K. & Ghosh, T. K. 3D Printing of Textiles: Potential Roadmap to Printing with Fibers. *Adv. Mater.* 1902086 (2019) doi:10.1002/adma.201902086.

Cheng, Y. et al. Bioinspired Multicompartmental Microfibers from Microfluidics. *Adv. Mater.* 26, 5184-5190 (2014).

Chortos, A. et al. Printing Reconfigurable Bundles of Dielectric Elastomer Fibers. *Adv. Funct. Mater.* 31, 2010643 (2021).

Colosi, C. et al. Microfluidic Bioprinting of Heterogeneous 3D Tissue Constructs Using Low-Viscosity Bioink. *Adv. Mater.* 28, 677-684 (2016).

Dong, Y. et al. Graphene-Based Helical Micromotors Constructed by "Microscale Liguid Rope-Coil Effect" with Microfluidics. *ACS Nano* 14, 16600-16613 (2020).

Frutiger, A. et al. Capacitive Soft Strain Sensors via Multicore-Shell Fiber Printing. *Adv. Mater.* 27, 2440-2446 (2015).

Hart, K. R., Dunn, R. M. & Wetzel, E. D. Tough, Additively Manufactured Structures Fabricated with Dual-Thermoplastic Filaments. *Adv. Eng. Mater.* 22, 1901184 (2020).

Lebel, L. L., Aissa, B., Khakani, M. A. E. & Therriault, D. Ultraviolet-Assisted Direct-Write Fabrication of Carbon Nanotube/Polymer Nanocomposite Microcoils. *Adv. Mater.* 22, 592-596 (2010).

Liu, W. et al. Rapid Continuous Multimaterial Extrusion Bioprinting. *Adv. Mater.* 29, 1604630 (2017).

Loke, G. et al. Structured multimaterial filaments for 3D printing of ogtoelectronics. *Nat. Commun.* 10, 4010 (2019).

Mueller, J., Raney, J. R., Shea, K. & Lewis, J. A. Architected Lattices with High Stiffness and Toughness via Multicore-Shell 3D Printing. *Adv. Mater.* 30, 1705001 (2018).

Raney, J. R. et al. Rotational 3D printing of damage-tolerant composites with grogrammable mechanics. *Proc. Natl. Acad. Sci.* 115, 1198-1203 (2018).

Skylar-Scott, M. A., Mueller, J., Visser, C. W. & Lewis, J. A. Voxelated soft matter via multimaterial multinozzle 3D printing. *Nature* 575, 330-335 (2019).

Spinks, G. M. Advanced Actuator Materials Powered by Biomimetic Helical Fiber Togologies. *Adv. Mater.* 1904093 (2019) doi:10.1002/adma.201904093.

Tottori, S. & Takeuchi, S. Formation of liquid rope coils in a coaxial microfluidic device. *RSC Adv.* 5, 33691-33695 (2015).

Van der Elst, L. et al. 3D Printing in Fiber-Device Technology. *Adv. Fiber Mater.* 3, 59-75 (2021).

Xu, P. et al. Bioinspired Microfibers with Embedded Perfusable Helical Channels. *Adv. Mater.* 29, 1701664 (2017).

Xu, W. et al. Review of Fiber-Based Three-Dimensional Printing for Applications Ranging from Nanoscale Nanoparticle Alignment to Macroscale Patterning. *ACS Appl. Nano Mater.* 4, 7538-7562 (2021).

Yu, Y. etal. Bioinspired Helical Microfibers from Microfluidics. *Adv. Mater.* 29, 1605765 (2017).

* cited by examiner

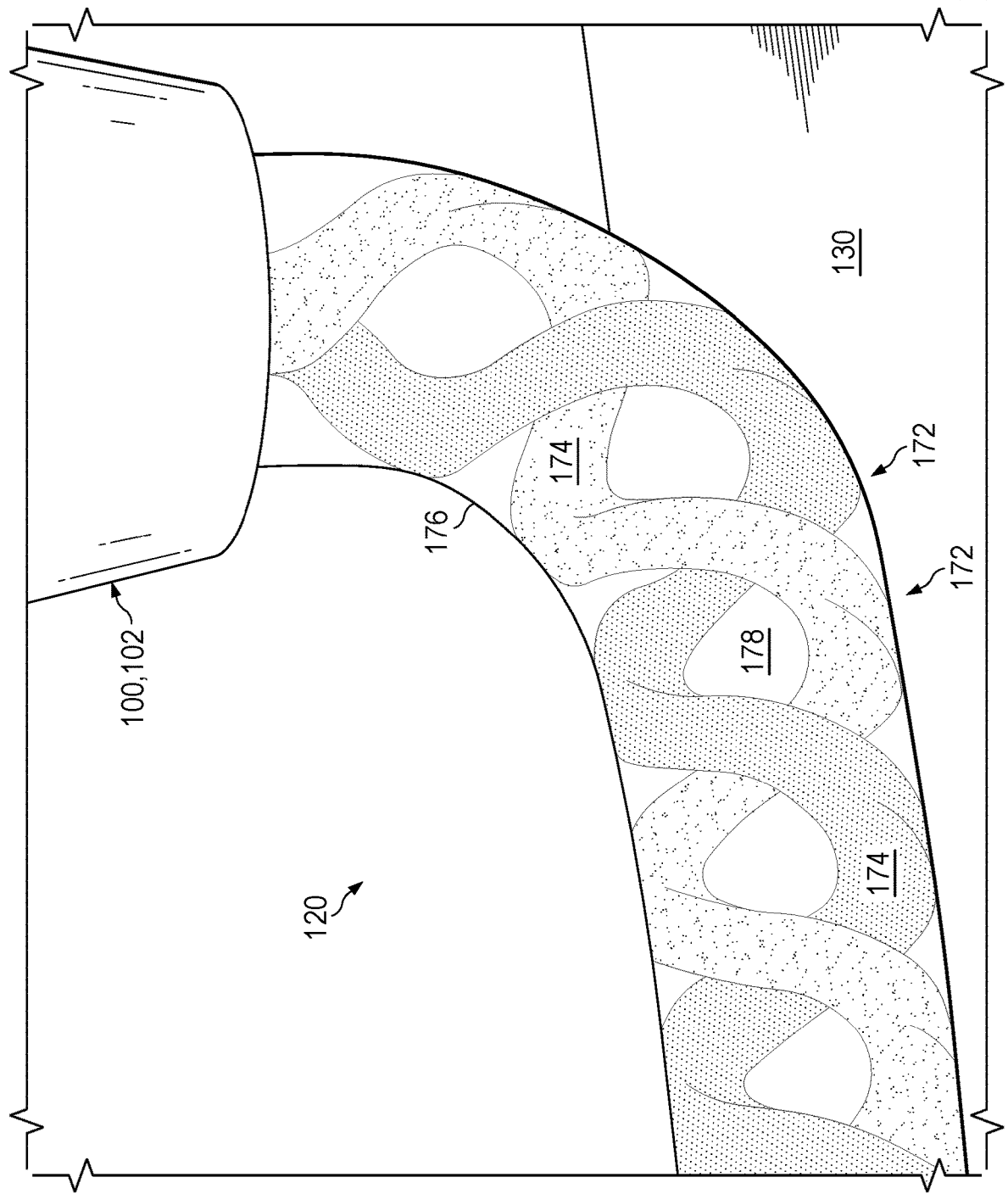

NOZZLE ROTATION AT $\omega^*=2$

ONE NOZZLE ROTATION PER PRINTHEAD REVOLUTION

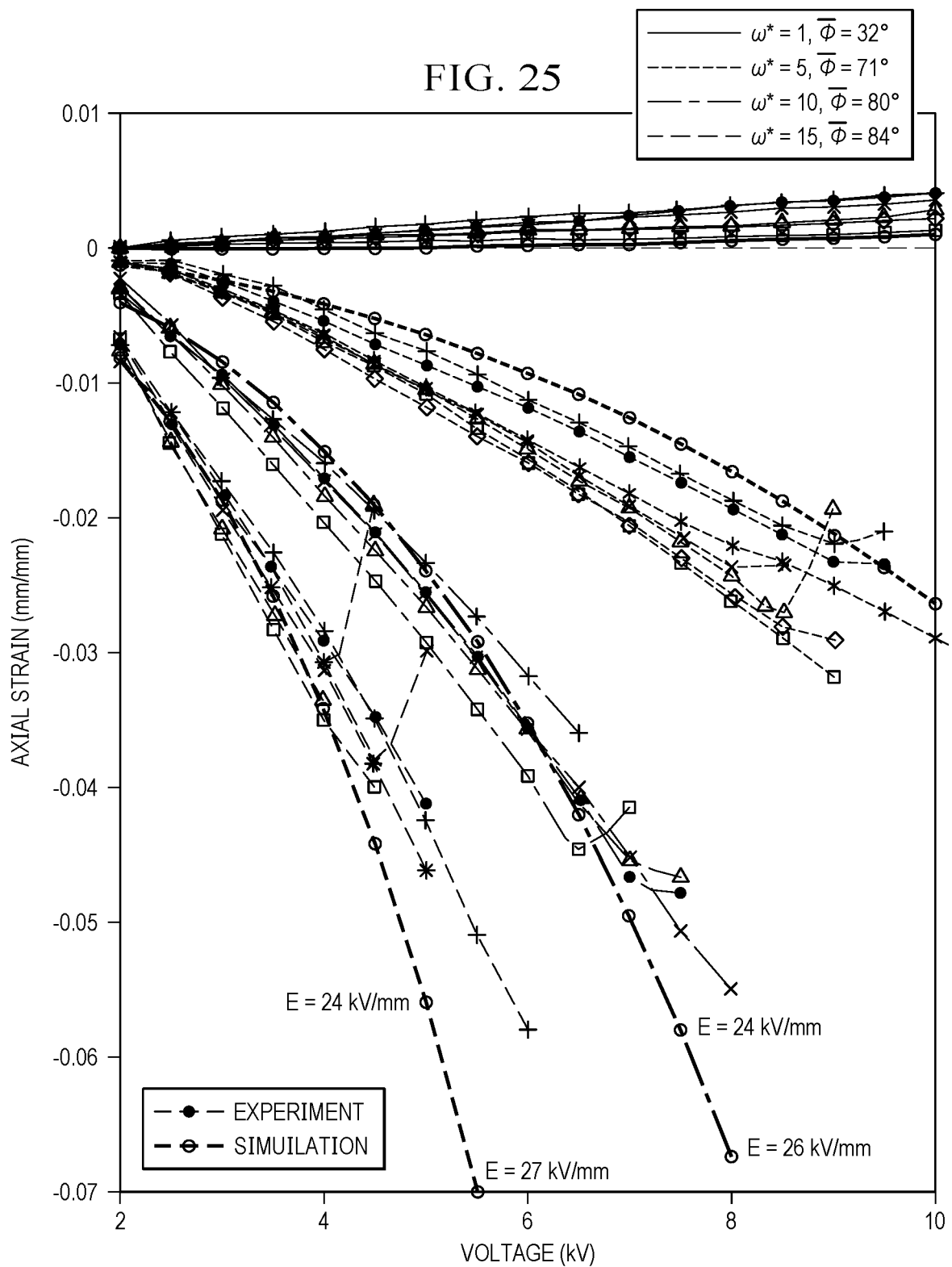

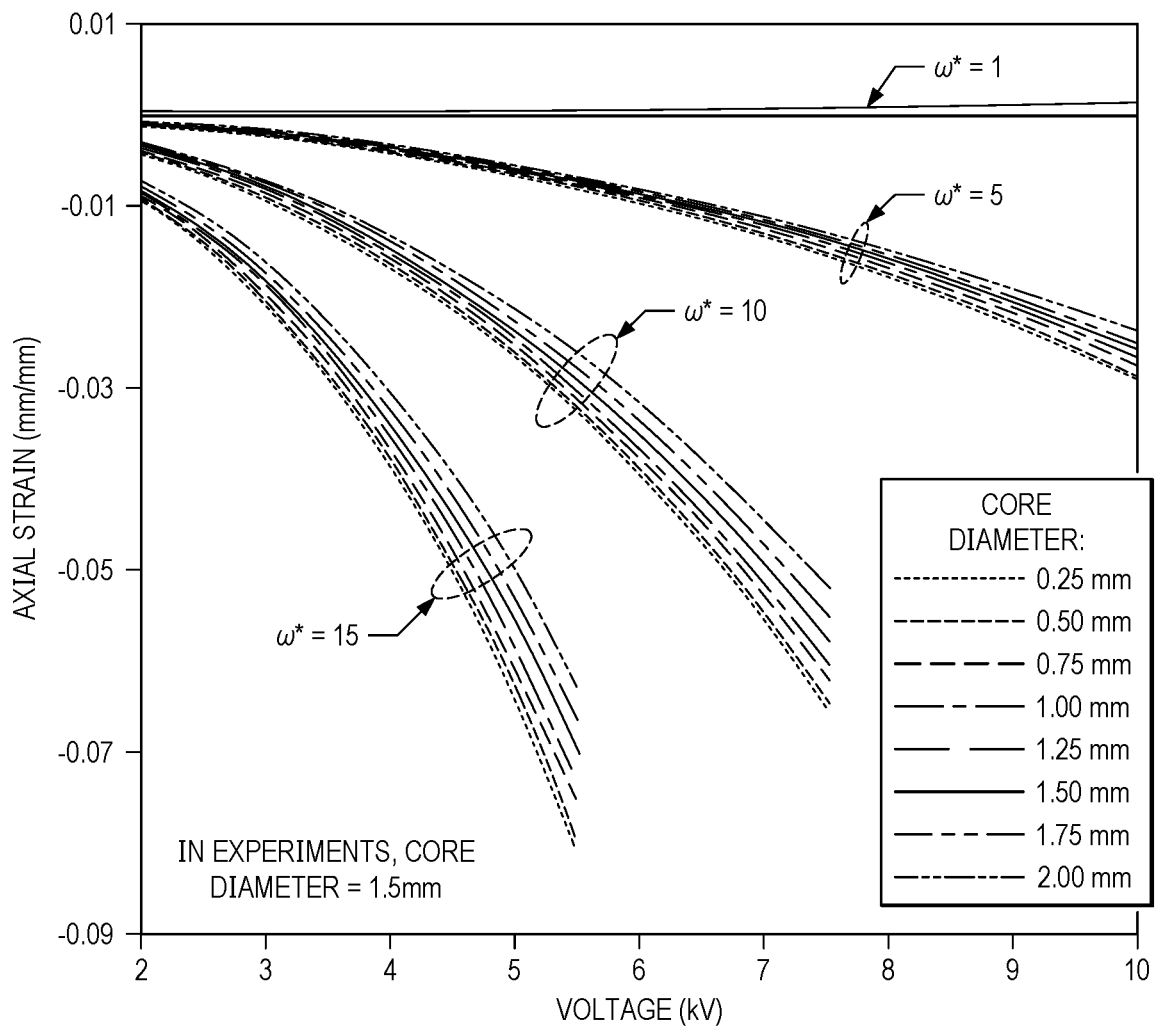

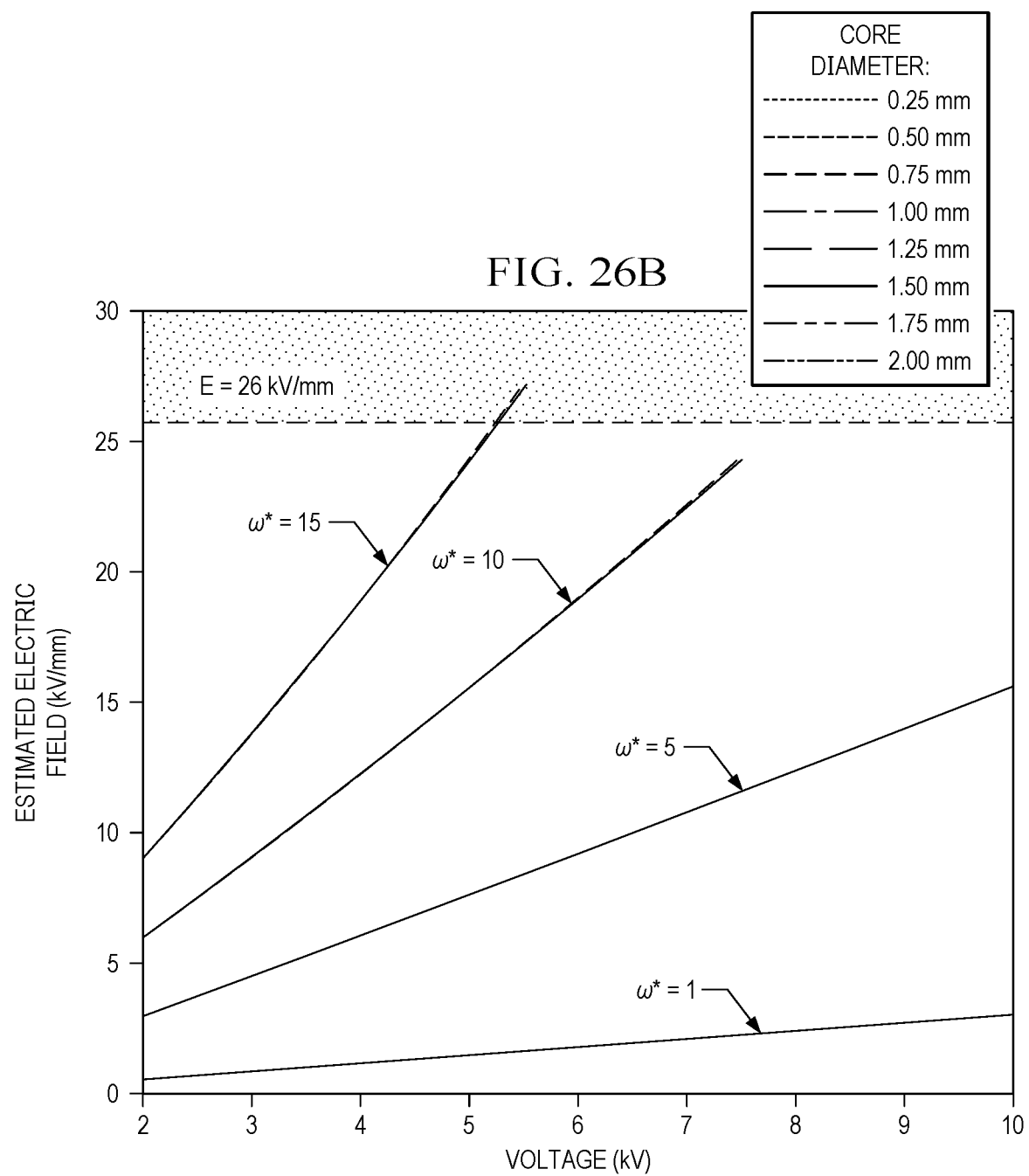

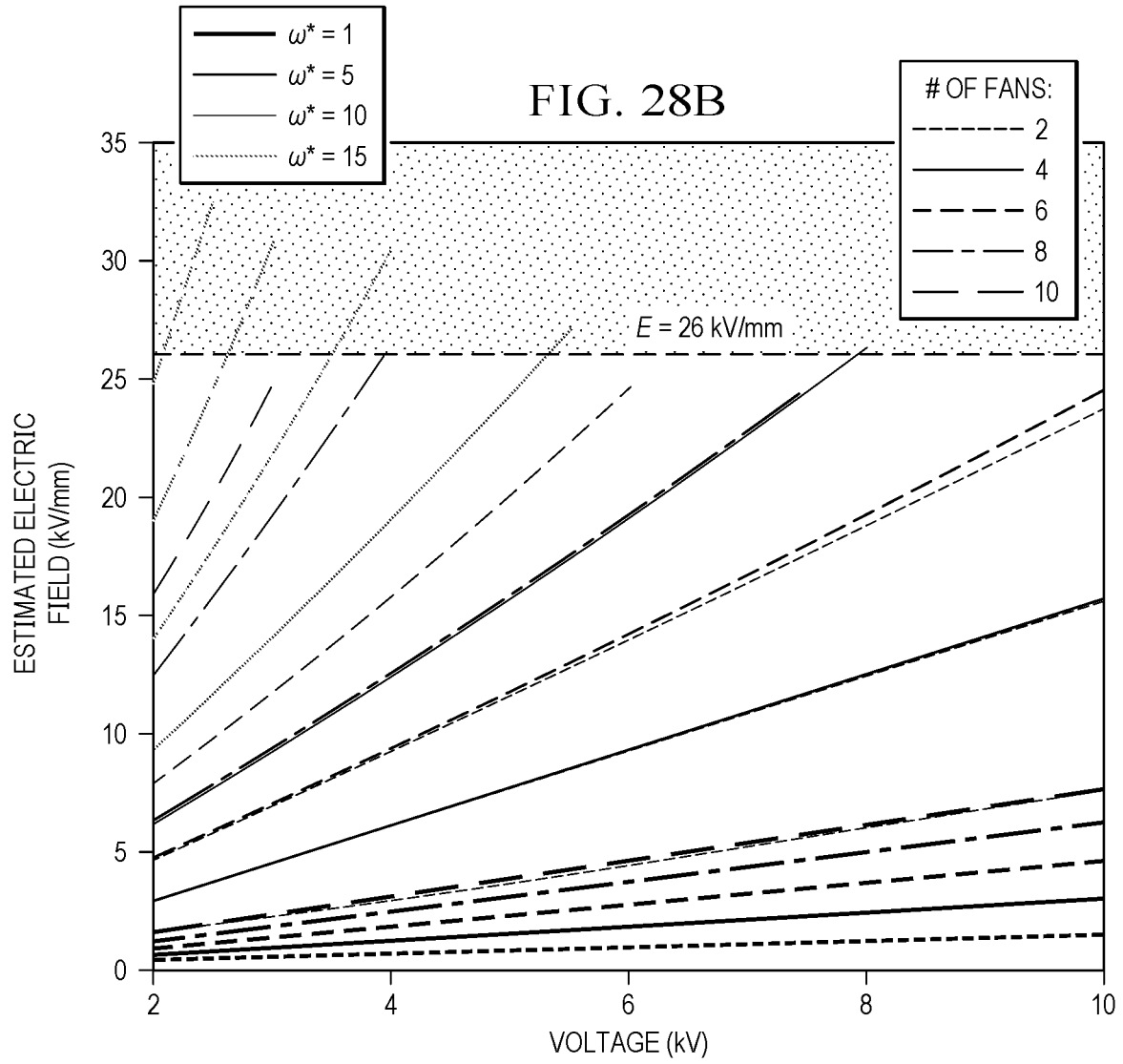

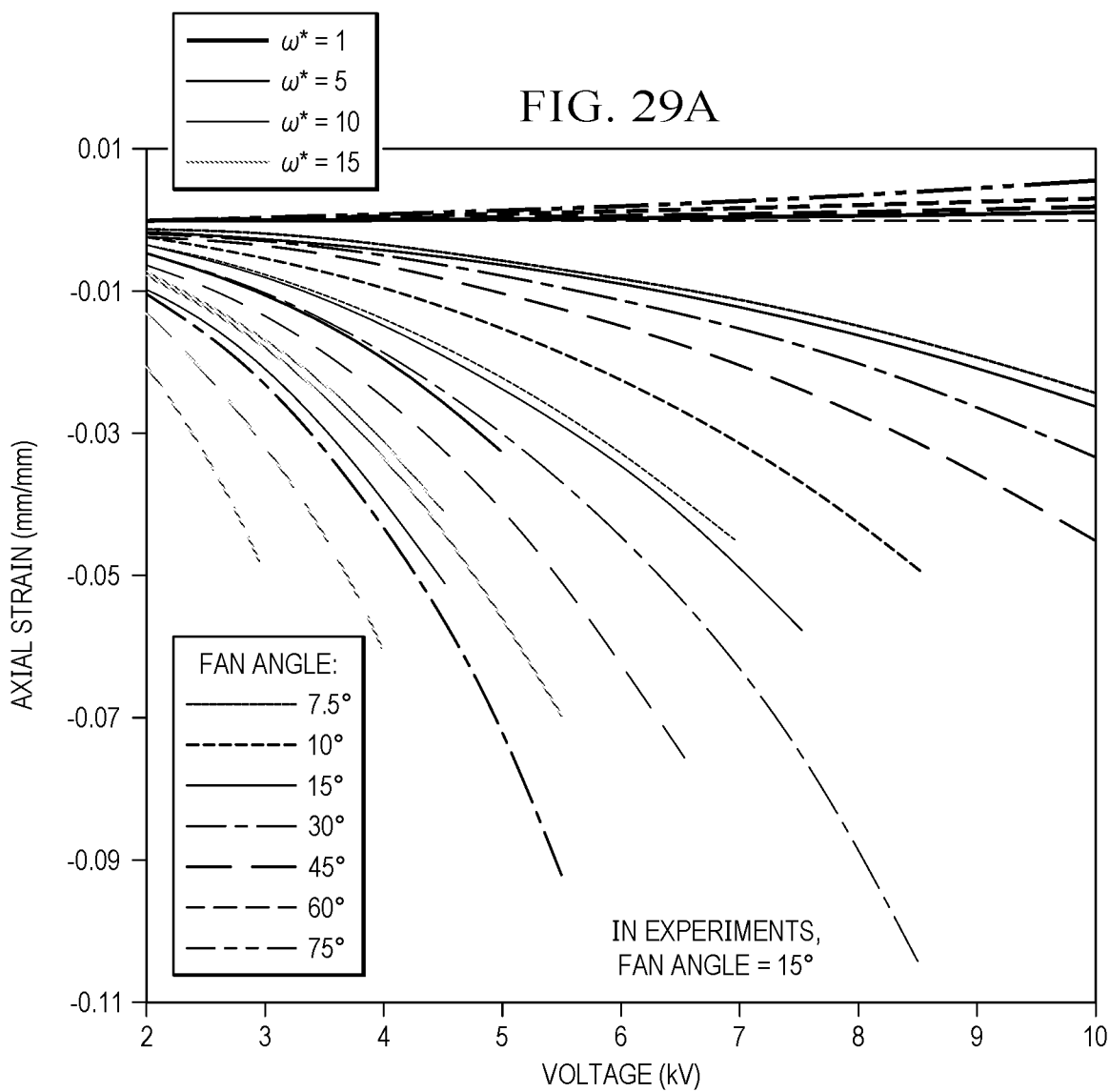

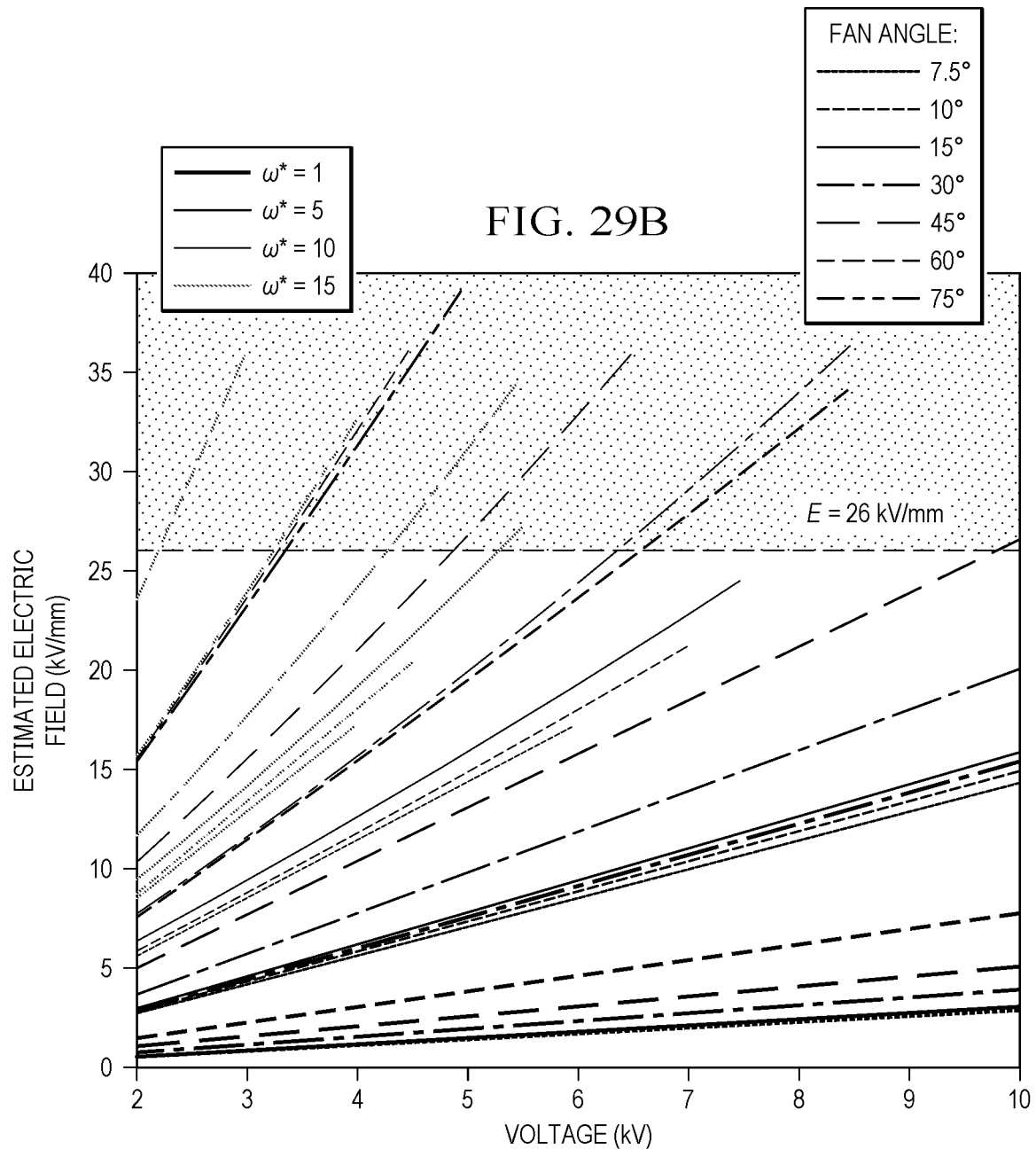

PRINTHEAD AND METHOD OF PRINTING MULTIMATERIAL FILAMENTS INCLUDING ORIENTED, TWISTED AND/OR HELICAL FEATURES

RELATED APPLICATIONS

The present patent document claims the benefit of priority under 35 U.S.C. 119(e) to U.S. Provisional Patent Application No. 63/277,446, filed Nov. 9, 2021, and to U.S. Provisional Patent Application No. 63/280,741, filed Nov. 18, 2021. Both of the above-mentioned patent applications are hereby incorporated by reference in their entirety.

FEDERALLY SPONSORED RESEARCH AND DEVELOPMENT

This invention was made with government support under grant number N00014-16-1-2823 awarded by the Office of Naval Research and under grant number 2011754 awarded by the National Science Foundation. The government has certain rights in the invention.

TECHNICAL FIELD

The present disclosure is related generally to direct ink writing (or "3D printing") and more particularly to rotational direct ink writing of multiple materials.

BACKGROUND

The ubiquity of helical and twisted constructs stems from their highly versatile and deeply coupled structural and functional properties. With a helical structure, generation of bending, twisting, coiling and length changing movements can be achieved through the use of simple phenomena such as volumetric swelling, fiber contraction, or intercalation. Helical constructs are ubiquitous in natural systems on multiple length scales ranging from coiling plant tendrils and twining vines to helically arranged cellulose fibers in plant cell walls to α-helix coiled-coils of tropomyosin helically wrapped around double-helical arrays of actin monomers in skeletal muscle. Engineered artificial muscles including tendril-like bimorph actuators, actuators based on twisted carbon nanotube yarns, twisted string actuators, supercoiled polymer actuators, and helical and twisted dielectric elastomer actuators also exploit the mechanical advantages of twisted, coiled and helical geometries. Several other technologies have also utilized twisted and helical architectures ranging from springs and ropes to helical magnetic micro-/nanometers and rotating microengines made of twisted shape memory nanocomposite fibers.

Fabrication methods for helical and twisted structures are myriad. Winding, twisting, spinning, braiding and plaiting of fibers, filaments and wires have been used to produce advanced yarns, ropes, cables, hoses, actuators and other devices that may contain multiple materials arranged in hierarchical helical structures. In twisted structures, supercoiling may be induced by swelling or further application of twist. In these processes, filamentary starting materials must be able to withstand the accompanying tensile and bending stresses. Additional methods and mechanisms for formation of helical constructs and patterns include, for example, filament winding around mandrels, helical blade cutting, generation of bimorph, bilayer or alternating structures with materials exhibiting mismatches or anisotropy in properties, and self-assembly emerging from (i) chirality at the molecular scale (ii) geometric asymmetry and elastocapillary forces and (iii) phase separation.

Previous attempts to fabricate components with helical geometries using bottom-up fabrication methods such as ink jet printing and fused deposition modeling have been limited in terms of material versatility, multimaterial capabilities, and/or helical pattern smoothness.

BRIEF SUMMARY

A nozzle, printhead and method of printing multimaterial filaments including oriented, twisted, and/or helical features are described in this disclosure. Also described are a helical dielectric elastomer actuator and a method of making a helical dielectric elastomer actuator.

The printhead comprises a plurality of ink cartridges and a nozzle, where the nozzle and the ink cartridges are configured to rotate together about an axis during printing. The nozzle includes a nozzle body comprising an inlet end, an outlet end, and one or more internal passageways extending through the nozzle body from the inlet end to the outlet end. The one or more internal passageways terminate at one or more outlets at or near the outlet end. The nozzle also includes plurality of nozzle inlets at the inlet end for delivery of flowable inks into the internal passageways, where each nozzle inlet is in fluid communication with a dispensing end of one of the ink cartridges.

The nozzle includes a nozzle body comprising an inlet end, an outlet end, and internal passageways extending therethrough from the inlet end to the outlet end. The inlet end is configured for delivery of a flowable ink into each of the internal passageways, which are defined by one or more internal walls and terminate at outlets at or near the outlet end. The outlets are configured such that a multimaterial filament extruded from the nozzle body during translation and rotation thereof includes oriented, twisted and/or helical features.

The method of printing multimaterial filaments includes, according one aspect: delivering flowable inks into the internal passageways of the nozzle described above or elsewhere in this disclosure; extruding a multimaterial filament from the nozzle body; during the extrusion, rotating the nozzle about an axis and translating the nozzle with respect to a substrate, thereby defining a print path; and depositing the multimaterial filament on the substrate, wherein the multimaterial filament includes one or more oriented, twisted and/or helical features.

The method of printing multimaterial filaments comprises, according to another aspect: providing a printhead as described above or elsewhere in this disclosure; delivering flowable inks into the one or more internal passageways of the nozzle; extruding a multimaterial filament from the nozzle body; during the extrusion, rotating the nozzle and the ink cartridges together about an axis, and translating the nozzle with respect to a substrate, thereby defining a print path; and depositing the multimaterial filament on the substrate, wherein the multimaterial filament includes one or more oriented, twisted and/or helical features.

The method of making a helical dielectric elastomer comprises, according to one aspect: delivering flowable inks into the internal passageways of the nozzle described above or elsewhere in this disclosure; extruding a multimaterial filament from the nozzle body; during the extrusion, rotating the nozzle about an axis and translating the nozzle with respect to a substrate, thereby defining a print path; and depositing the multimaterial filament on the substrate, wherein the multimaterial filament comprises conductive helical traces embedded in a dielectric matrix.

The method of making a helical dielectric elastomer comprises, according to another aspect: providing the printhead described above or elsewhere in this disclosure; delivering flowable inks into the internal passageways of the nozzle; extruding a multimaterial filament from the nozzle body; during the extrusion, rotating the nozzle and the ink cartridges together about an axis, and translating the nozzle with respect to a substrate, thereby defining a print path; and depositing the multimaterial filament on the substrate, wherein the multimaterial filament comprises conductive helical traces embedded in a dielectric matrix.

A helical dielectric elastomer actuator comprises a multimaterial filament comprising conductive helical traces embedded in a dielectric matrix where alternating conductive helical traces are configured for connection to positive and negative terminals of a power supply, respectively, for actuation.

BRIEF DESCRIPTION OF THE DRAWINGS

FIG. 8C shows a multimaterial filament extruded from the outlets shown in FIGS. 8A and 8B.

FIGS. 24 and 25 show actuation performance of exemplary HDEAs in terms of total twist angle and axial strain.

FIGS. 26A-26C show results of simulations investigating the effects of changing the diameter of the core portion of the core-fan outlet ("core diameter") on actuation performance.

FIGS. 28A-28C show results of simulations investigating the effects of changing the number of fan outlets (and the angle $\psi$ of the fan outlets so as to maintain a constant dielectric volume fraction in active area) on actuation performance.

FIGS. 29A-29C show results of simulations investigating the effects of changing the angle $\psi$ of the fan outlets ("fan angle") on actuation performance.

DETAILED DESCRIPTION

Figure 1:
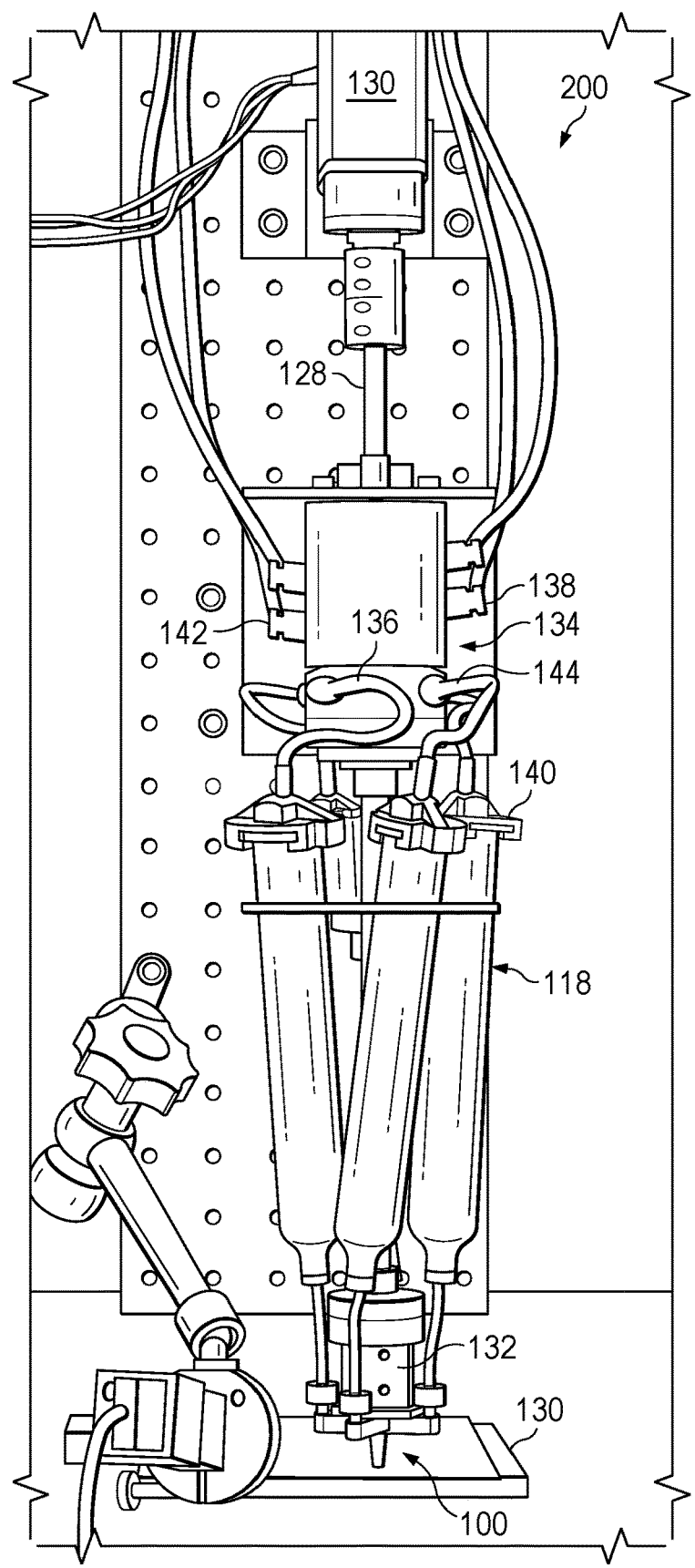
FIG. 1 shows an exemplary printhead configured for simultaneous rotation of a nozzle and a plurality of ink cartridges.

Described in this disclosure is a rotational direct ink writing or 3D printing method that enables multimaterial filaments to be printed with control over the local composition and orientation of multiple materials within the filament structure. As described in detail below, multimaterial filaments with oriented, twisted and/or helical features have been printed and tested for several applications. FIG. 1 shows an exemplary printhead for printing multimaterial filaments, and FIGS. 2A-2C show views of exemplary nozzles that may be employed with the printhead of FIG. 1, or with other printheads.

Figure 2A:
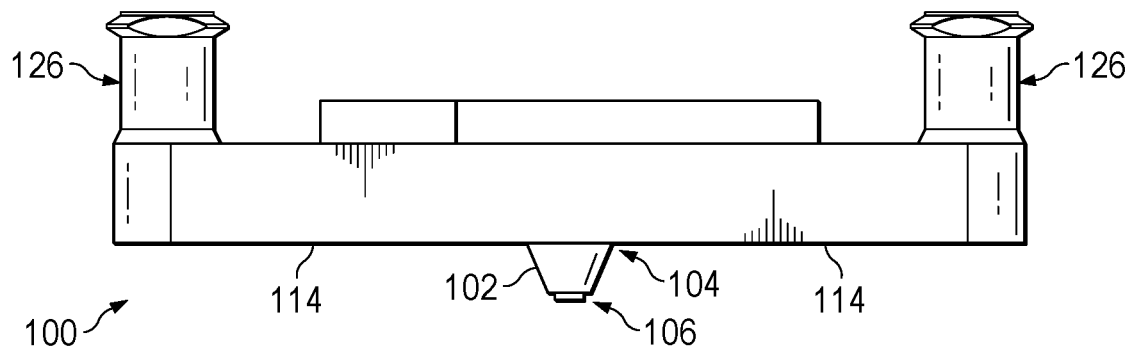
FIGS. 2A and 2B show side view and cross-sectional view schematics, respectively, of a simple exemplary nozzle, which includes a nozzle body and two nozzle inlets for delivery of flowable inks into internal passageways of the nozzle body.
Figure 2B:
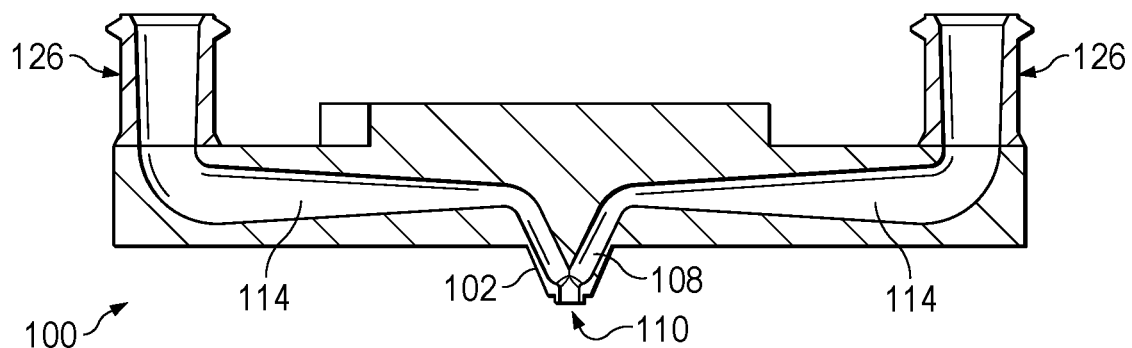

Referring first to FIGS. 2A and 2B, an exemplary nozzle designed for printing multimaterial filaments which may include twisted and/or helical features is illustrated. The nozzle 100 includes a nozzle body 102 having an inlet end 104, an outlet end 106, and one or more internal passageways 108 extending through the nozzle body 102 from the inlet end 104 to the outlet end 106. The inlet end 104 is configured for delivery of a flowable ink into each of the one or more internal passageways 108, which terminate at one or more outlets 110 at or near the outlet end 106. Accordingly, different flowable inks may be employed to print a multimaterial filament via extrusion through the one or more outlets 110. The one or more outlets 110 may be configured such that, when the nozzle body 102 undergoes translation and rotation, the extruded multimaterial filament 120, as shown for example in FIG. 8C, includes oriented, helical and/or twisted features.

Figure 2C:
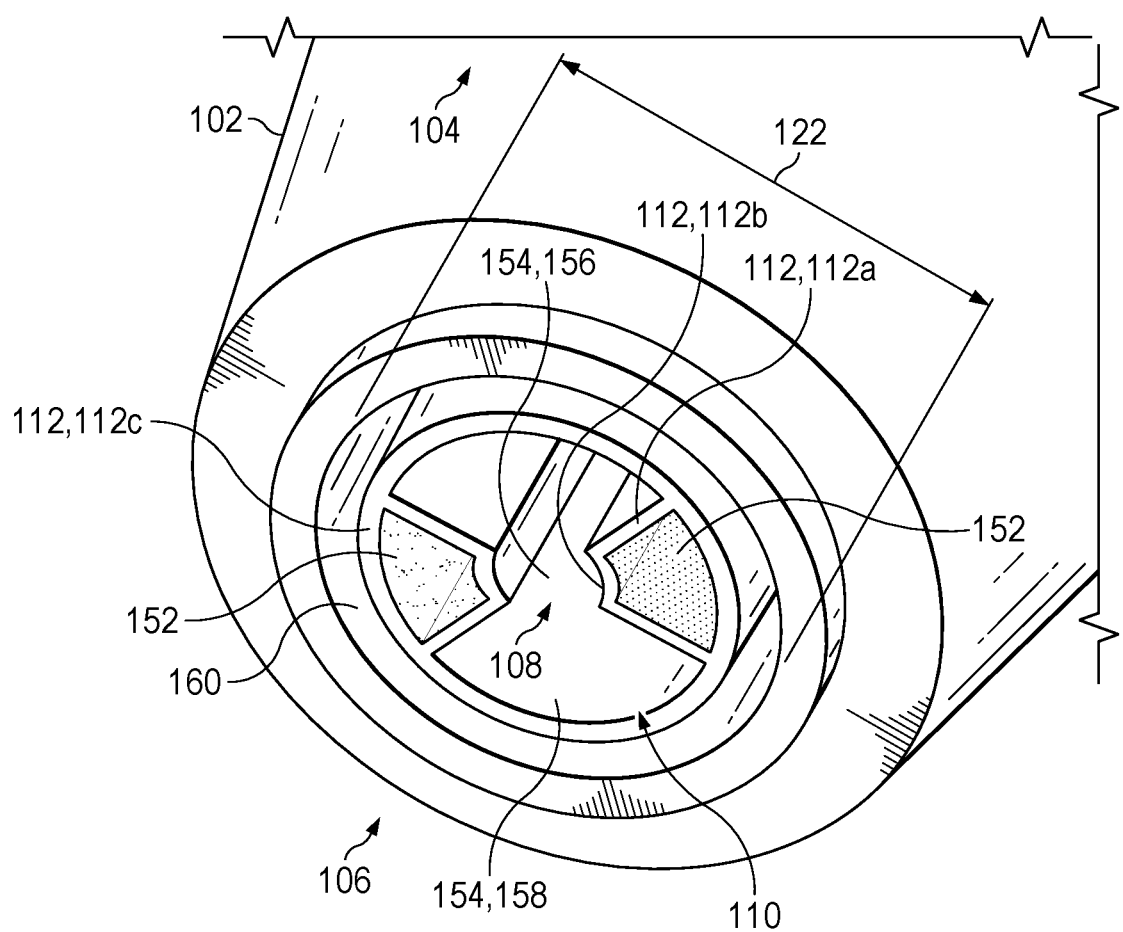
FIG. 2C shows a portion of an exemplary nozzle body including outlets configured to extrude a multimaterial filament including oriented, twisted, and/or helical features.

FIG. 2C provides a perspective view of the outlet end 106 of an exemplary nozzle body 102 which includes a plurality of outlets 110. The outlets 110 may be circumferentially and/or azimuthally heterogeneous, in contrast to, for example, the outlets of existing core-shell nozzles which may include a core outlet surrounded by a shell outlet. The internal passageways 108 may be defined by one or more internal walls 112 that extend entirely or partway through the nozzle body 102. At the outlet end 106, the one or more internal walls 112 may be flush with, recessed from, and/or protuberant from an outer wall 122 of the nozzle body 102. In some examples, the internal walls 112 may include radially aligned walls 112a, circumferentially aligned walls 112b, and/or circumferentially continuous walls 112c, as described below. The nozzle 100 described generally above and according to different embodiments throughout this disclosure may be used in the printhead 200 shown in FIG. 1.

Figure 3A:
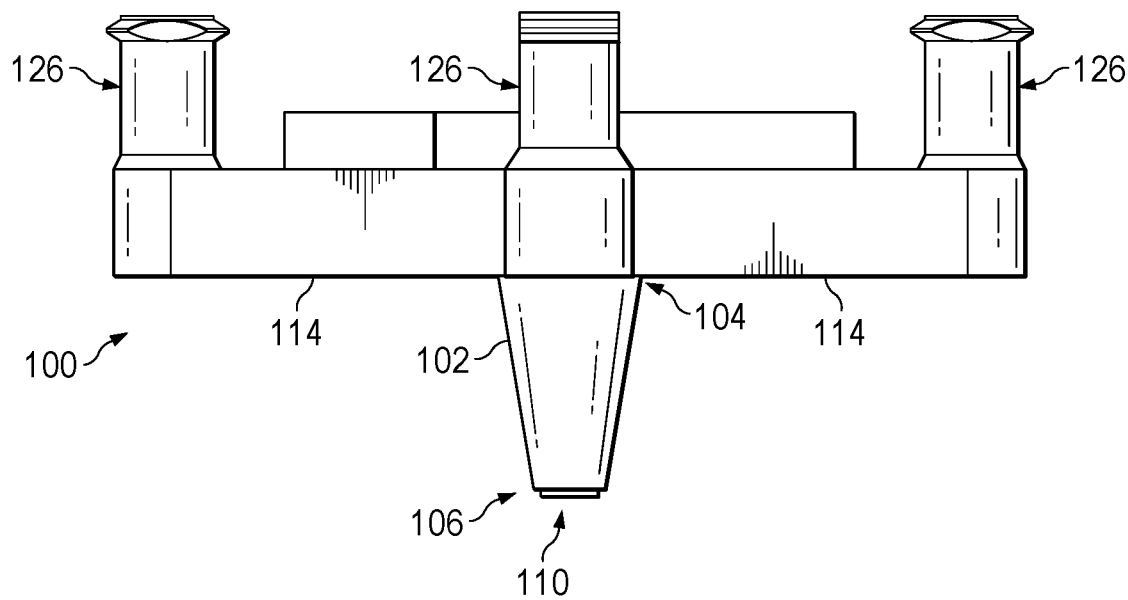
FIGS. 3A and 3B show side view and cross-sectional view schematics, respectively, of an exemplary nozzle, which includes a nozzle body and a plurality of nozzle inlets for delivery of flowable inks into internal passageways of the nozzle body.

Referring to FIG. 1, the printhead 200 includes a plurality of ink cartridges 118 and a nozzle 100 which are configured to rotate together about an axis and translate together during printing. It is understood that references to "the nozzle 100" in the context of the printhead 200 may refer to any nozzle configured to print a multimaterial filament, including any nozzle 100 described in this disclosure. As described above, the nozzle 100 may include a nozzle body 102 comprising an inlet end 104, an outlet end 106, and one or more internal passageways 108 extending through the nozzle body 102 from the inlet end 104 to the outlet end 106. The one or more internal passageways 108 terminate at one or more outlets 110 at or near the outlet end 106. As shown in FIGS. 2A and 2B, the nozzle 100 may include a plurality of nozzle inlets 114 at the inlet end 104 for delivery of flowable inks into the internal passageways 108, where each nozzle inlet 114 is in fluid communication with a dispensing end (lower portion) 116 of an ink cartridge 118 (e.g., via connector portions 126), as shown in FIG. 5A. The phrase "in fluid communication with" may be understood to mean, when used to describe the relationship between two objects, that the objects are directly or indirectly connected such that fluid may flow in one or both directions between and/or through the objects. In this example, the dispensing end 116 of each ink cartridge 118 may be connected, either directly or indirectly (e.g., through one or more intermediate connectors 124), to one of the nozzle inlets 114. It is noted that the nozzle body 102 and the one or more internal passageways 108 may have any desired axial length, such as the shorter axial length shown in FIGS. 3A and 3B, or the longer axial length shown in FIGS. 4A and 4B, to accommodate a particular printing configuration (e.g., angled or vertical, as described below).

Referring again to FIG. 1, the printhead 200 is configured for simultaneous rotation of the nozzle 100 and the ink cartridges 118 about an axis during printing (e.g., as the nozzle 100 is moved with respect to a substrate 130 while extruding and depositing a multimaterial filament 120). In one example, the axis of rotation of the nozzle 100 and the ink cartridges 118 may coincide with the centerline of the nozzle body 102; in other words, the nozzle 100 and the ink cartridges 118 may be configured to rotate together about the centerline of the nozzle body 102. Each of the ink cartridges 118 is configured to hold and dispense a flowable ink. For printing of at least two different flowable inks, or at least four different flowable inks (as shown), and in some cases as many as six, ten, 20, 50, or 100 different flowable inks, the printhead 200 may be designed to accommodate at least two or at least four ink cartridges 118, and up to 6, 10, 20, 50 or 100 ink cartridges 118. The ink cartridges 118 may be pressure-controlled ink cartridges, as explained below.

The nozzle body 102 and the ink cartridges 118 may be coupled to a rotatable shaft 128 which is coupled to a motor 130 (e.g., a stepper motor as shown). The motor may control the angular velocity, $\omega$, of the rotatable shaft, and thus that of the nozzle 100 and the ink cartridges 118. In some examples, the rotatable shaft 128 and the centerline of the nozzle body 102 may be aligned. In other examples, the nozzle body 102 may be tilted or otherwise positioned such that the rotatable shaft 128 and the centerline of the nozzle body 102 are not aligned. In other words, the axis of rotation may not coincide with the centerline of the nozzle body 102. A centering stage 132 may be coupled to the rotatable shaft 128 to enable mounting and adjustment of the position and/or orientation of the nozzle 100. For example, the centering stage 132 may enable adjustment of the position of the nozzle 100 along axes x, y, and/or z, and orientation of the nozzle 100 in terms of roll, tilt, yaw, rotation, and/or tip. The entire printhead 200 may be mounted on a multi-axis linear motion controller which may utilize positional feedback to control translational velocity, v, and gap height, h, during printing. The multi-axis linear motion controller may comprise a 6-axis, 5-axis, 4-axis, or 3-axis linear motion controller.

The printhead 200 may include a rotary union 134 positioned between the ink cartridges 118 and the motor 130 for delivering pressurized gas from a (stationary) gas supply to the (rotating) ink cartridges 118 during printing. A rotatable inner portion 136 of the rotary union 134 may be coupled to the rotatable shaft 128 and in fluid communication with the ink cartridges 118, and a stationary outer portion 138 surrounding the rotatable inner portion 136 may be configured for connection to the gas supply. More specifically, the stationary outer portion 138 may include gas inlet channels 142 for delivery of pressurized gas from the gas supply to the rotary union 134, and the rotatable inner portion 136 may include gas outlet channels 144 for delivery of the pressurized gas from the rotary union 134 to the ink cartridges 118. The gas outlets 144 may be connected directly or indirectly (e.g., via intervening connectors) to inlet ends (upper portions) 140 of the ink cartridges 118.

Figure 5A:
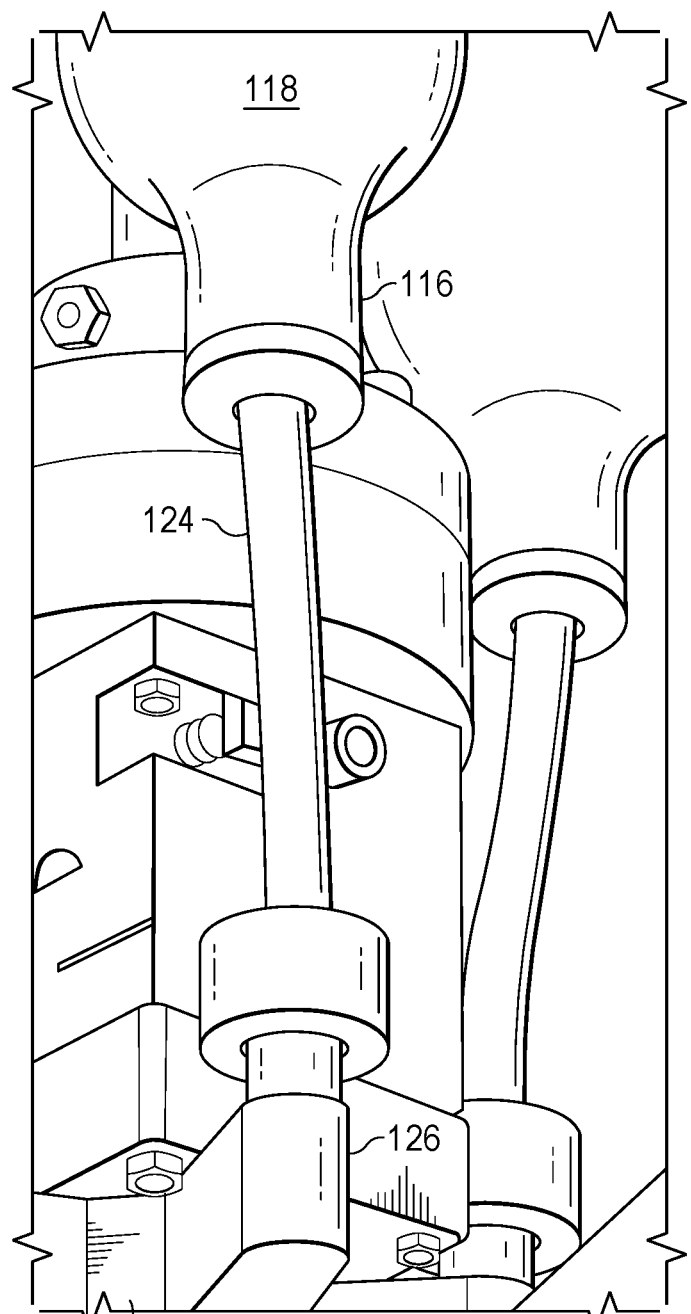
FIG. 5A shows an example of how the dispensing end of an ink cartridge may be connected to one of the nozzle inlets for delivery of a flowable ink into the nozzle during 3D printing.
Figure 5B:
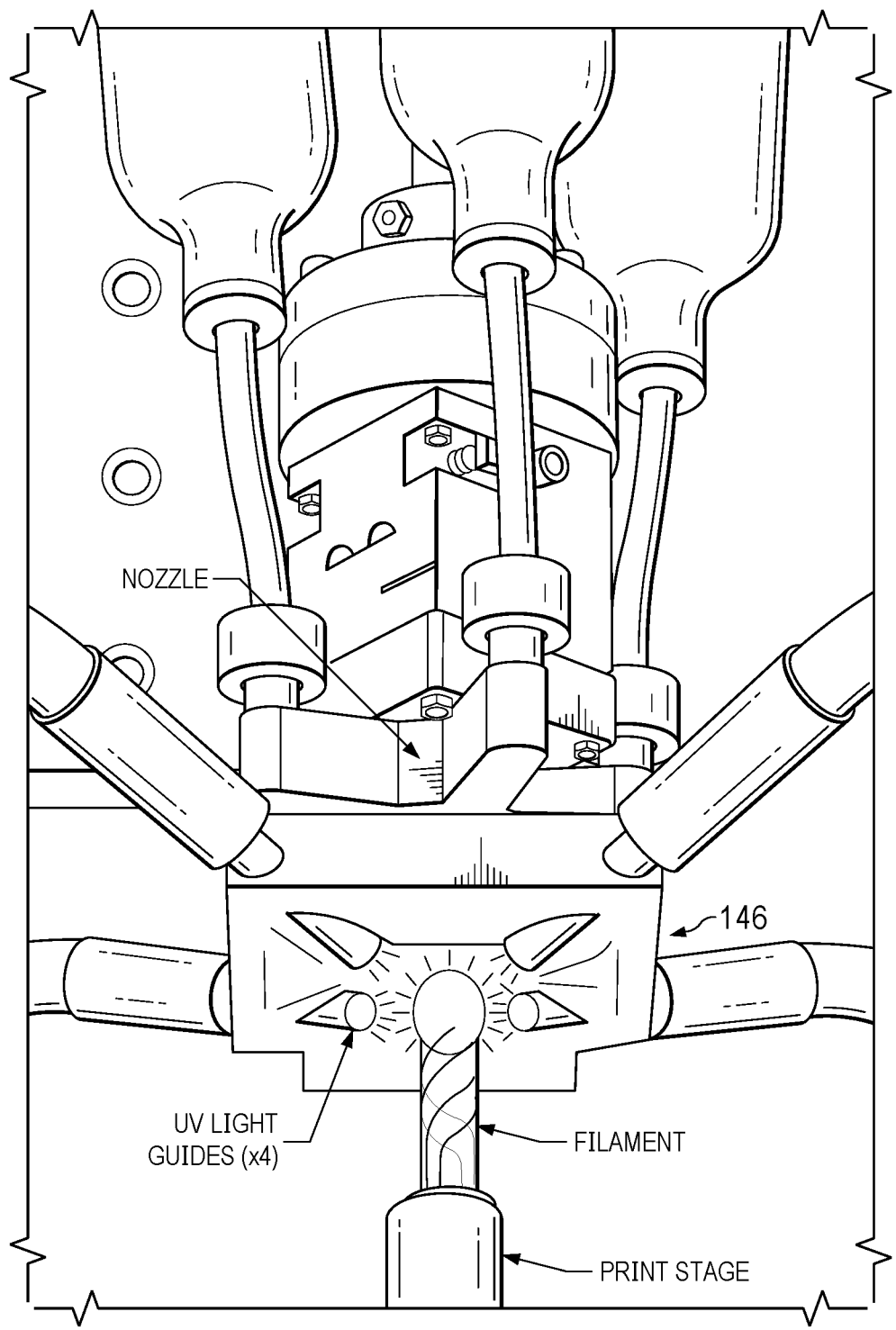
FIG. 5B shows an example of an ultraviolet (UV) light fixture configured for coordinated translation with the printhead.

Referring to FIG. 5B, the printhead 200 may further include an ultraviolet (UV) light fixture 146 positioned to impinge UV light on the multimaterial filament extruded from the nozzle body 102, so as to effect curing of one or more of the flowable inks employed for printing. The UV light fixture 146 may be integrated with the printhead 200 and/or configured for coordinated translation with the printhead 200. For example, the UV light fixture may be coupled to the three-axis linear motion controller such that its movement is coordinated with that of the nozzle 100, as illustrated in FIG. 5B.

In some examples, the flowable inks may include polymers or polymer resins that crosslink or cure upon exposure to UV light. The resulting multimaterial filament 120 may include one or more polymers, such as acrylonitrile butadiene styrene (ABS), polylactic acid (PLA), poly(methyl methacrylate) (PMMA or acrylic), epoxy, polydimethylsiloxane (PDMS), polyimide (Nylon), polyimide (PI), polyethylene (PE), polypropylene (PP), polystyrene (PS), polytetrafluoroethylene (PTFE), polyvinylchloride (PVC), polyurethane PU), polycarbonate (PC), a photocurable resin, epoxy, and/or a hydrogel. The multimaterial filament 120 may include two or more polymers, where each polymer (post-curing) has a different stiffness. For example, the multimaterial filament 120 may include a soft polymer (e.g., a soft acrylic) and a stiff polymer (e.g., a stiff acrylic), where the stiff polymer has a higher stiffness or modulus than that of the soft polymer (e.g., at least 1, at least 2, at least 3, or at least 4 orders of magnitude higher than that of the soft polymer). In a particular example described below, the multimaterial filament may comprise twisted or helical traces comprising the stiff polymer separated from each other in an axial direction and a radial direction by the soft polymer (that is, the twisted or helical traces comprising the stiff polymer may be embedded in the soft polymer), such that the multimaterial filament is configured for use as a "springy" filament, as discussed further below.

Generally speaking, the flowable inks employed for printing may be viscoelastic and/or exhibit shear-thinning rheological behavior. Also or alternatively, the flowable inks may comprise liquids or gels. The resulting multimaterial filament 120 may comprise multiple materials selected from one or more polymers, metals, alloys, semiconductors, ceramics, carbon-based materials, biomaterials, dielectrics and/or composites (e.g., containing particulate or fiber fillers), where the particular materials employed may be selected for printability and/or functionality, such as desired electronic, optical, electrochemical, electromagnetic, thermal, mechanical, swelling, and/or other properties. In one example, the multimaterial filament 120 may include a fugitive material (e.g., a polymer such as a hydrogel) that may be removed after printing. In another example, the multimaterial filament 120 may include a conductive material that imparts electrical conductivity to the twisted or helical features formed during printing. In an example described in detail below, the multimaterial filament may include conductive helical traces separated from each other in an axial direction by a dielectric helical trace and/or embedded in a dielectric matrix, such that the multimaterial filament is configured for use as a helical dielectric elastomer actuator. The conductive material may comprise, for example, aluminum, carbon, chromium, cobalt, copper, gallium, gold, indium, iron, lead, lithium, magnesium, molybdenum, nickel, niobium, palladium, platinum, rhenium, silver, tantalum, tin, titanium, tungsten, vanadium, zinc, and/or zirconium. Suitable flowable inks for imparting electrical conductivity may comprise liquid dispersions or pastes that include conductive particles, such carbon or metal particles, or liquid metals such as gallium-based alloys that have melting temperatures around room temperature (e.g., 18-25° C.).

Figure 7:
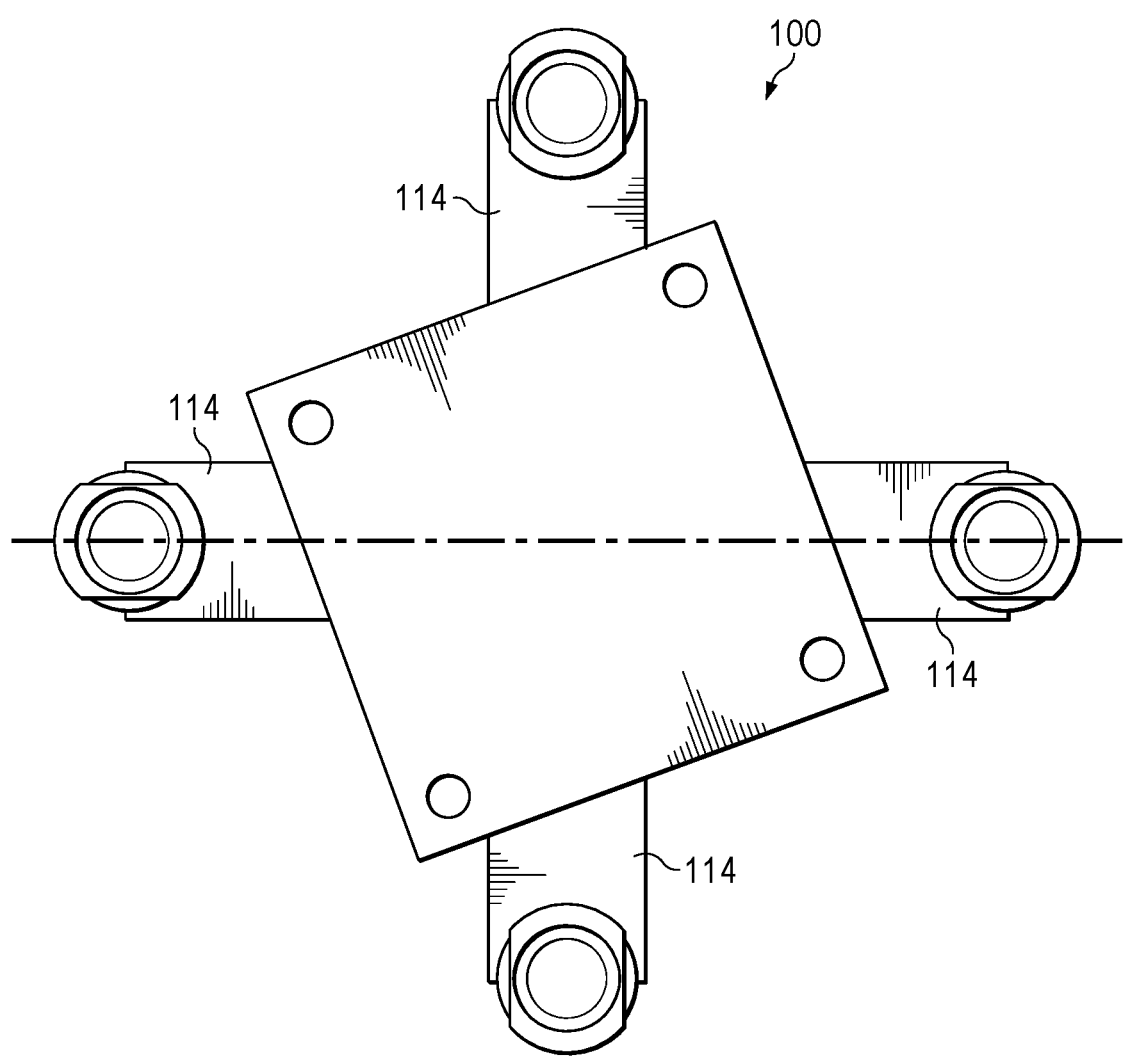
FIG. 7 shows a top-view schematic of the nozzle to illustrate an exemplary symmetric arrangement of the nozzle inlets.

Referring again to FIGS. 2A, 2B, 3A, and/or 3B, the nozzle inlets 114 at the inlet end 104 may extend radially away from the centerline of the nozzle body 102 for connection to the dispensing ends of the ink cartridges 118, e.g., at connector portions 126. This configuration may allow a relatively small-size nozzle 100 to be readily connected to larger-size ink cartridges 118 for supplying multiple flowable inks for the duration of printing. The nozzle inlets 114 may extend to the same or different radial distances away from the centerline. In some examples, as shown in FIG. 7, the inlets 114 may be symmetrically arranged about the centerline of the nozzle body 102. Alternatively, the nozzle inlets 114 may be asymmetrically arranged about the centerline of the nozzle body. The nozzle 100 may have a single-piece or multi-piece construction. For example, the nozzle body 102 may be integrally formed with the inlets 114 and/or the connector portions 126 such that the nozzle 100 has a one-piece construction. Alternatively, the nozzle body 102 may be formed separately from the nozzle inlets 114 and/or the connector portions 126 and then be assembled together, such that the nozzle 100 has a multipiece construction.

Figure 6A:
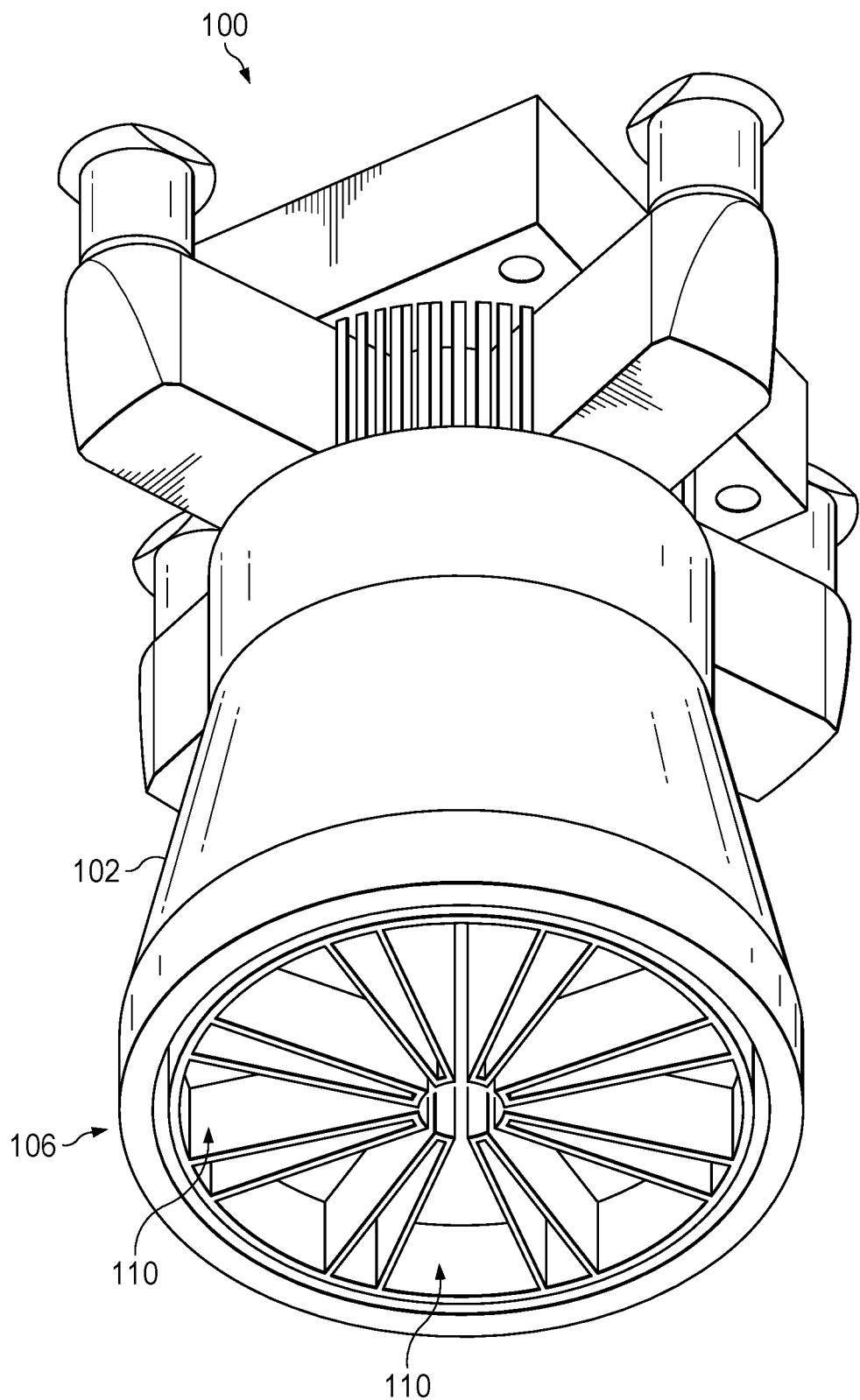
FIGS. 6A-6C show perspective views of an exemplary nozzle body before (6A) and after (6B and 6C) integration with a tapered sleeve to improve the resolution of printed features.
Figure 6B:
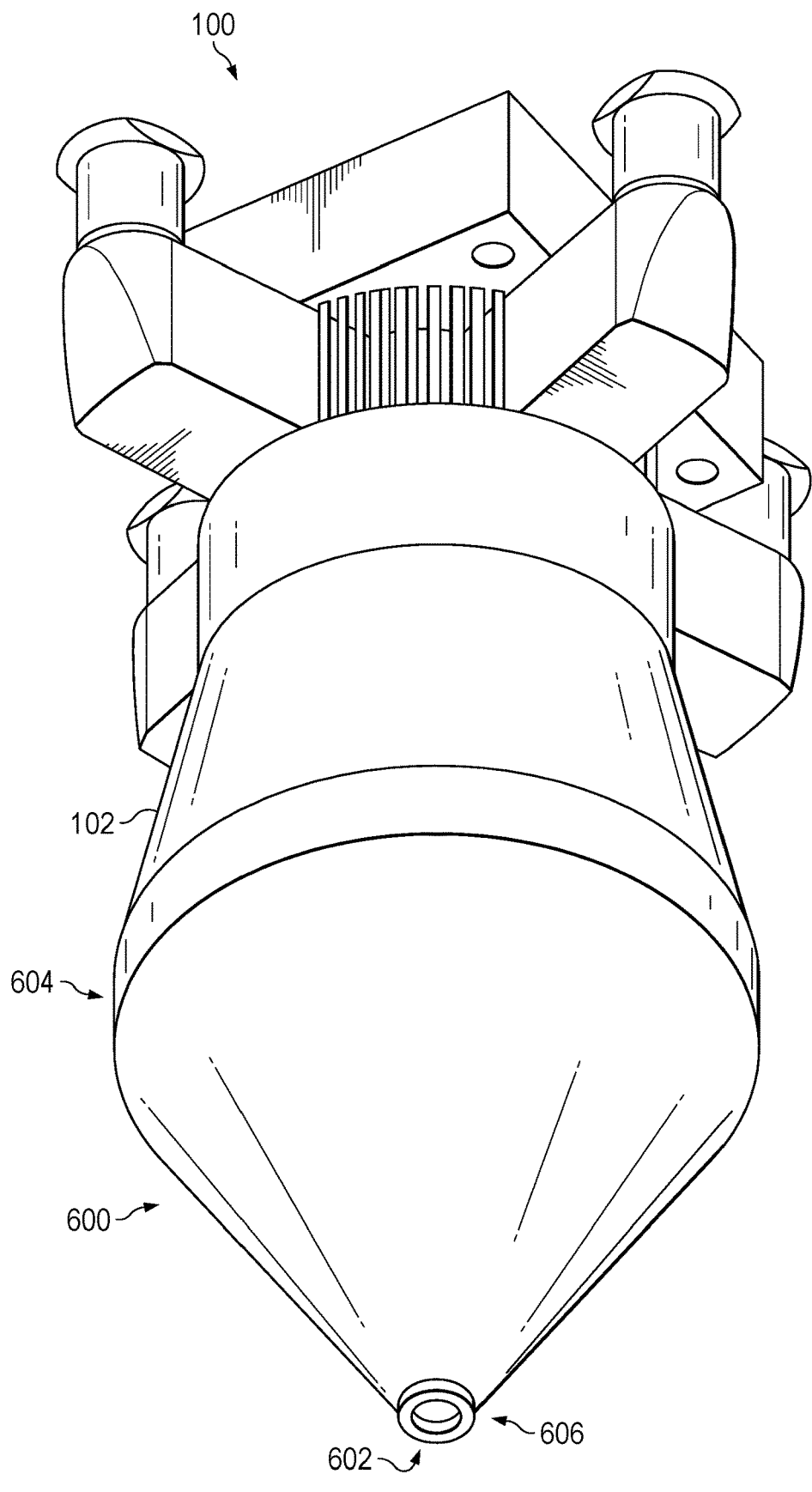
Figure 6C:
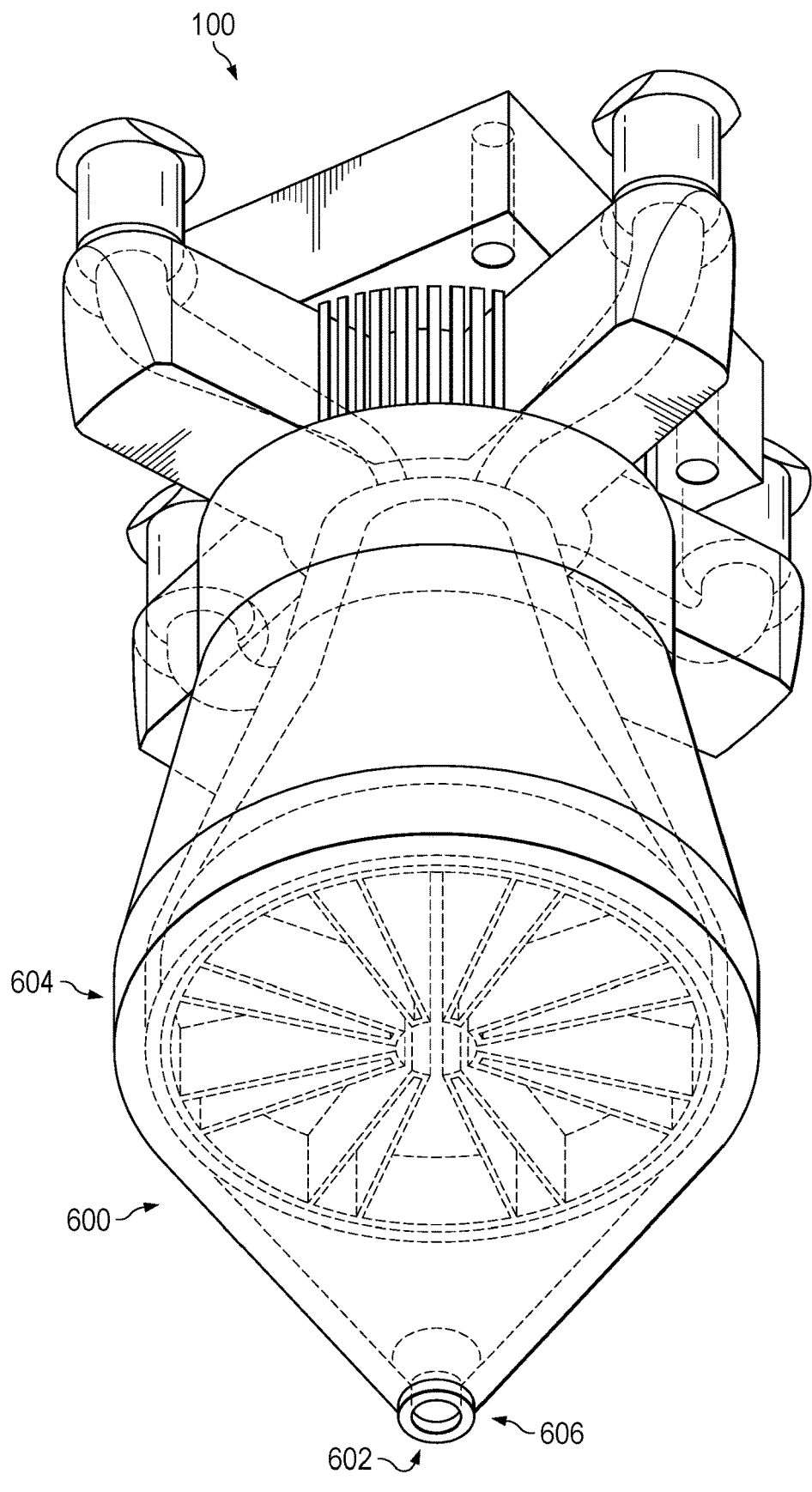

To improve the resolution of printed features, such as the twisted or helical features described above, the nozzle 100 may further include a tapered sleeve 600 extending from the outlet end 106 of the nozzle body 102, as shown in FIGS. 6A-6C (where the tapered sleeve 600 is added in FIGS. 6B and 6C to the outlet end 106 shown in FIG. 6A). An upstream portion 604 of the tapered sleeve 600 has a first diameter large enough to encompass the one or more outlets 110, and a downstream portion 606 of the tapered sleeve 600 has a second diameter smaller than the first diameter. The tapered sleeve 600 may be removably attached to or integrally formed with an external wall of the outlet end 106. For example, the tapered sleeve 600 may surround the outlet end 106, or may be flush with the outlet end 106. The tapered sleeve 600 may have a flat tip, as shown in FIGS. 6B and 6C, where a plane flush with a downstream outlet 602 of the tapered sleeve may be perpendicular to a centerline of the tapered sleeve 600. Alternatively, the tapered sleeve 600 may have a beveled or bent tip, where a plane flush with the downstream outlet 602 may not be perpendicular to the centerline of the tapered sleeve 600. The nozzle body 102 itself may have a similar geometry at the outlet end 106. In one example, the nozzle body 102 may have a flat tip. In such a case, a plane flush with the outlet end 106 may be perpendicular to the centerline of the nozzle body 102. Alternatively, the nozzle body 102 may have a beveled or a bent tip. In such examples, a plane flush with the outlet end 106 may not be perpendicular to the centerline of the nozzle body 102.

Figure 8A:
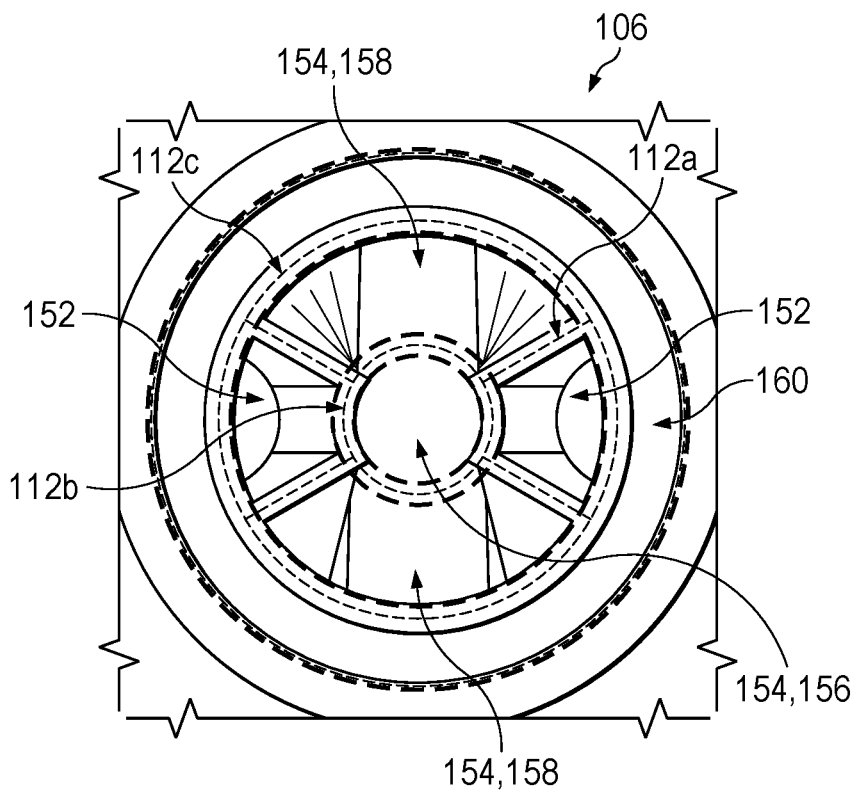
FIGS. 8A and 8B show a view of an outlet end of an exemplary nozzle body that includes two fan outlets, a core-fan outlet with two fan portions, and a shell outlet.
Figure 8B:
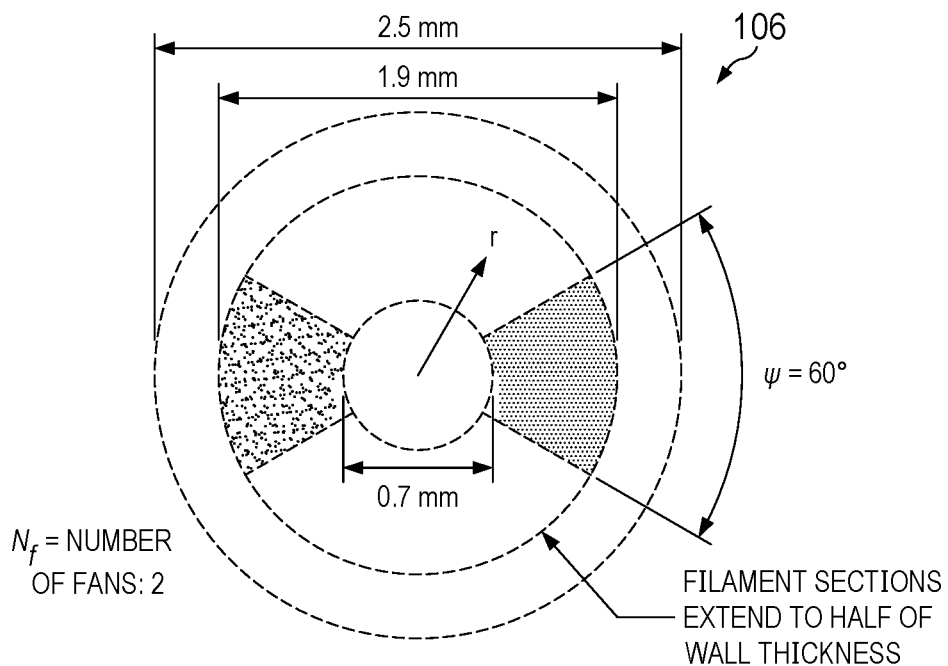
Figure 9A:
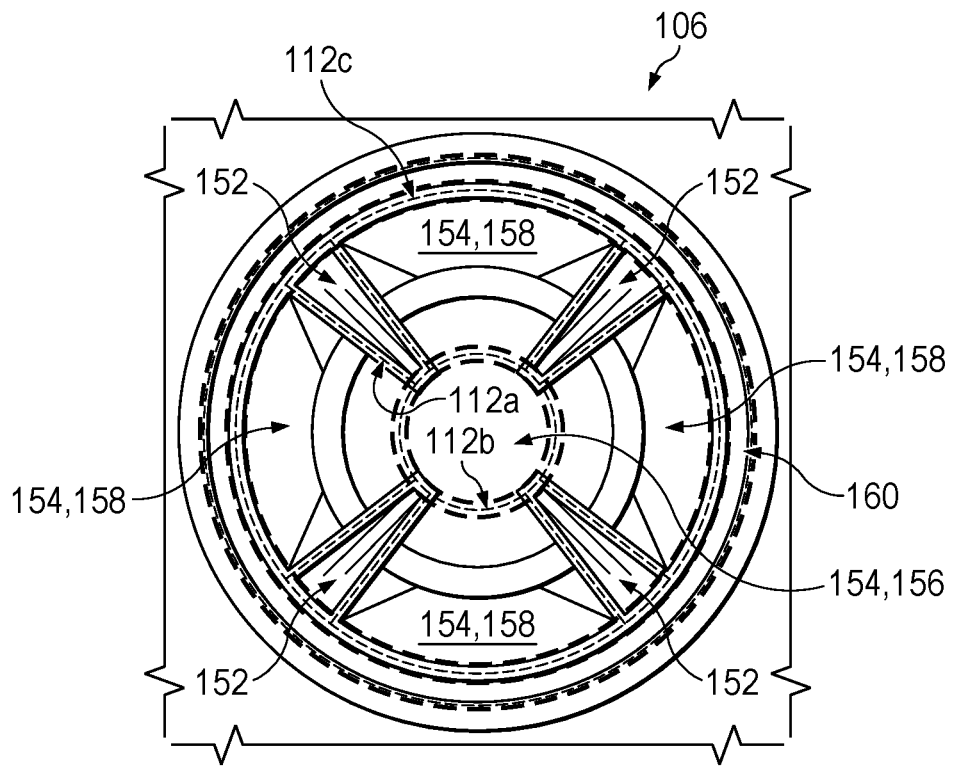
FIGS. 9A and 9B show an outlet end of an exemplary nozzle body that includes four fan outlets, a core-fan outlet with four fan portions, and a shell outlet.
Figure 9B:
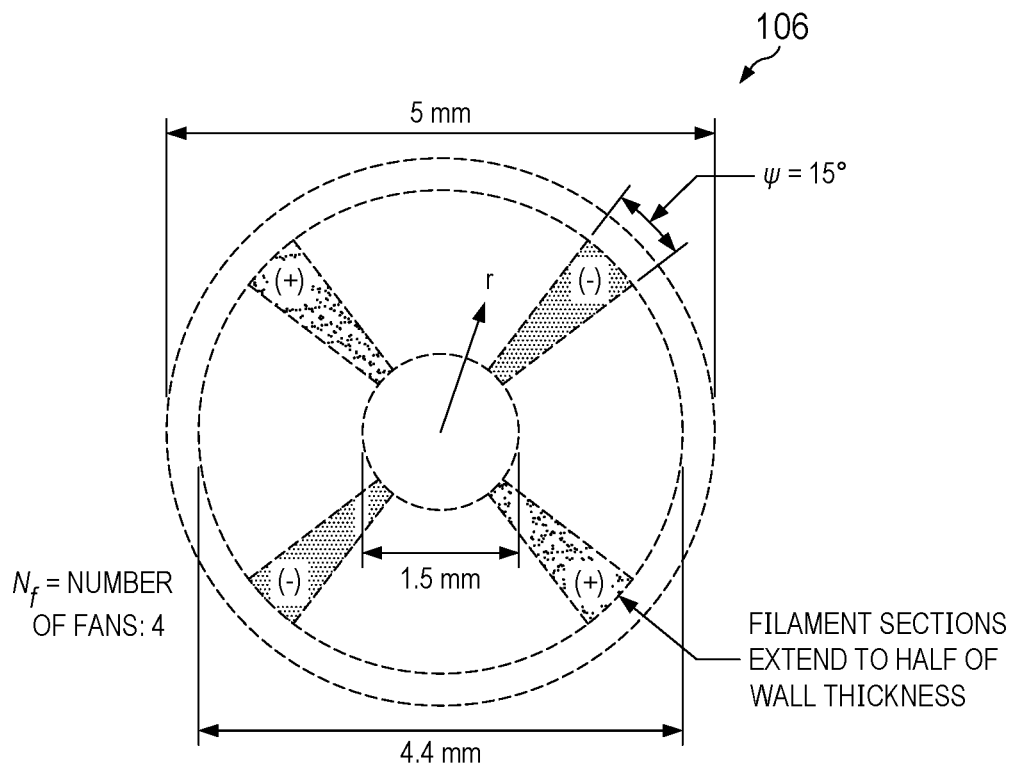

Returning again to the exemplary nozzle 100 shown in FIG. 2C, the internal walls 112 may include, at least at the outlet end 106 of the nozzle body 102, one or more radially aligned walls 112a, circumferentially aligned walls 112b, and/or circumferentially continuous walls 112c. Individually, the internal walls may have a thickness in a range from about 0.01 mm to about 1 mm. The internal walls 112 define the shape and size of the outlets 110. As shown in FIG. 2C and in FIGS. 8A and 8B, the outlets 110 may include fan outlets 152, where each fan outlet 152 is defined by a pair of radially aligned walls 112a joined to a circumferentially aligned wall 112b positioned a radial distance away from a centerline of the nozzle body 102. During rotation and translation of the nozzle 100, the fan outlets 152 may extrude twisted or helical traces that wrap around a hollow or filled core region. The same or different flowable inks may be delivered through the multiple fan outlets 152 to form the twisted or helical traces, as shown in FIG. 8C. The fan outlets 152 may be constructed such that the volume fraction of the flowable ink extruded through each outlet 152 is constant with radial position r, where r=0 at the centerline. Each of the fan outlets 152 may span an angle Ψ in a range from about 1° to about 160°. More typically, the angle ψ is in the range from about 2° to about 90°. Referring to FIGS. 9A and 9B, the outlet end 106 of the nozzle body 102 may include from 2 to 100, from 4 to 20, or from 6 to 12 of the fan outlets 152. There may be an even number of the fan outlets 152, and accordingly, an even number of the radially aligned walls 112a at the outlet end 106. The fan outlets 152 may be symmetrically or asymmetrically arranged about the centerline of the nozzle body 102. It is noted that any dimensions shown in the figures are exemplary only and not intended to be limiting.

The outlets 110 may further include a core-fan outlet 154 comprising a core portion 156 positioned about the centerline and partly surrounded by the circumferentially aligned walls 112b, and fan portions 158 extending radially away from the core portion 156 between the fan outlets 152. The number of fan portions 158 may equal the number of fan outlets 152. Since the fan portions 158 are continuous with the core portion 156, it is typical that a single flowable ink is extruded from the core-fan outlet 154. During rotation and translation of the nozzle 100, the core-fan outlet 154 may extrude twisted or helical traces continuous with an axially extending core region comprising the selected flowable ink, as can be seen in FIG. 8C. The twisted or helical traces extruded through the fan portions 158 separate the twisted or helical traces extruded through the fan outlets 152. Accordingly, each fan portion 158 may define a separation angle between adjacent fan outlets 152; the smaller the separation angle, the closer the axial spacing of the twisted or helical traces extruded through the fan outlets 152. The separation angle (and thus the axial distance between the twisted or helical traces) may be reduced by increasing the number of the fan outlets 152 and/or increasing the angle ψ of each fan outlet 152. In addition, the radial extent of the core portion 156 may define the radial length of the fan portions 158 and the fan outlets 152, where a smaller core portion 156 allows for a larger radial length of the fan portions 158 and the fan outlets 152. The core portion 156 may have a diameter in a range from about 1% to about 80%, from about 2% to about 60%, or from about 4% to about 40% of an inner diameter of the nozzle body 102; for example, the core portion 156 may have a diameter in a range from about 0.05 mm to about 4 mm, from about 0.1 mm to about 3 mm, or from about 0.2 mm to about 2 mm for a nozzle body 102 having an inner diameter of about 5 mm.

The outlets 110 may also include a shell outlet 160 surrounding the fan outlets 152 and the fan portions 158, and separated therefrom by a circumferentially continuous wall 162. More specifically, the shell outlet 160 may be bounded by the circumferentially continuous wall 162 and an outer wall (that is, an outermost inner wall) 122 of the nozzle body 102. In some examples, the shell outlet 160 may have a width in a range from greater than 0 to about 0.5 mm, or from about 0.1 to about 0.4 mm.

In the illustrated examples of the nozzle 100, the radially aligned walls 112a do not extend to the centerline of the nozzle body 102. In other examples, the radially aligned walls may extend all the way to the centerline of the nozzle body so as to define circular sector (e.g., pie slice shaped) outlets for the flowable inks. Consequently, the outlets 110 may not in all cases include the core-fan outlet 154. It is also noted that, in the illustrated examples of the nozzle 100, the circumferentially aligned walls 112b are not continuous about the core portion 156. However, in other examples, the circumferentially aligned walls may form a circumferentially continuous wall about the core portion. Consequently, the fan outlets may be directly adjacent to each other instead of being separated by fan portions of a core-fan outlet.

Figure 10A:
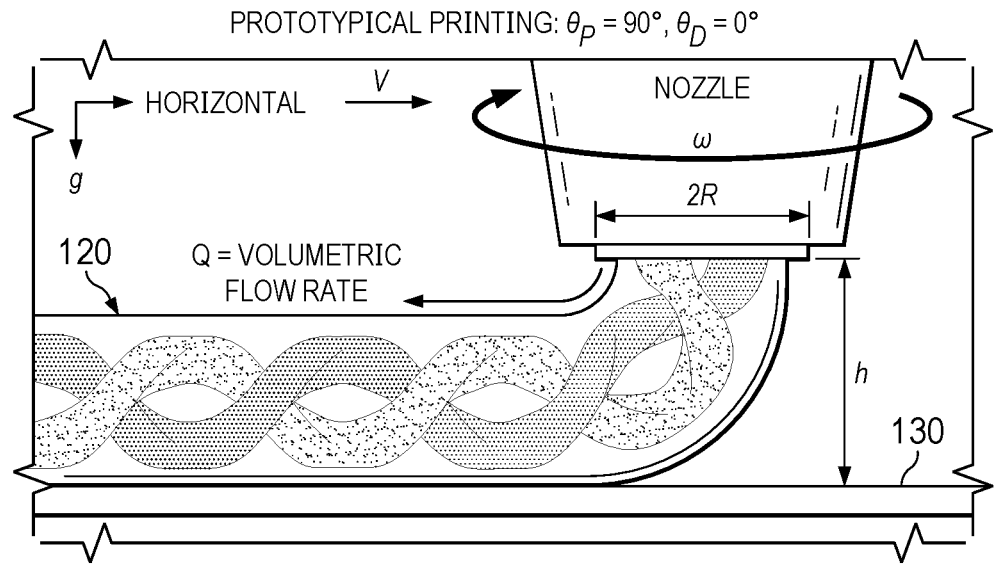
FIGS. 10A-10C illustrate different printing configurations (prototypical, angled, and vertical) where the nozzle orientation and/or angle of filament deposition are varied.
Figure 10B:
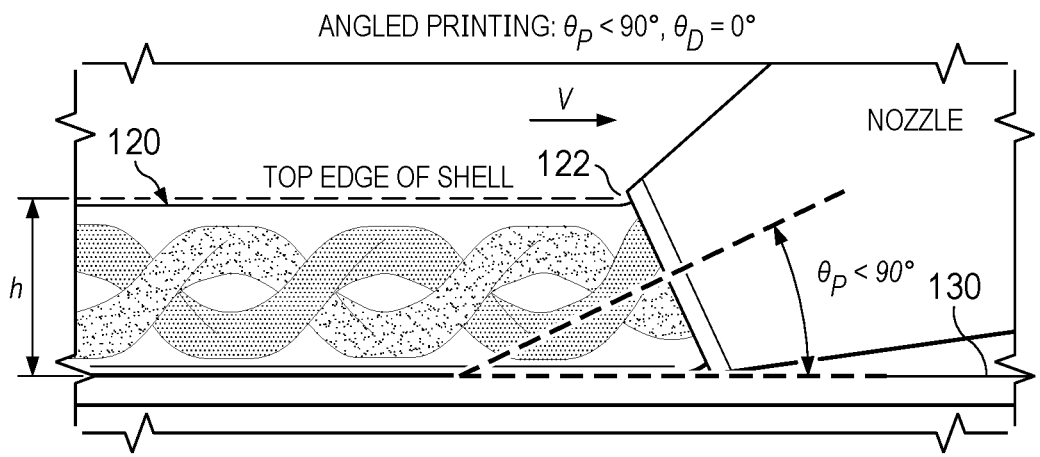
Figure 11:
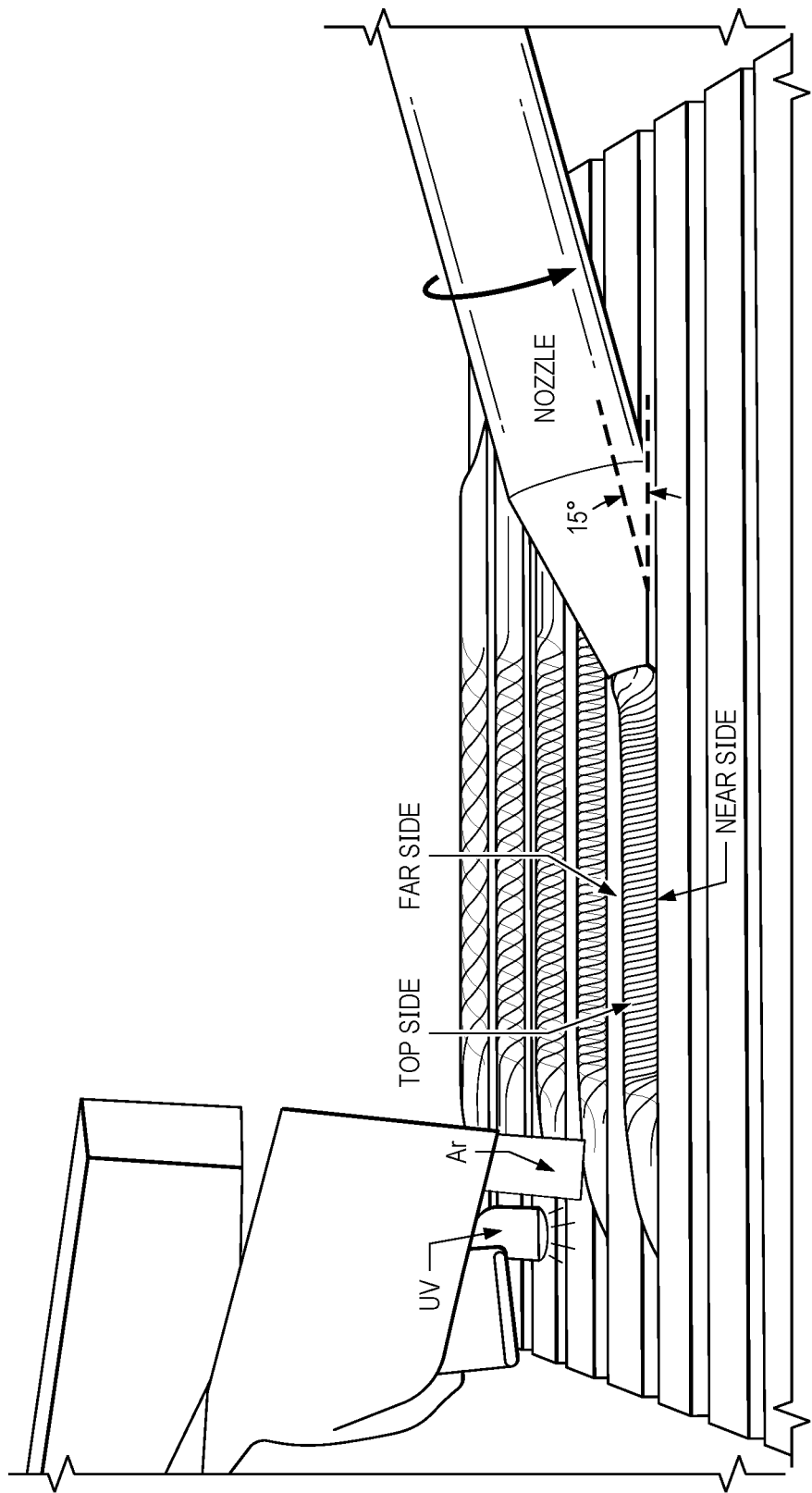
FIG. 11 shows exposure of a multimaterial filament to UV radiation after deposition on a substrate.

A method of printing multimaterial filaments that may include oriented, twisted and/or helical features is also described. It is understood that references to "the nozzle 100" and/or "the printhead 200" in the context of the method described below may refer to any nozzle and/or printhead configured to print a multimaterial filament, including any nozzle 100 and/or printhead 200 described in this disclosure. Referring to FIGS. 10A and 10B, the method includes delivering flowable inks into the one or more internal passageways of the nozzle 100, extruding a multimaterial filament 120 comprising the flowable inks from the nozzle body 102, and, during the extrusion, rotating the nozzle 100 about an axis and translating the nozzle 100 with respect to a substrate 130, thereby defining a print path, and depositing the multimaterial filament 120 on the substrate 130, which may be a print stage. It is noted that the phrase "translating the nozzle 100 with respect to the substrate 130" may refer to any or all of the following situations: translating the nozzle 100 while the substrate 130 is stationary; translating or otherwise moving the substrate 130 while the nozzle is stationary 100; and translating or otherwise moving both the nozzle 100 and the substrate 130. The axis about which the nozzle 100 rotates ("axis of rotation") may be in some examples aligned with a centerline of the nozzle body 102. The multimaterial filament 120 may be deposited on the substrate 130 in a 2D or 3D pattern that is determined by the print path. For example, the multimaterial filament 120 may be deposited layer by layer in a predetermined 3D pattern to build up a 3D structure or device. The method may further comprise exposing the multimaterial filament 120 to ultraviolet (UV) radiation to effect curing or crosslinking of one or more of the flowable inks after extrusion, as illustrated for one example in FIG. 10O. The exposure to UV radiation may occur prior to, while, and/or after depositing the multimaterial filament 120 on the substrate 130, as shown in FIG. 11.

Figure 10C:
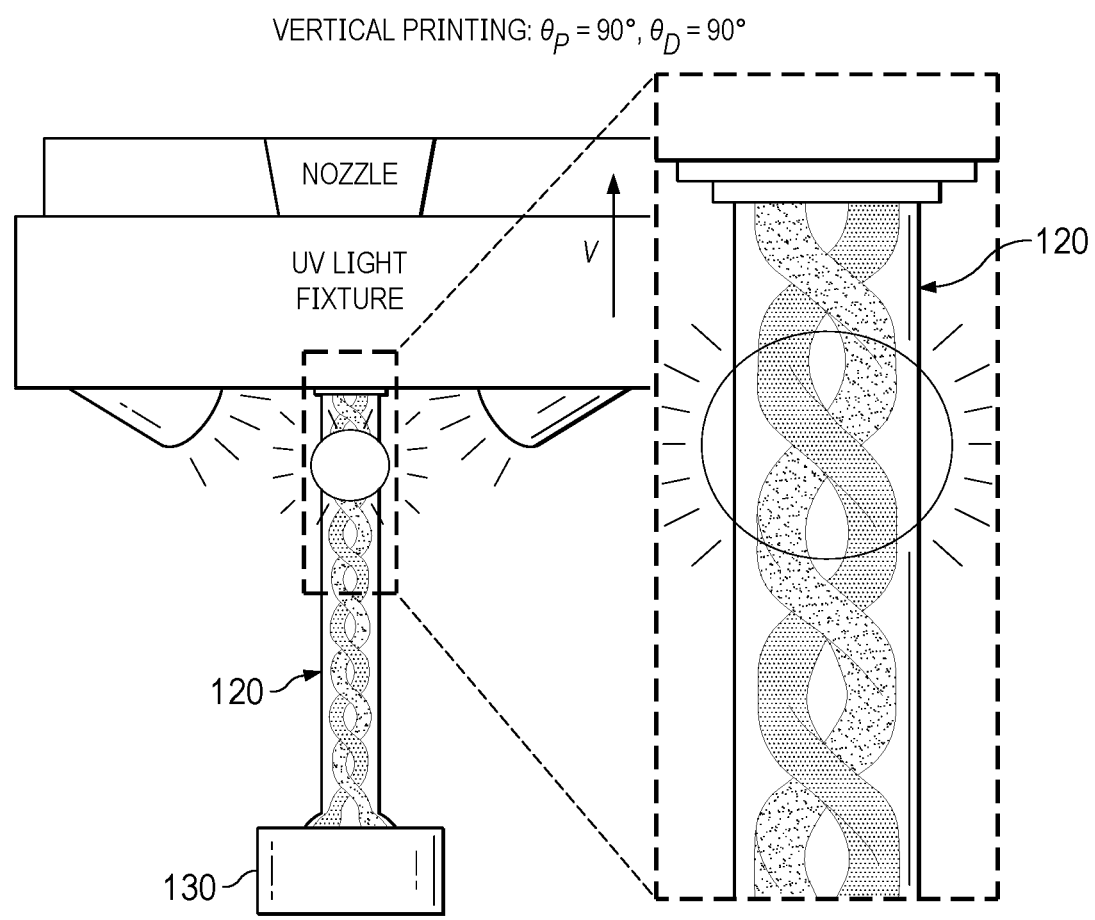

Different printing configurations may be specified by the angle ($\theta_P$) of orientation of the centerline of the nozzle body 102 with respect to the substrate 130 and the angle ($\theta_D$) at which the filament 120 is deposited on the substrate 130, as illustrated for three examples in FIGS. 10A-10C. Generally speaking the angle $\theta_P \leq 90°$ and the angle $\theta_D$ is in a range from 0° to 90°. In a typical printing configuration, $\theta_P = 90°$ and $\theta_D = 0°$, as illustrated in FIG. 10A. In an angled printing configuration, where $\theta_P < 90°$ and $\theta_D = 0°$, the gap height, h, may be defined as the vertical distance between the substrate 130 and a top edge of the outer wall (that is, the outermost inner wall) 122 of the nozzle body 102, as shown in FIG. 10B. In a vertical printing configuration, the centerline of the nozzle body 102 is oriented vertically and the filament 120 is deposited vertically as the nozzle 100 moves in the positive z direction, or a normal direction away from the substrate 130, where $\theta_P = 90°$ and $\theta_D = 90°$. In some examples, the substrate 130 may comprise a spool which is rotated to collect the multimaterial filament 120 as it is deposited. To improve the mechanical stability and integrity of the multimaterial filament 120 in the vertical printing configuration, the multimaterial filament 120 may be exposed to UV light immediately upon extrusion from the nozzle to effect UV curing "on the fly," as indicated in FIG. 100.

Figure 3B:
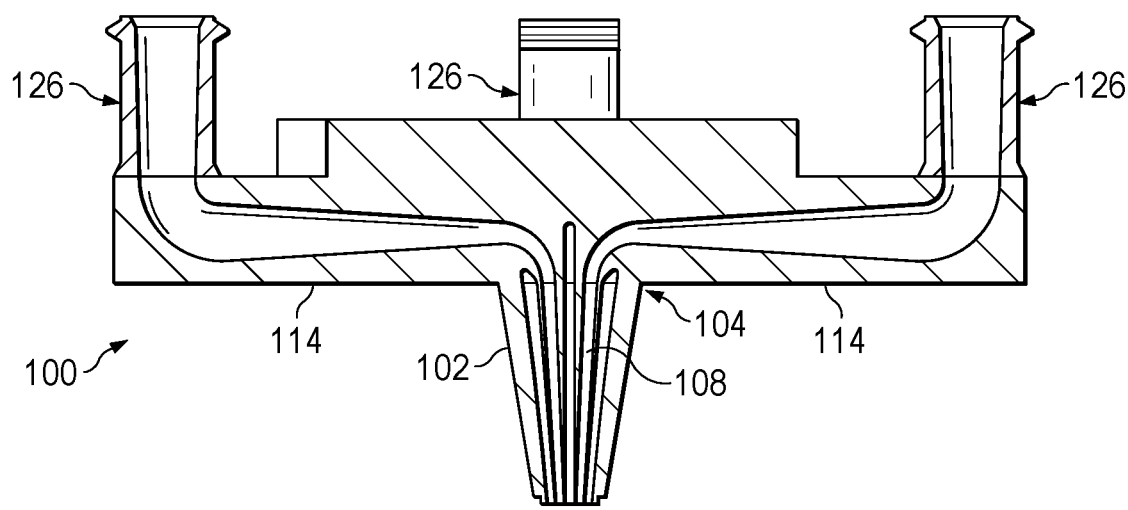
Figure 4A:
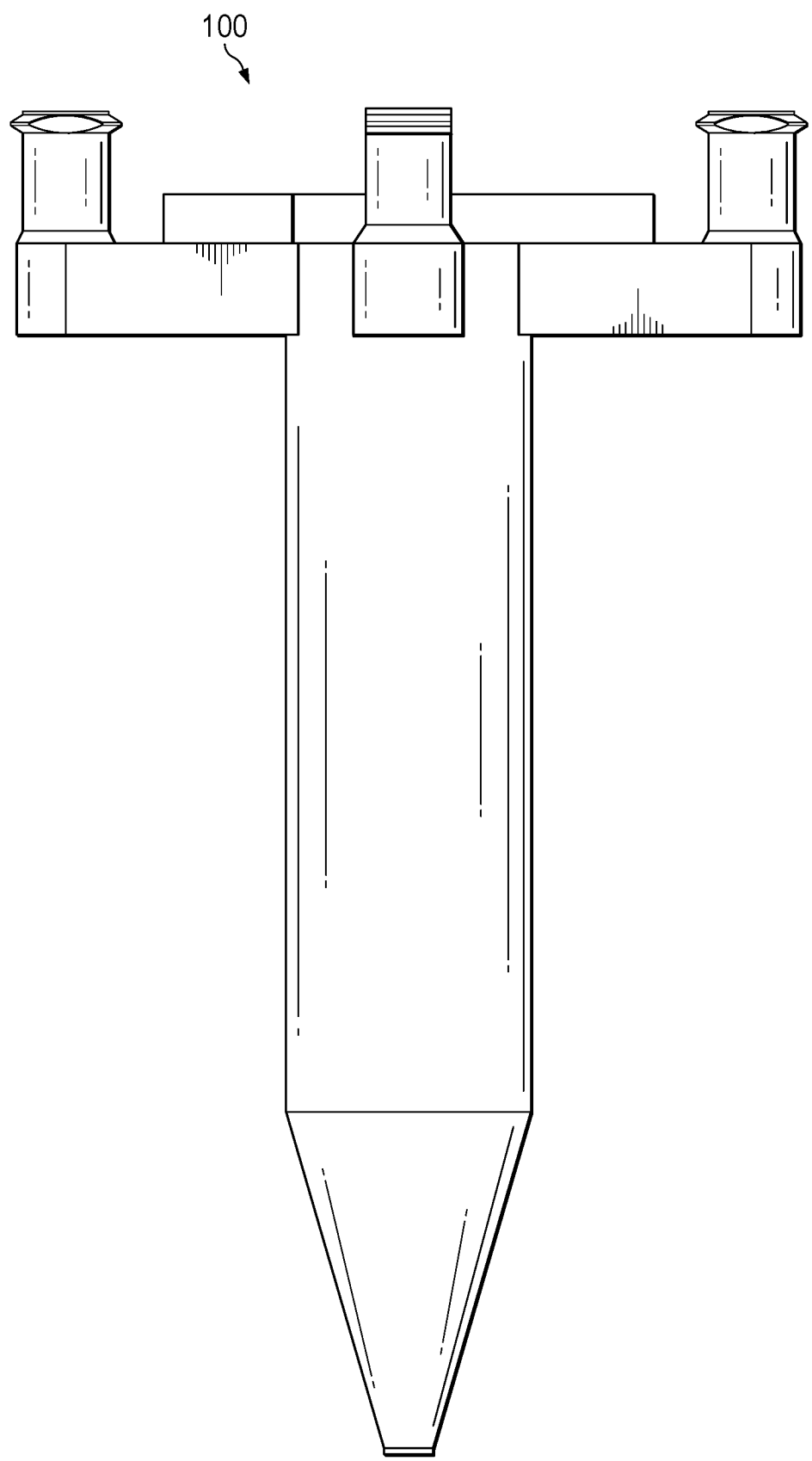
FIGS. 4A and 4B show side view and cross-sectional view schematics, respectively, of another exemplary nozzle, which includes a nozzle body having a longer axial length than that shown in FIGS. 3A and 3B.
Figure 4B:
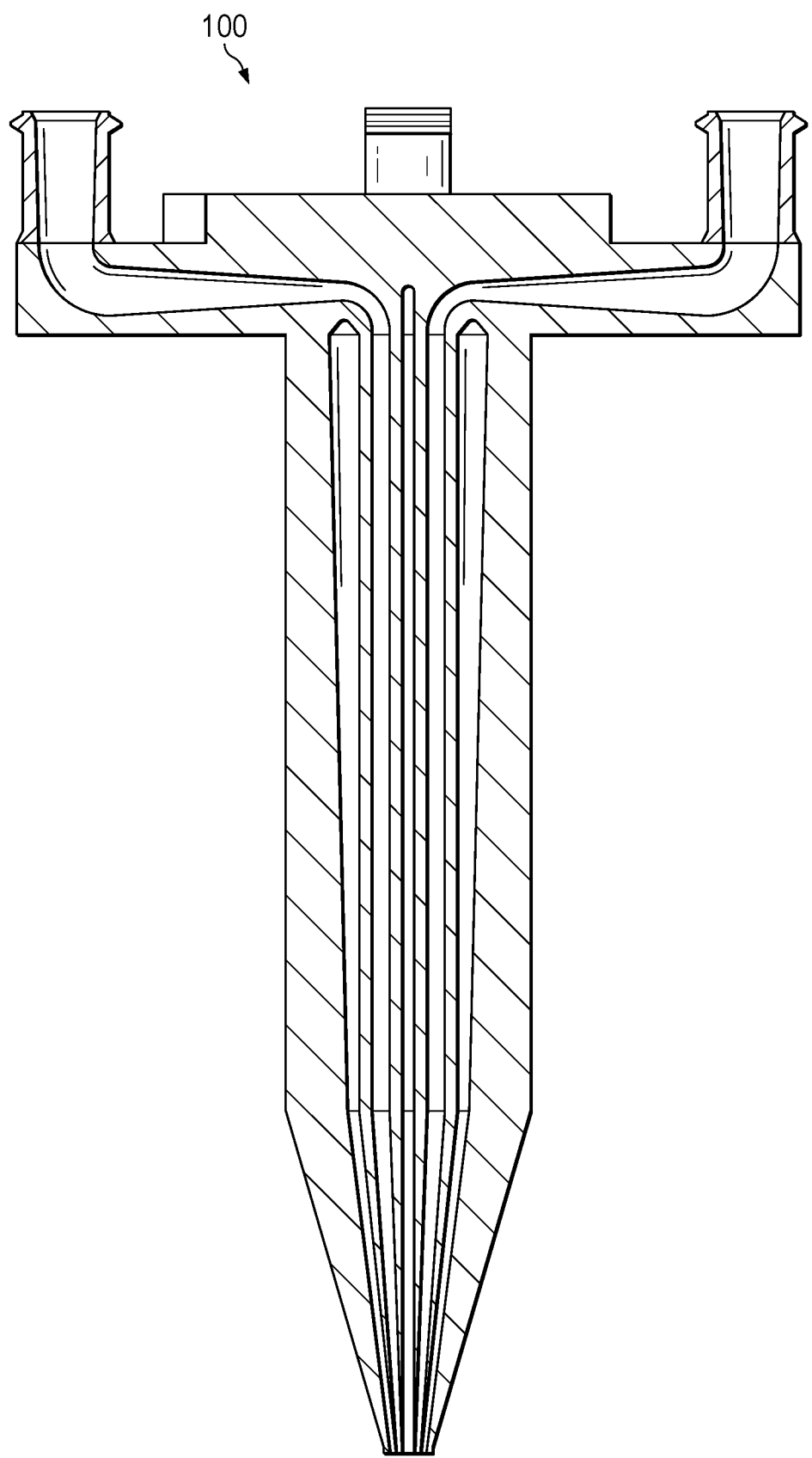

As illustrated in FIGS. 3B, 4B, and 5, the nozzle 100 may further include a plurality of inlets 114 for delivery of the flowable inks into the one or more internal passageways 108, where each inlet 114 is in fluid communication with a dispensing end 116 of an ink cartridge 118. Notably, during the extrusion, the nozzle 100 and the ink cartridges 118 may rotate together about the axis as a nozzle-ink cartridge assembly. Accordingly, references to rotation of the nozzle 100 or nozzle body 102 in this disclosure may be understood to apply more broadly to the nozzle-ink cartridge assembly.

The multimaterial filament 120 deposited on the substrate 130 may include one or more oriented, twisted and/or helical features 172. In some examples, the one or more oriented, twisted and/or helical features 172 may include one or more twisted or helical traces 174 that extend along a length of the multimaterial filament 120. Referring to FIG. 8, the twisted or helical trace(s) 174 may be encapsulated by a surface layer 176 that extends along the length of the multimaterial filament 120. In such an example, the twisted or helical trace(s) 174 may be said to be embedded in the multimaterial filament 120. Also or alternatively, the twisted or helical trace(s) 174 may surround a core region 178 extending along the length of the multimaterial filament 120, and which may also be described as being embedded in the multimaterial filament 120. It is understood that the twisted or helical traces 174, the core region 178 and/or the surface layer 176 may extend along part or all of the length of the multimaterial filament 120.

Figure 12:
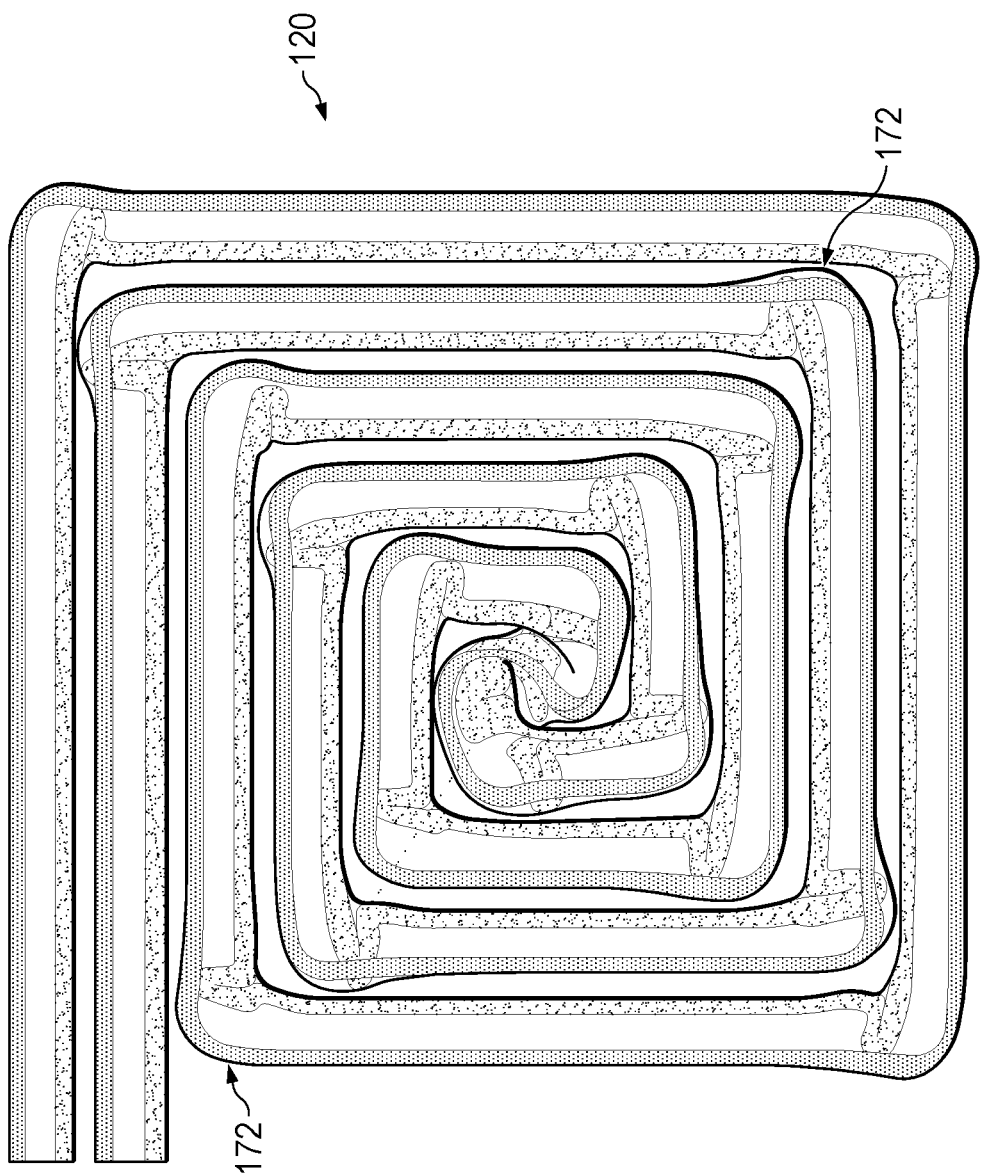
FIG. 12 shows a multimaterial filament formed by extrusion from a nozzle translating relative to a substrate and undergoing intermittent (as opposed to continuous) rotation.
Figure 13A:
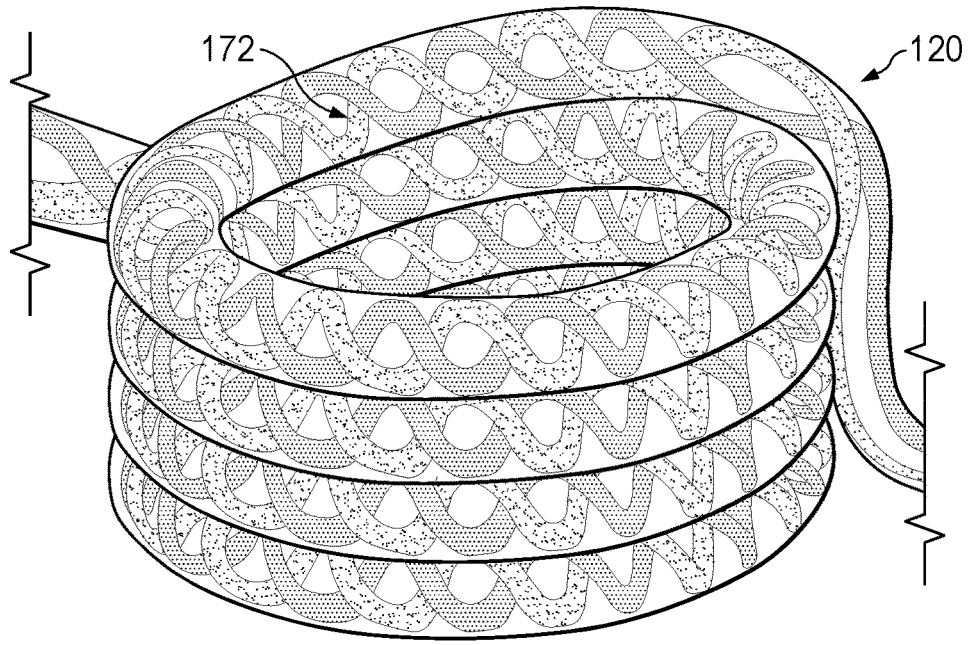
FIG. 13A shows a helical superstructure formed by multiple nozzle rotations that occur continuously as the nozzle is translated over 360° with concurrent motion away from the substrate.
Figure 13B:
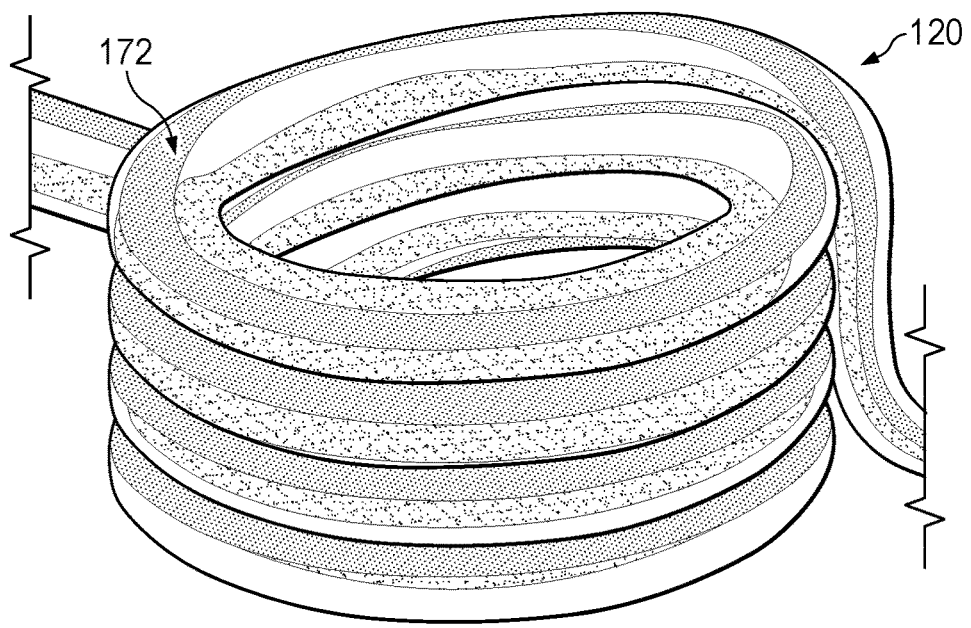
FIG. 13B shows a helical superstructure formed by a single (slow) nozzle rotation as the nozzle is translated over 360° with concurrent motion away from the substrate.

Rotation of the nozzle 100 during the extrusion may be discontinuous, such that the nozzle body 102 undergoes rotation (only) at discrete location(s) along the print pathIn other words, as the nozzle 100 is translated with respect to the substrate 130, the nozzle body 102 may undergo intermittent and/or partial rotation (e.g., less than or equal to 360° rotation) to produce the desired oriented, twisted and/or helical features 172 in the multimaterial filament 120, as shown for example in FIG. 12. Alternatively, rotation of the nozzle 100 during the extrusion may be continuous, such that the nozzle body 102 undergoes rotation at all locations along the print path and yields a multimaterial filament 120 including oriented, twisted and/or helical features, as illustrated for example in FIGS. 13A and 13B. In FIG. 13A, the multimaterial filament 120 is formed by multiple nozzle rotations that occur continuously as the nozzle 100 is translated over 360° while moving away from the substrate (in a z-direction), and in FIG. 13B, the multimaterial filament 120 is formed by a single (slow) nozzle rotation as the nozzle 100 is translated over 360° while moving in the z-direction. Notably, the sub-filament geometry is different, although both multimaterial filaments 120 are deposited in the same 3D spiral pattern.

As indicated above, angular velocity, $\omega$, of the rotating nozzle may be controlled during printing, e.g., by a stepper motor, as discussed above. The ratio of the angular velocity to the translational velocity, $\omega/v$, during printing may determine the shear field and ultimately the theoretical helical angle, $\phi(r)=\tan^{-1}(r\omega/v)$, of features within the multimaterial filament. A dimensionless rotation rate, $\omega^*=R\omega/v$ (units: radians), can be defined, where R is the inner radius of the nozzle body at the outlet end, as a measure of the maximum idealized shear field imposed by the rotation and translation of the nozzle during printing. The dimensionless rotation rate, $\omega^*$ may lie in a range from 0 to 5000, from 0 to 1000, from 0 to 100, from 0 to 15, and/or from 5 to 15, as illustrated in examples below. Also defined is a dimensionless printing gap height, $h^*=h/2R$, where h is the height of the nozzle body above the substrate and R is the inner radius of the nozzle body at the outlet end. The dimensionless printing gap height, $h^*=h/2R$, may be in a range from greater than 0 to 10, from greater than 0 to 7, and/or from greater than 0 to 4. Finally, a dimensionless volumetric flow rate, $Q^*=Q/(v\pi R^2)$, is defined, where Q is the sum of the flow rates $Q_i$ for each internal passageway or channel. $Q^*$ is equal to 1 when the filament radius is equal to the inner radius of the nozzle.

Figure 14:
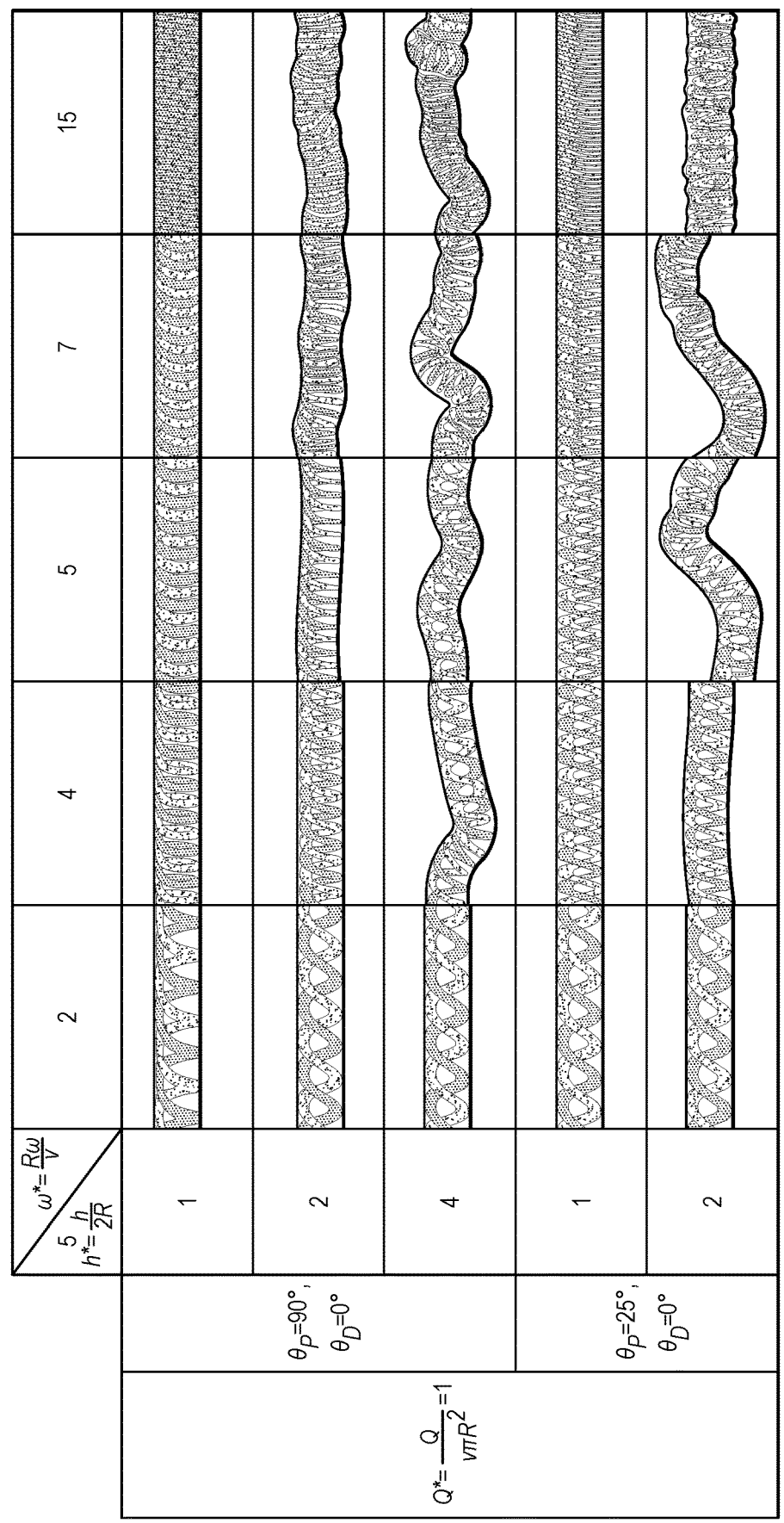
FIGS. 14 and 15 show examples of multimaterial filaments printed under different combinations of parameters (e.g., $\theta_P$, $\theta_D$, $\omega^*$, $h^*$ and/or $Q^*$).
Figure 15:
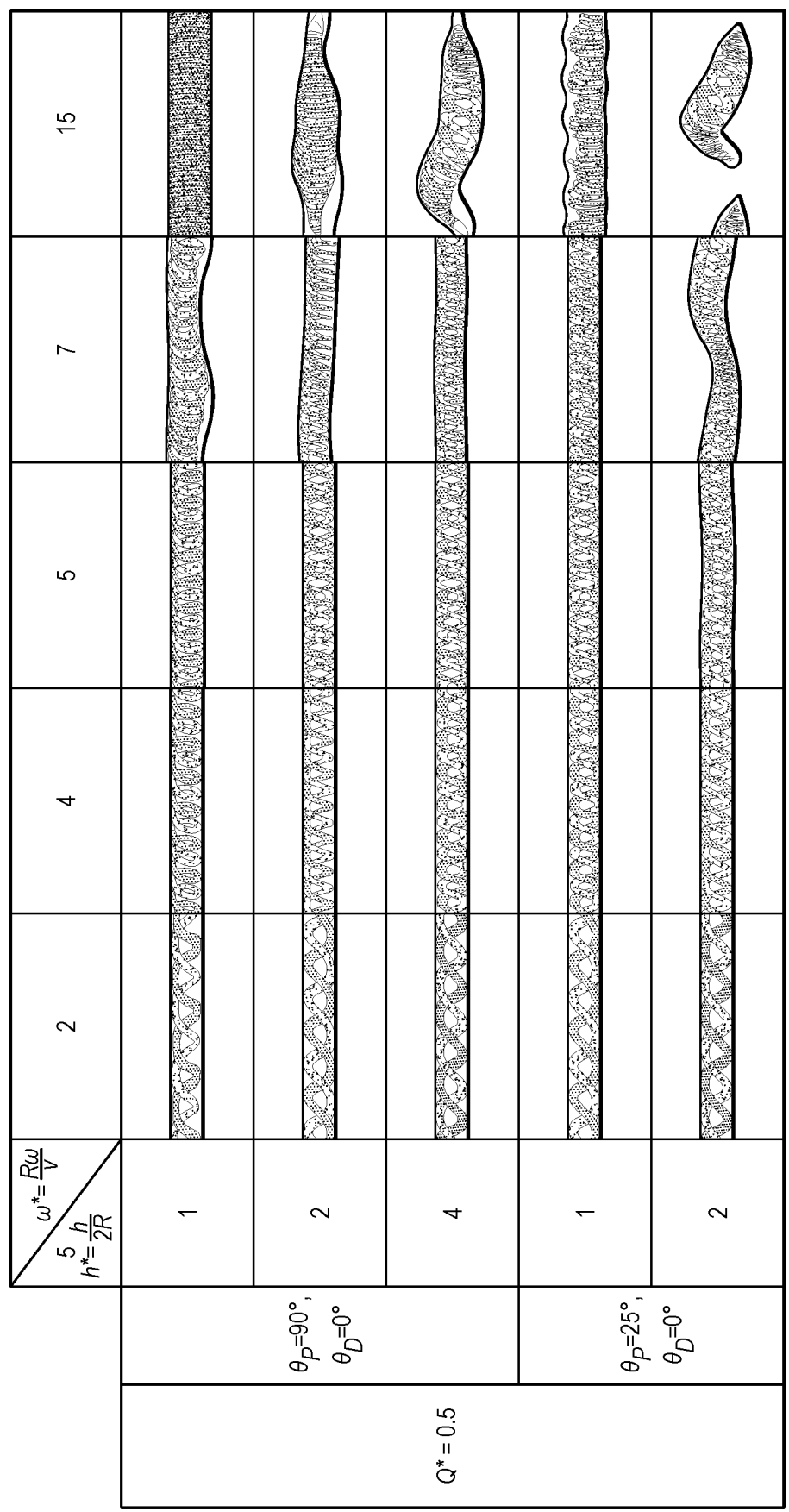

Multimaterial filament and sub-filament geometries may be influenced by the print configuration ($\theta_P$ and $\theta_D$) as well as by $\omega^*$, $h^*$ and $Q^*$, as demonstrated by a parameter sweep of prints using, in these examples, viscoelastic polymer (e.g., PDMS) inks, as shown in FIGS. 14 and 15. The targeted geometry of the multimaterial filament is a straight cylinder with circular cross section, while the targeted sub-filament geometry comprises helical traces that may appear as sine curves from any view perpendicular to the filament axis. For a typical printing configuration ($\theta_P=90°$, $\theta_D=0°$), high values of $h^*$ and $\omega^*$ may lead to instabilities during printing that cause the multimaterial filament to become non-cylindrical or deviate from the print path, as shown in FIGS. 14 and 15. For the sub-filament geometry, a warped helical architecture is revealed by the red and blue traces, where the degree of warping becomes increasingly prominent at high $\omega^*$ and low $h^*$.

A hypothesis is that this warping is due in part to non-uniformity in forces around the circumference of the multimaterial filament that are inherent to its deposition and relaxation on a substrate, and in part to the need for the multimaterial filament to bend 90° as it is extruded from the nozzle and deposited on the substrate. In the case of particularly low $h^*$ (e.g., $h^*=1$), the 90° bend tends to occur over a relatively short vertical distance, leading to the most significant sub-filament warping. The warping effects caused by filament bending during deposition may be notably reduced when the nozzle body is oriented at a shallower angle relative to the deposition surface (e.g., $\theta_P=25°$, $\theta_D=0°$). In this case, optimal filament and sub-filament geometries may be observed for $h^*=1$. However, some degree of sub-filament warping may be inherent to printing on a substrate. In applications where warp reduction and filament symmetry are critical, vertical printing ($\theta_P=90°$ and $\theta_D=90°$) can be used to simultaneously eliminate the warping effects caused by the substrate and the bending of the filament between the nozzle and the deposition axis.

Figure 16:
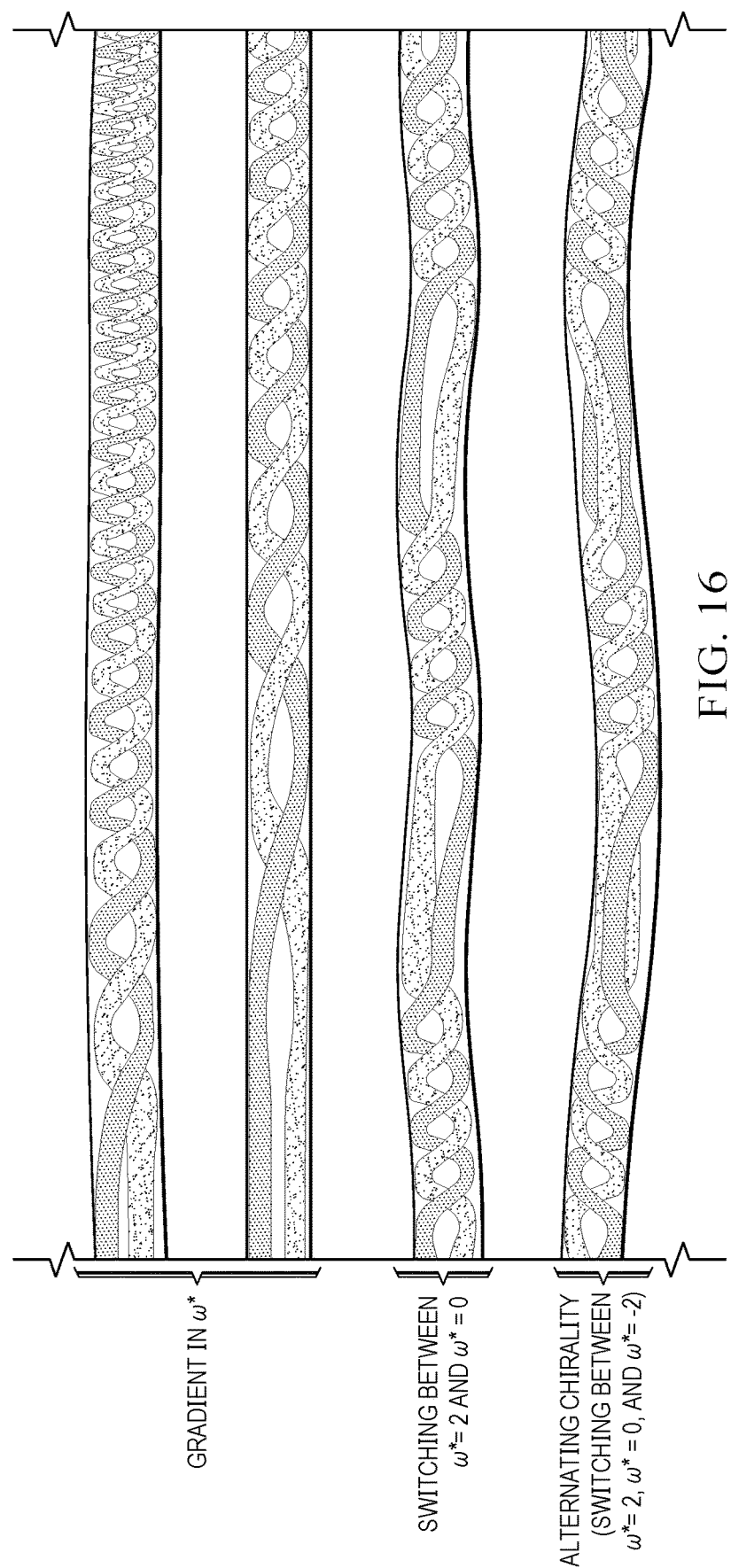
FIG. 16 shows examples of multimaterial filaments printed with gradients in $\omega^*$, switching in $\omega^*$, and alternating chirality.

To demonstrate the geometric complexity enabled by multimaterial rotational direct ink writing in 1D, multimaterial filaments are printed with gradients in $\omega^*$, switching in $\omega^*$, and alternating chirality, as shown in FIG. 16. Also demonstrated, as discussed above in reference to FIG. 12, is formation of a 2D square spiral pattern in which the nozzle is rotated at discrete locations—only at the corners—to keep the blue trace along the outside of the filaments along the square spiral print path. Finally, hierarchical helix patterning with helical print paths is demonstrated. As discussed above in reference to FIGS. 13A and 13B, different hierarchical helical structures are obtained by altering nozzle rotation along the same print path. More specifically, both examples show a helical super-structure formed by depositing a multimaterial filament 120 along a spiral or helical print path, where the sub-filament geometry (e.g., the one or more oriented, twisted and/or helical traces 172) of each super-structure differs according to the rotational velocity of the nozzle.

It has been discovered that mechanical properties of multimaterial filaments can be manipulated by controlling ω*during printing. In particular, the mechanical properties of structural "springy" filaments, which may include twisted or helical traces comprising a stiff polymer ("stiff springs") embedded within a compliant matrix formed by a soft polymer (that is, a polymer having a lower stiffness than the stiff polymer) have been evaluated as a function of ω*.

Figure 17:
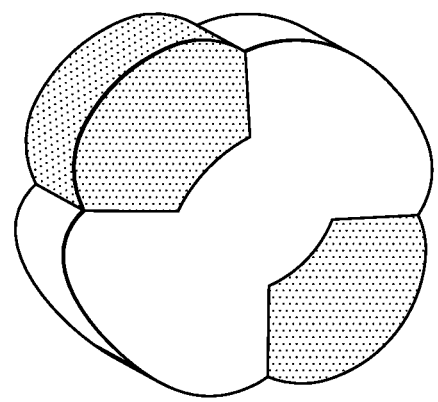
FIG. 17 shows a transverse cross-section of a multimaterial filament printed from a nozzle body having the outlet configuration shown in FIG. 18B.
Figure 18:
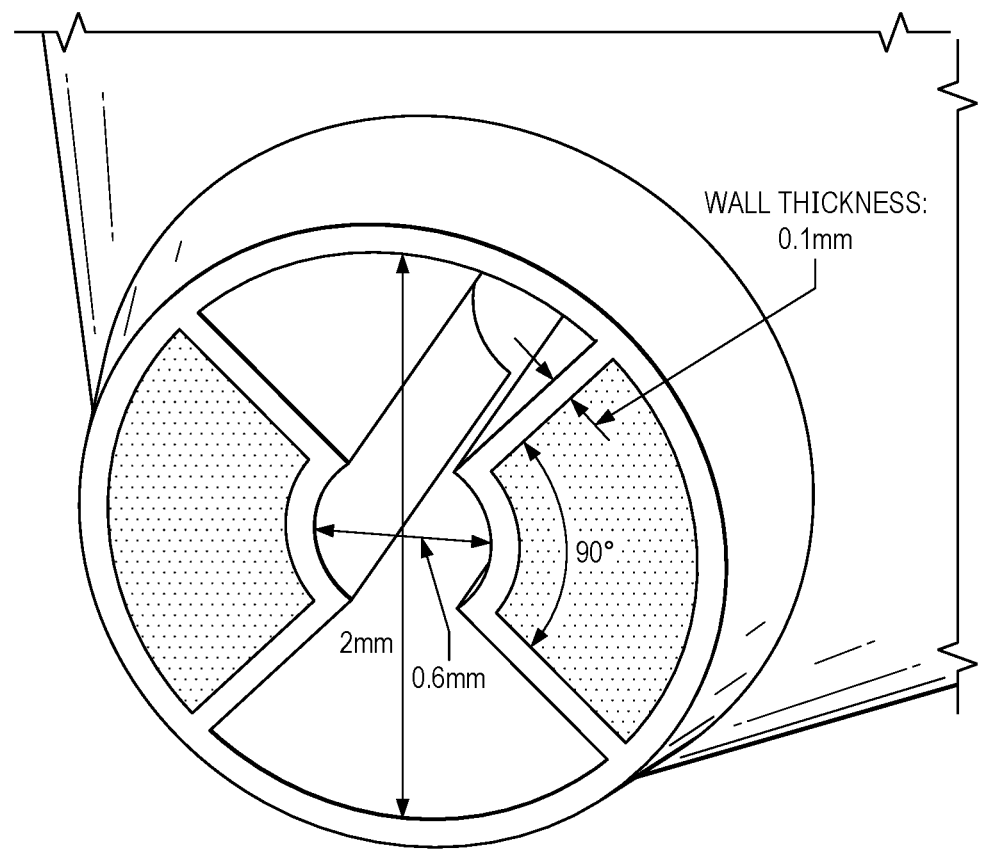
FIG. 18 is a view of the outlet end of a nozzle body including a core-fan outlet and two fan outlets.
Figure 19:
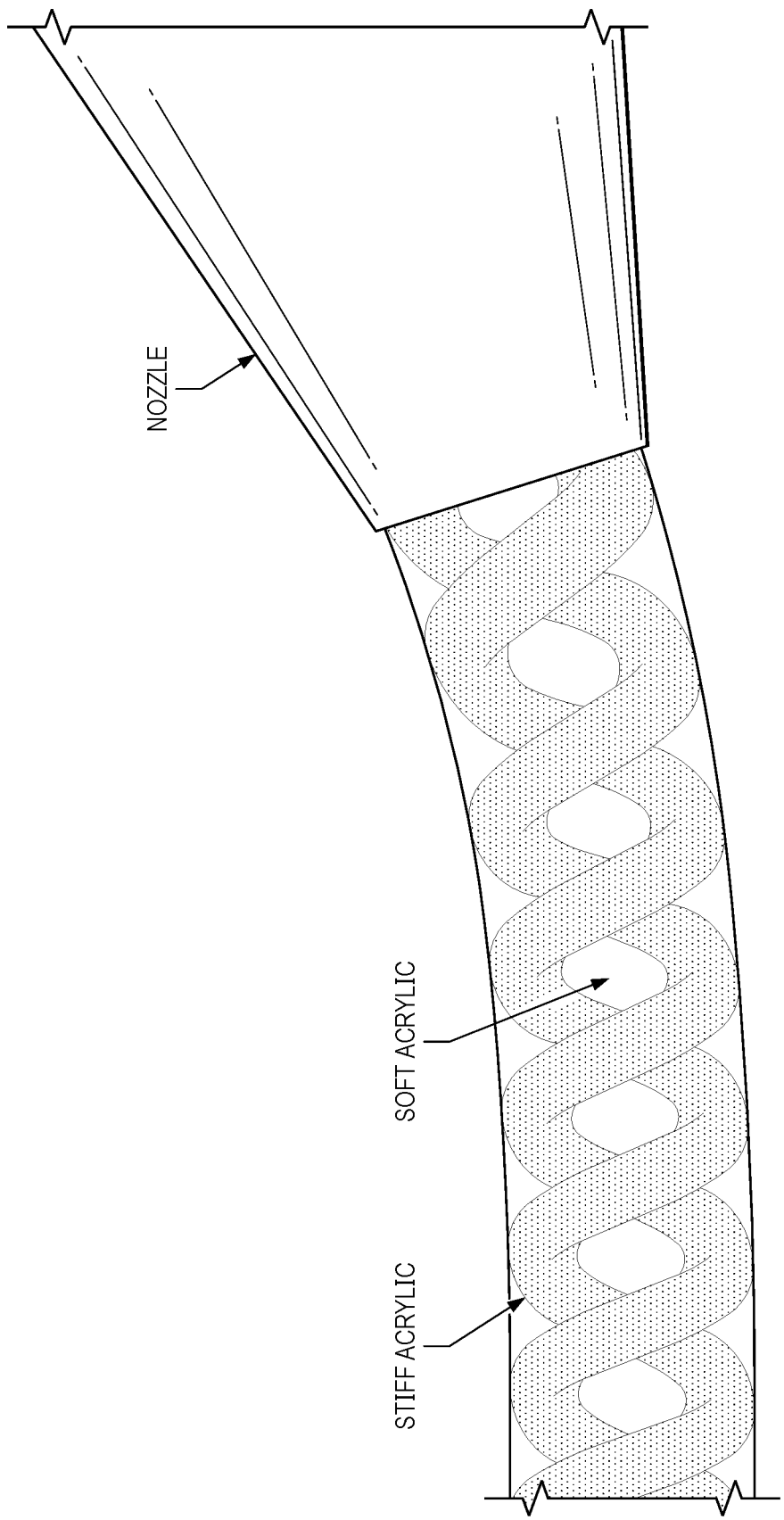
FIG. 19 is a side view of a multimaterial "springy" filament being printed from a nozzle having the outlet end shown in FIG. 18.

First, to fabricate the multimaterial filaments, two viscoelastic inks, a stiff acrylic polymer and a soft acrylic polymer, were developed. The inks exhibit shear thinning behavior with similar viscosities over a wide range of shear rates, as well as appropriate storage moduli (0.008-0.02 MPa) and shear yield stresses (0.0002-0.0003 MPa) for direct ink writing. Printing is performed at an angle (25° in this example) using a nozzle having the outlet configuration shown in FIG. 18, where the stiff acrylic polymer is extruded through the fan outlets and the soft acrylic polymer is extruded through the core-fan outlets. As shown in FIG. 19, a multimaterial filament including stiff acrylic twisted or helical traces (or "springs") in a soft acrylic matrix and having the transverse cross-section shown in FIG. 17 is printed. The multimaterial filaments are cured with UV during printing to minimize interdiffusion of the two inks after deposition. Upon curing with UV, the stiff and soft acrylic moduli differ by a factor of about 5,400, at 2,700±200 MPa and 0.50±0.05 MPa (mean±s.d.), respectively.

Figure 20A:
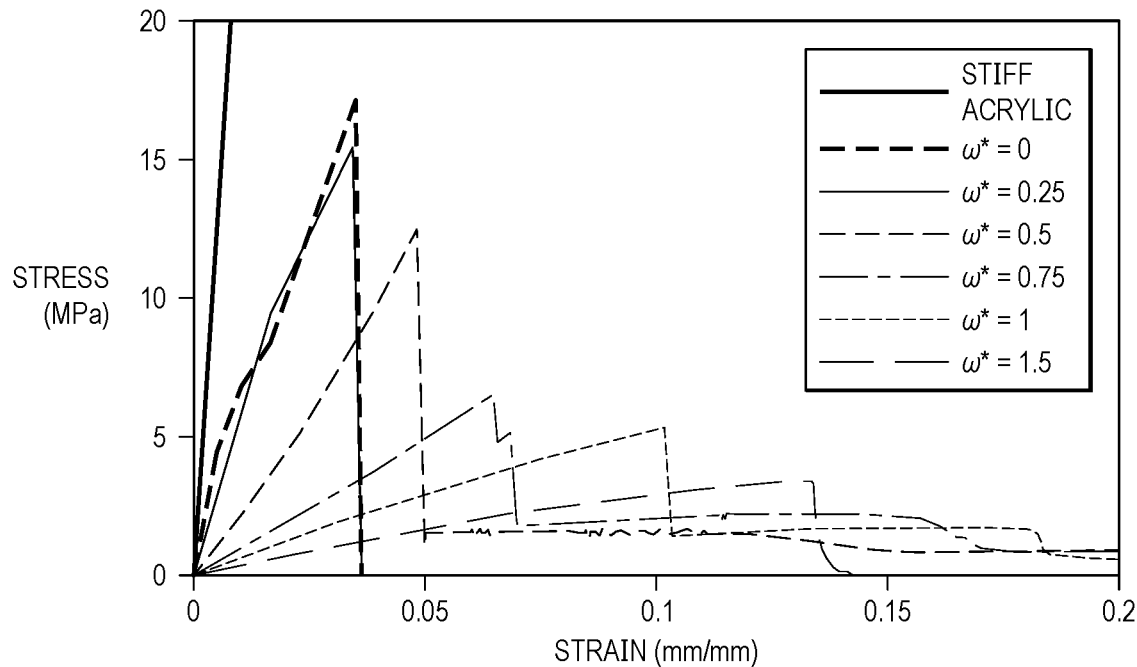
FIGS. 20A and 20B show stress versus strain for multimaterial springy filaments printed using different values of $\omega^*$.
Figure 20B:
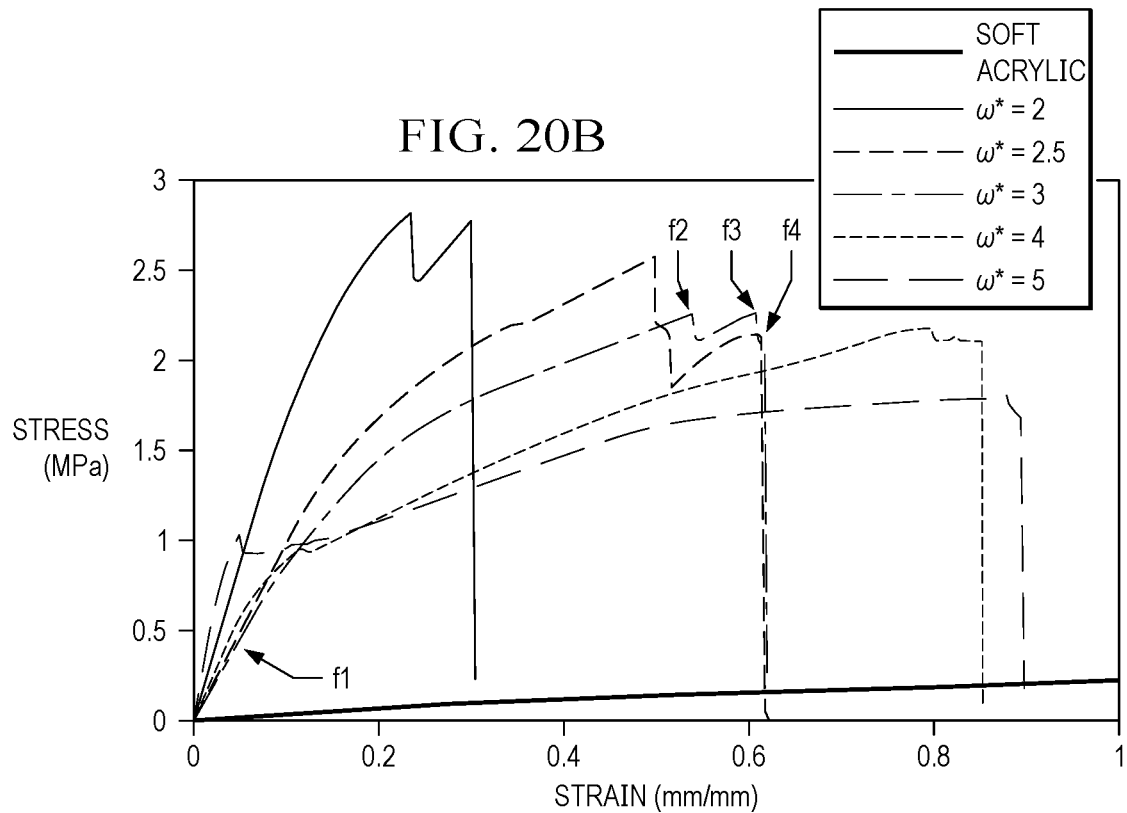
Figure 21:
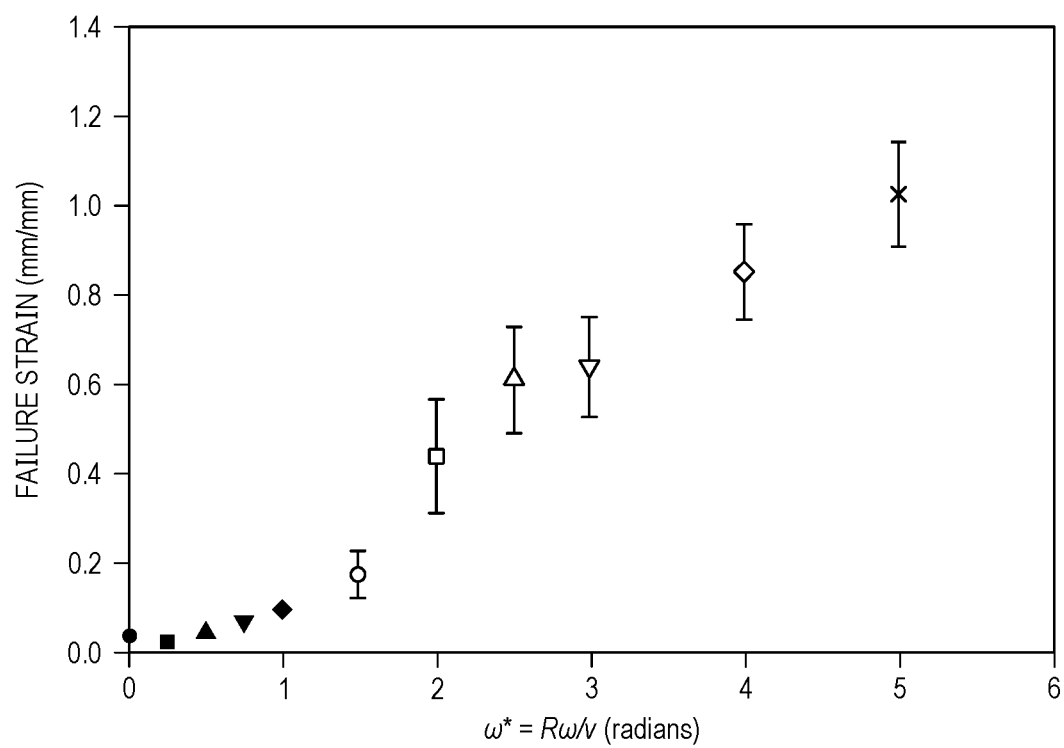
FIG. 21 shows failure strain of the multimaterial springy filaments plotted as a function of $\omega^*$.
Figure 22:
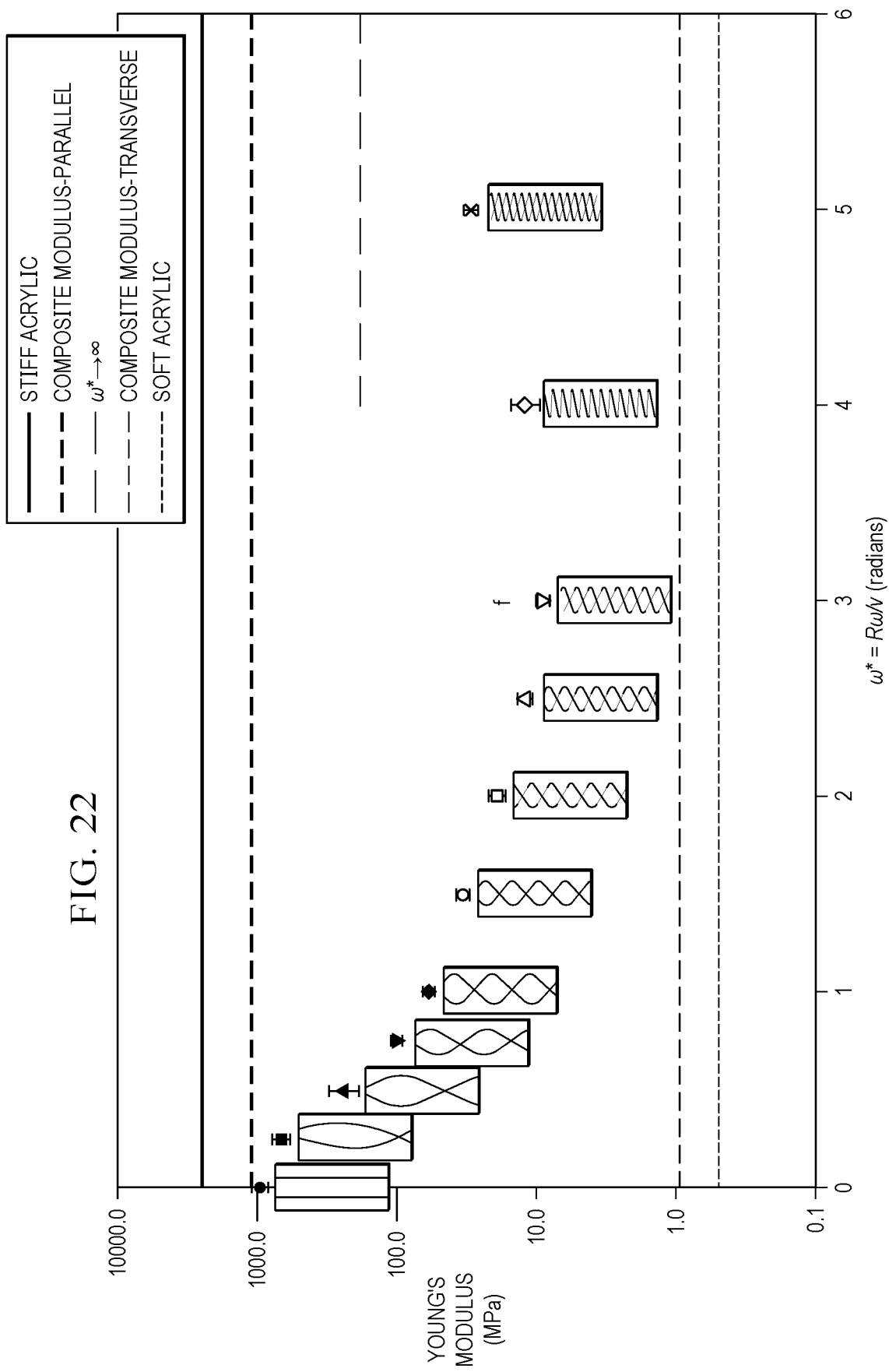
FIG. 22 shows Young's modulus of the multimaterial springy filaments plotted as a function of $\omega^*$.

As indicated above, the mechanical behavior of the multimaterial "springy" filaments can be tuned by varying ω*, as shown in FIGS. 20A and 20B. As ω* increases from 0 to 5, the tensile strain at failure increases by a factor of about 30-40, as can be seen in FIG. 21. Furthermore, referring to FIG. 22, as ω* increases from 0 to 3, the Young's modulus of the filaments decreases by about a factor of 100, from 1000±100 MPa (mean±s.d.) at ω*=0 to 9±1 MPa (mean±s.d.) at ω*=3. As ω* increases further from 3 to 5, the modulus increases slightly from 9±1 MPa to 31±3 MPa. This may be due to an increasing prevalence of an interdiffusion transition zone between the stiff and soft materials and/or due to geometric factors in filament deformation as the layer thicknesses decrease. In the extreme case in which complete interdiffusion of the stiff and soft acrylic inks occurs in the fan region (ω*→∞), the modulus may be estimated by that of a filament with fully mixed stiff and soft acrylic inks in the fan region and a soft acrylic core (partial horizontal line in FIG. 22). The estimated Young's modulus for ω*→∞ is larger than that of the springy filament with ω*=5, and thus may represent an asymptotic value approached as ω* increases. Theoretical parallel and transverse composite moduli may be estimated from the stiff and soft acrylic moduli and the volume fractions of the two materials as indicated by the light gray lines in FIG. 22. The theoretical parallel modulus (1200±100 MPa; mean±s.d.) shows relatively close agreement with the modulus of the springy filaments with ω*=0 (1000±100 MPa; mean±s.d.), as expected. Furthermore, the transverse modulus, which represents a theoretical lower limit for this system, is lower than the minimum modulus achieved for the springy filaments, as expected. These results suggest that such "springy" multimaterial filaments may be incorporated into sheets, composites, lattices, and other hierarchically designed 2D or 3D structures to enable optimization of local and component-level properties and performance.

The multimaterial filament may include, in some examples, conductive helical traces embedded in a dielectric matrix, such that the multimaterial filament is configured for use as a helical dielectric elastomer actuator, or "HDEA". HDEAs may be designed to show axial contraction (high helix angle) or elongation (low helix angle) and a slight twist upon voltage application. As indicated above, the printing approach may use a nozzle including fan, core-fan, and shell outlets ("shell-fan-core nozzle") to deposit both the dielectric matrix (via the shell and core-fan outlets) and the conductive helical traces (via the fan outlets) in one step. The flowable inks employed may comprise dielectric and conductive inks that exhibit shear thinning behavior with similar viscosities over a wide range of shear rates, along with appropriate storage moduli and shear yield stresses for printing. In this example, the dielectric elastomer ink is identical to the soft acrylic ink described above, and upon curing with UV light has a modulus of 0.50±0.05 MPa (mean±s.d.) and dielectric constant of 5.45±0.08 (mean±s.d.) at 1 kHz. The conductive ink comprises an acrylate-based matrix, a diluent, and carbon black conductive filler particles.

Figure 23B:
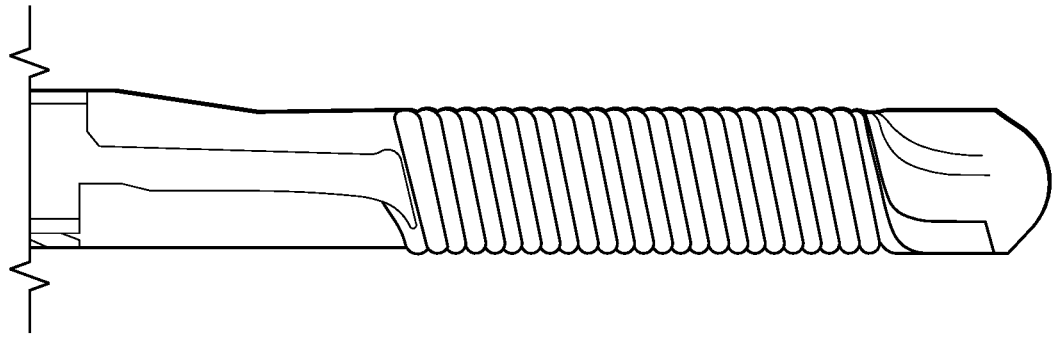
FIG. 23B is a photograph of an exemplary vertically printed HDEA.
Figure 23A:
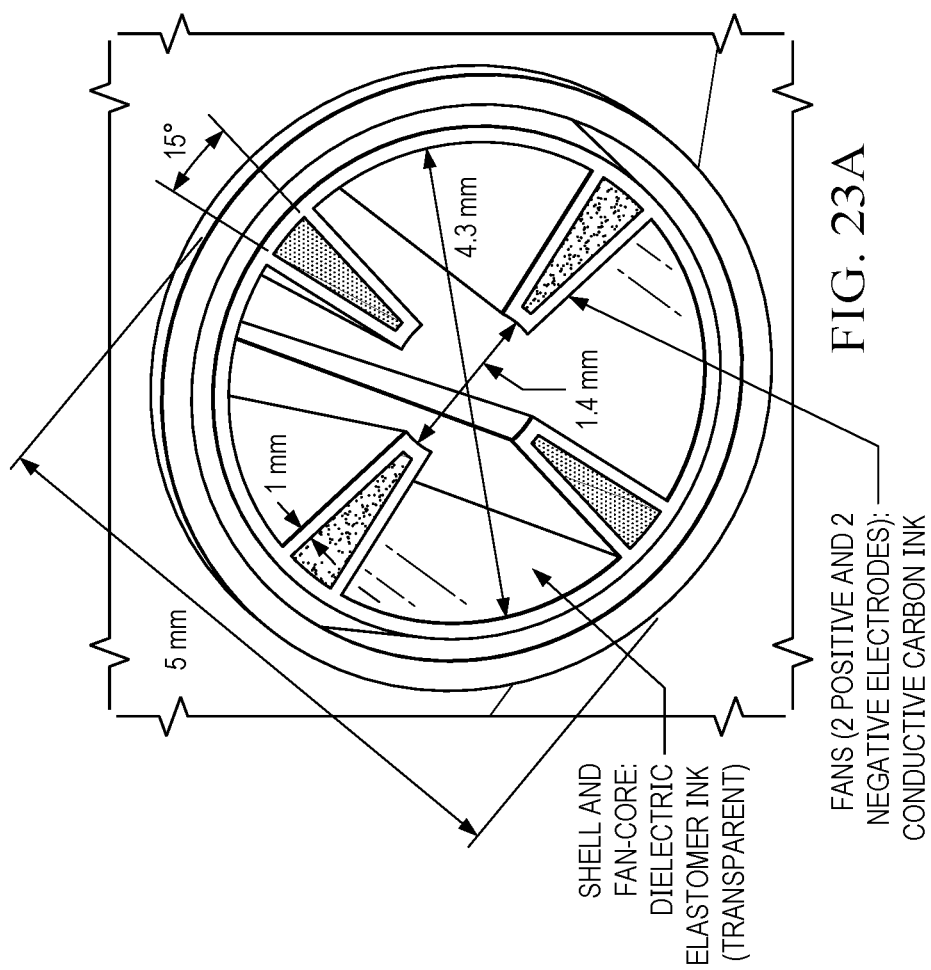
FIG. 23A shows an outlet end of an exemplary nozzle that is employed to fabricate a helical dielectric elastomer actuator (HDEA)

Printing of HDEAs may be performed using a vertical printing configuration as illustrated in FIGS. 6 and 10C. In this example, to form the HDEAs, multimaterial filaments are extruded from a 5 mm diameter shell-fan-core nozzle (e.g., see FIG. 23A) and UV-cured on-the-fly. An example of a vertically printed HDEA prior to actuation is shown in the photograph of FIG. 23B. An advantage of the vertical printing approach is excellent filament symmetry, which may be critical to fabricating HDEAs that show only axial actuation and slight twisting. Earlier experimentation with HDEA printing at an angle ($\theta_P$=15°, $\theta_D$=0°) revealed warping in the helical structure that may cause the filaments to bend in addition to axial and twisting actuation. In applications where bending actuation is of interest, however, this effect could be exploited by tailoring the degree of warping during printing.

Figure 24:
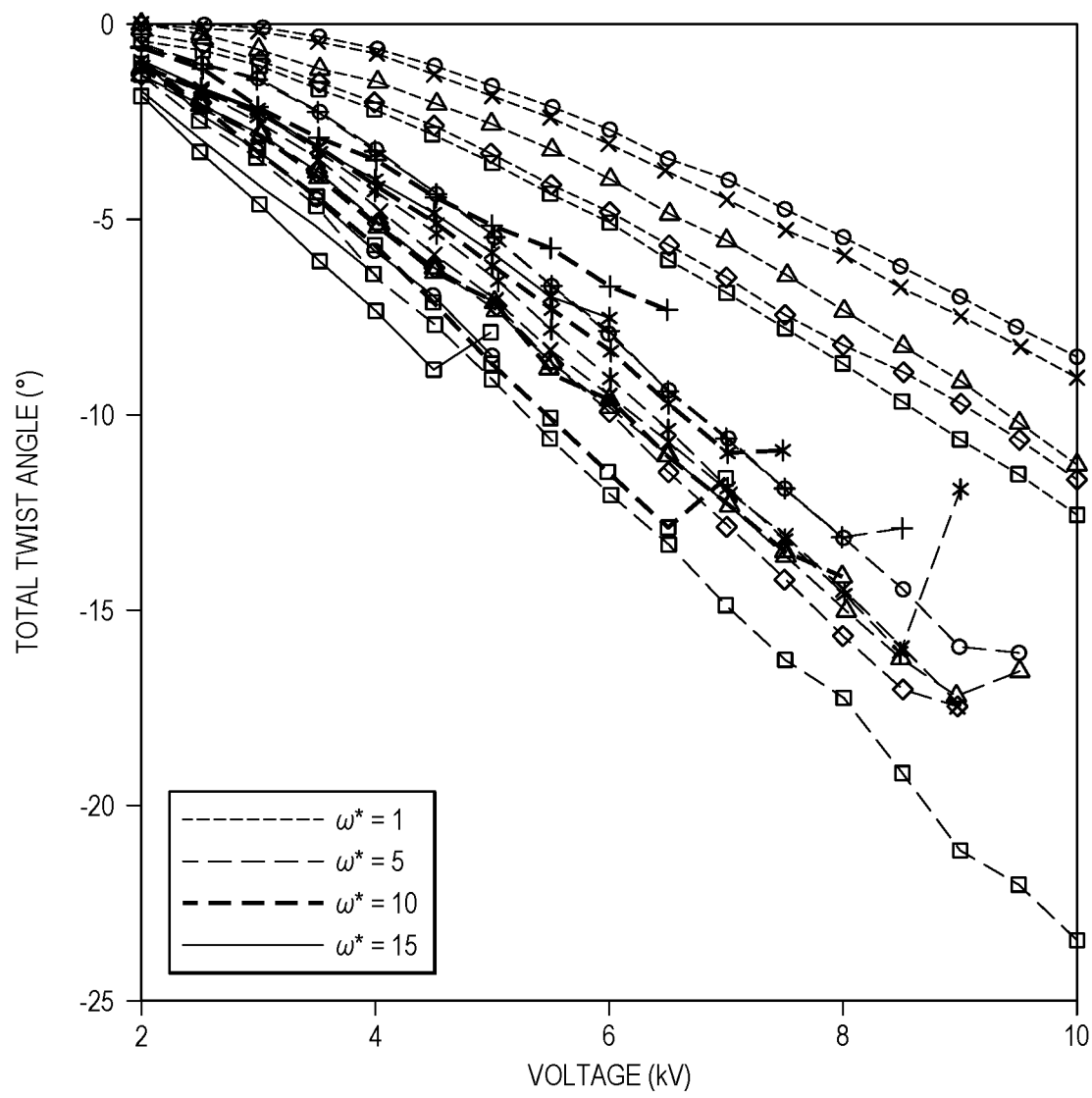
Figure 26C:
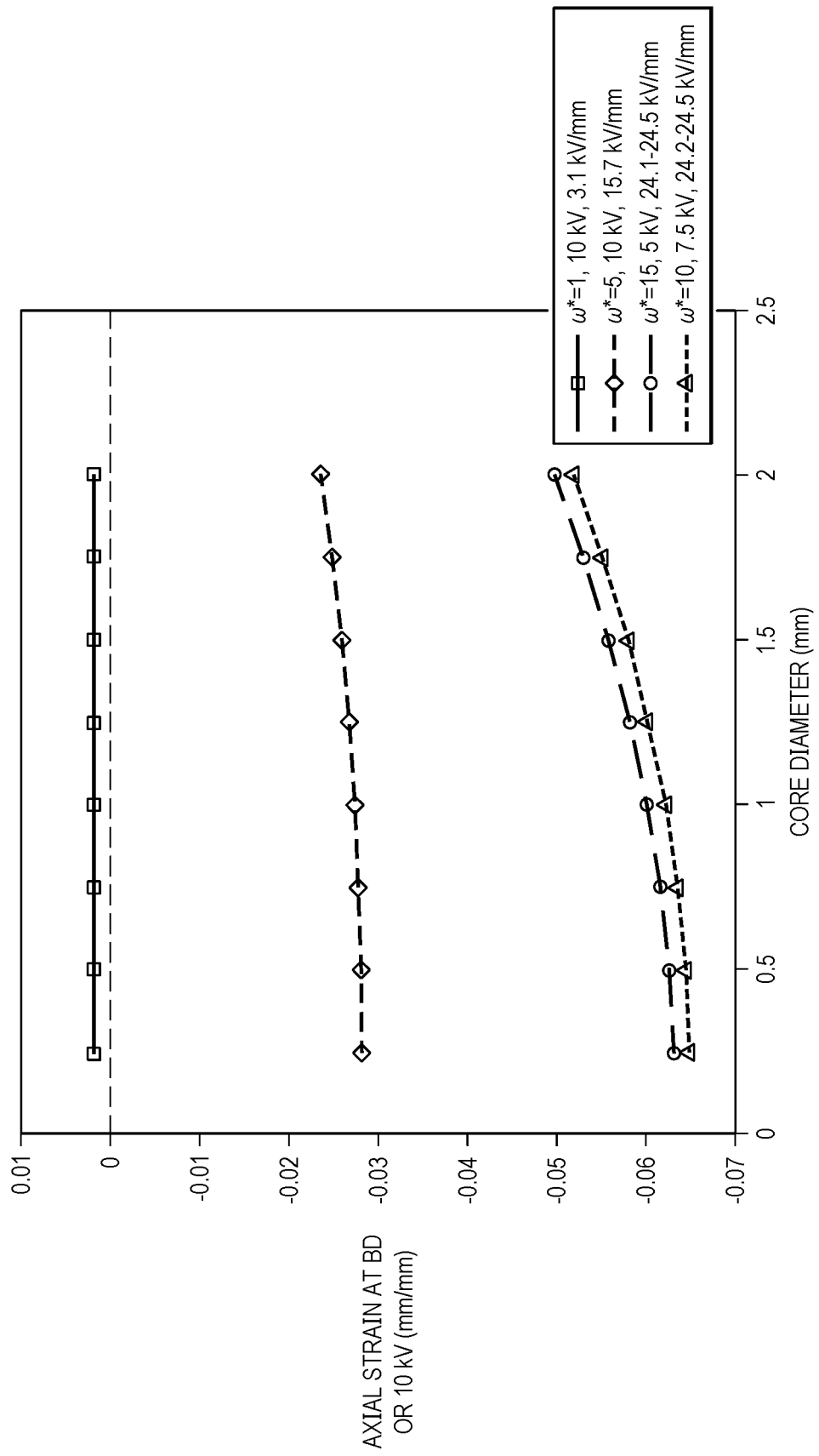
Figure 27A:
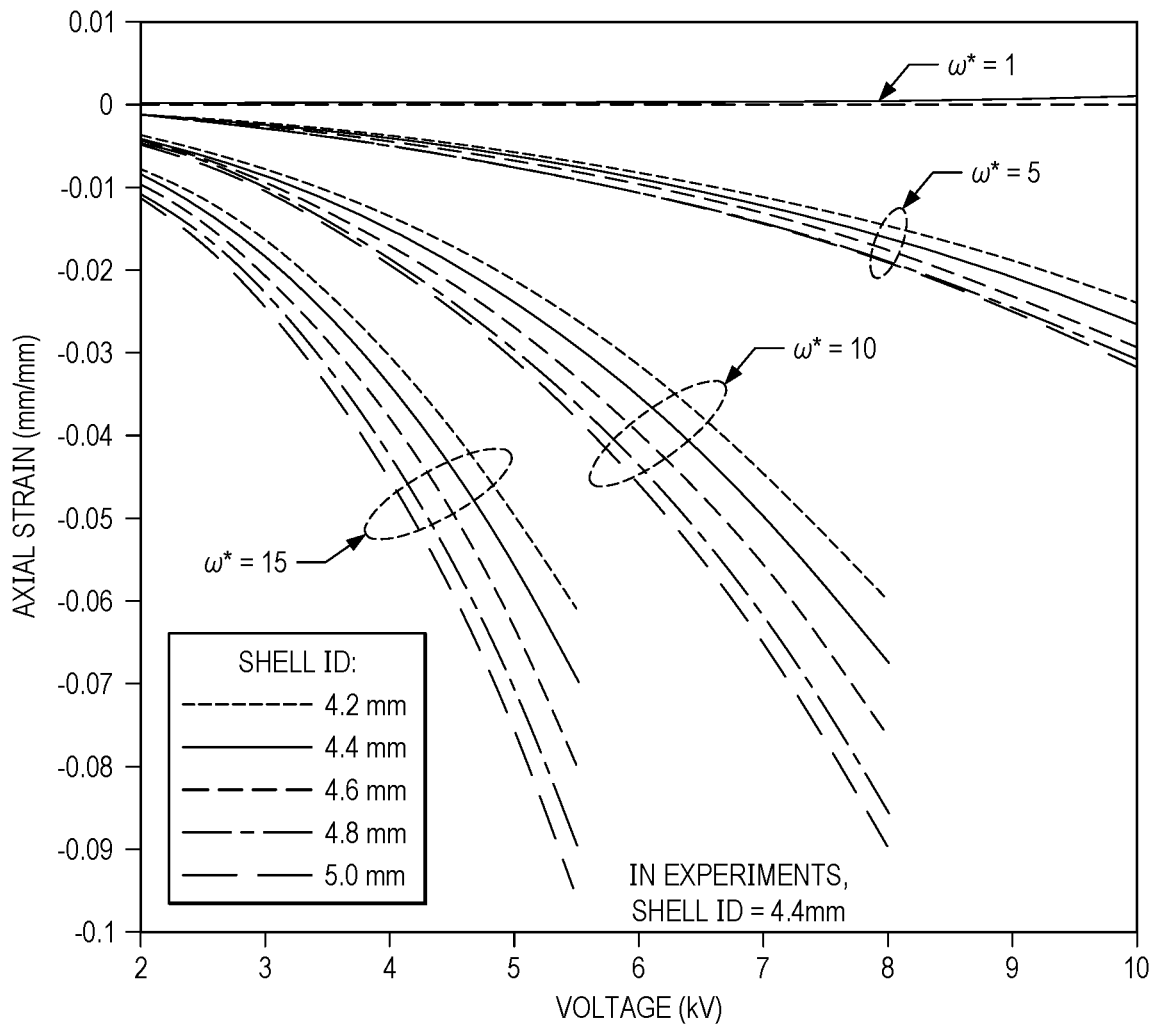
FIGS. 27A-27C show results of simulations investigating the effects of changing the inner diameter of the shell outlet on actuation performance.
Figure 27B:
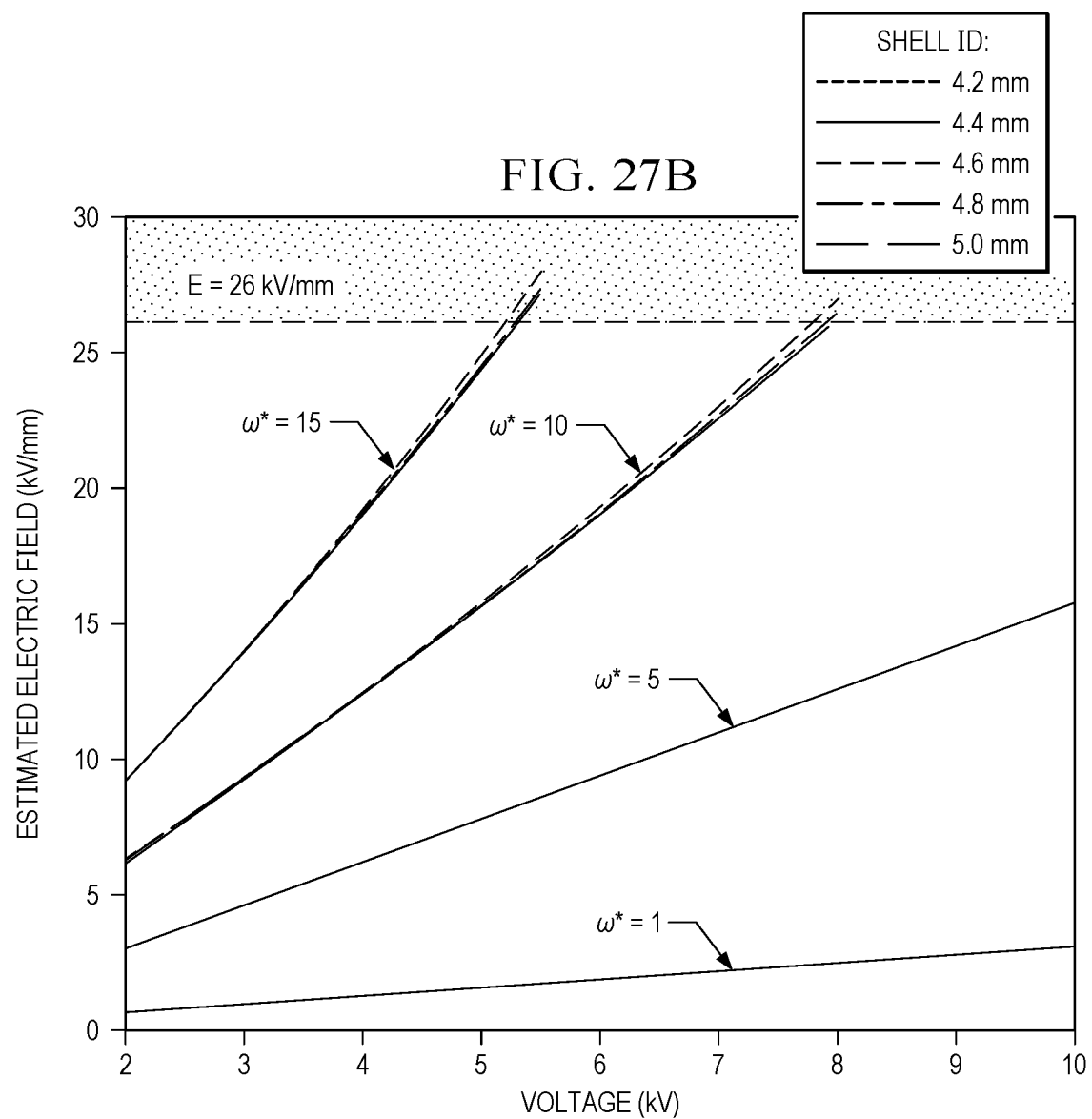
Figure 27C:
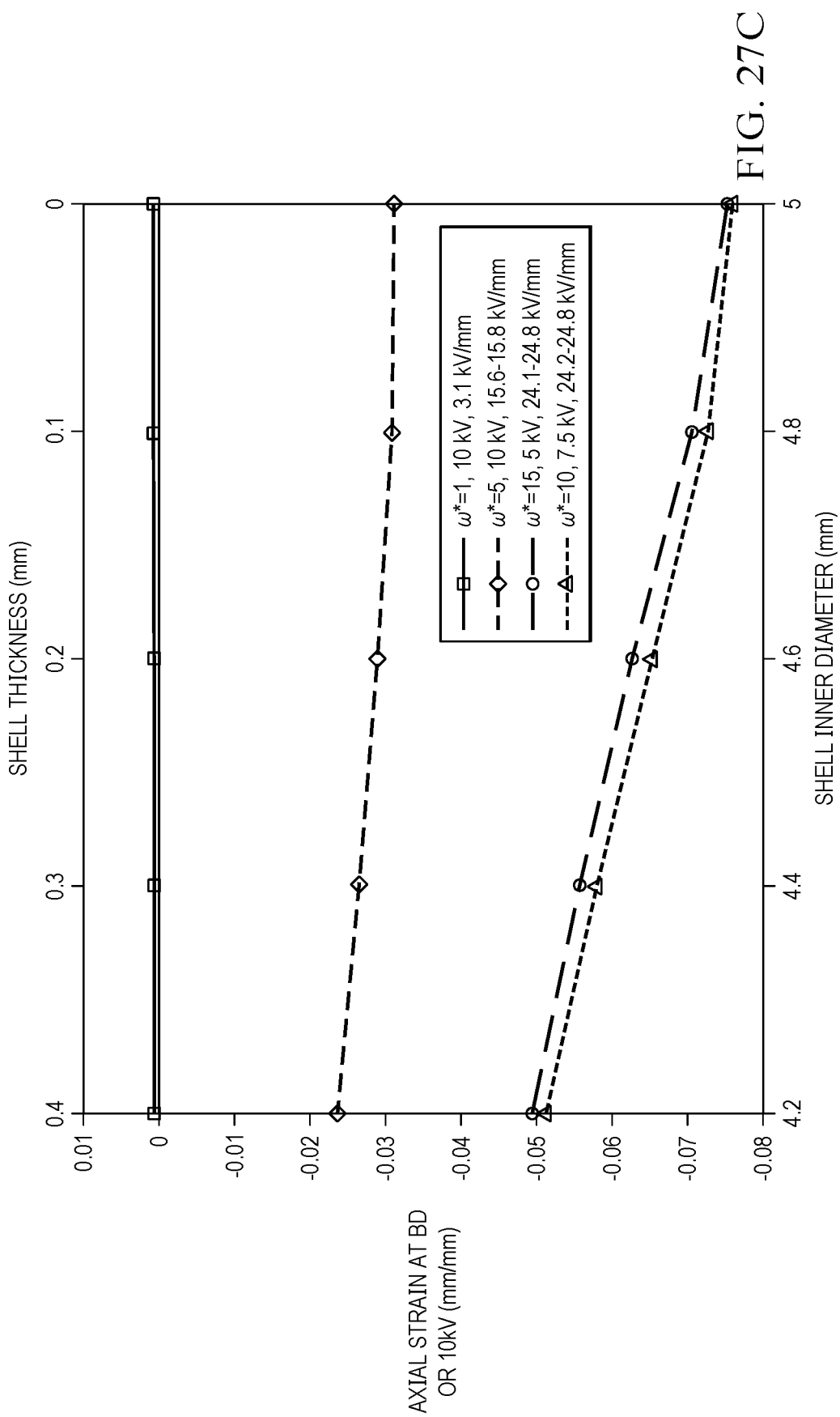

Actuation performance of HDEAs printed in the vertical configuration is shown in FIGS. 24 and 25. The multimaterial filaments are tested in 0.5 kV increments up to 10 kV applied voltage or until the specimen breaks down, and thus show some variability in the maximum tested voltage and the performance at the maximum applied voltage (in some cases the specimen broke down before reaching the applied voltage). The breakdown fields, $E_{BD}$, are estimated by dividing the applied voltage at breakdown by the estimated deformed thickness of the dielectric layer normal to the filament axis. For ω*=10 and 15, all specimens broke down during testing and the estimated breakdown fields are 23±3 kV/mm (mean±s.d). The actuation performance shows a maximum contractile strain of about −4.4±0.6% (mean±s.d., N=7) for ω*=10 and −4.1±0.9% (mean±s.d., N=7) for ω*=15, as shown in FIG. 25. The absolute maximum contractile axial strain observed is −5.8% for a specimen with ω*=15 under an applied voltage of 6 kV. The results show contractile strains for ω*=5, 10, and 15 and extensile strains for ω*=1. The transition from contractile to extensile strains is expected to occur when the helical angle drops below 45°. The results are consistent with this prediction, as the theoretical average helical angle over the entire active area, $\bar{\phi}$, drops from 71° at ω*=5 to 32° at ω*=1, as can be seen in FIG. 25. The "active area" refers to the transverse cross-sectional area of extruded material normal to the axial direction traced by the fan portions and fan outlets of the nozzle. Meanwhile, all HDEAs, regardless of ω*, show a slight twist in the direction that corresponds to a tightening of the helix (defined as a negative twist angle), as shown in FIG. 24. For a given applied voltage (up to breakdown), the twist angles for ω*=5, 10, and 15 are very similar, and notably larger in magnitude than those for ω*=1. In applications where only twisting actuation is of interest, HDEAs optimized with $\bar{\phi}$=45° may be utilized. Meanwhile, in applications where twisting is undesirable, HDEAs with periodically alternating chirality may be designed such that local twisting effects can be cancelled out.

Figure 28A:
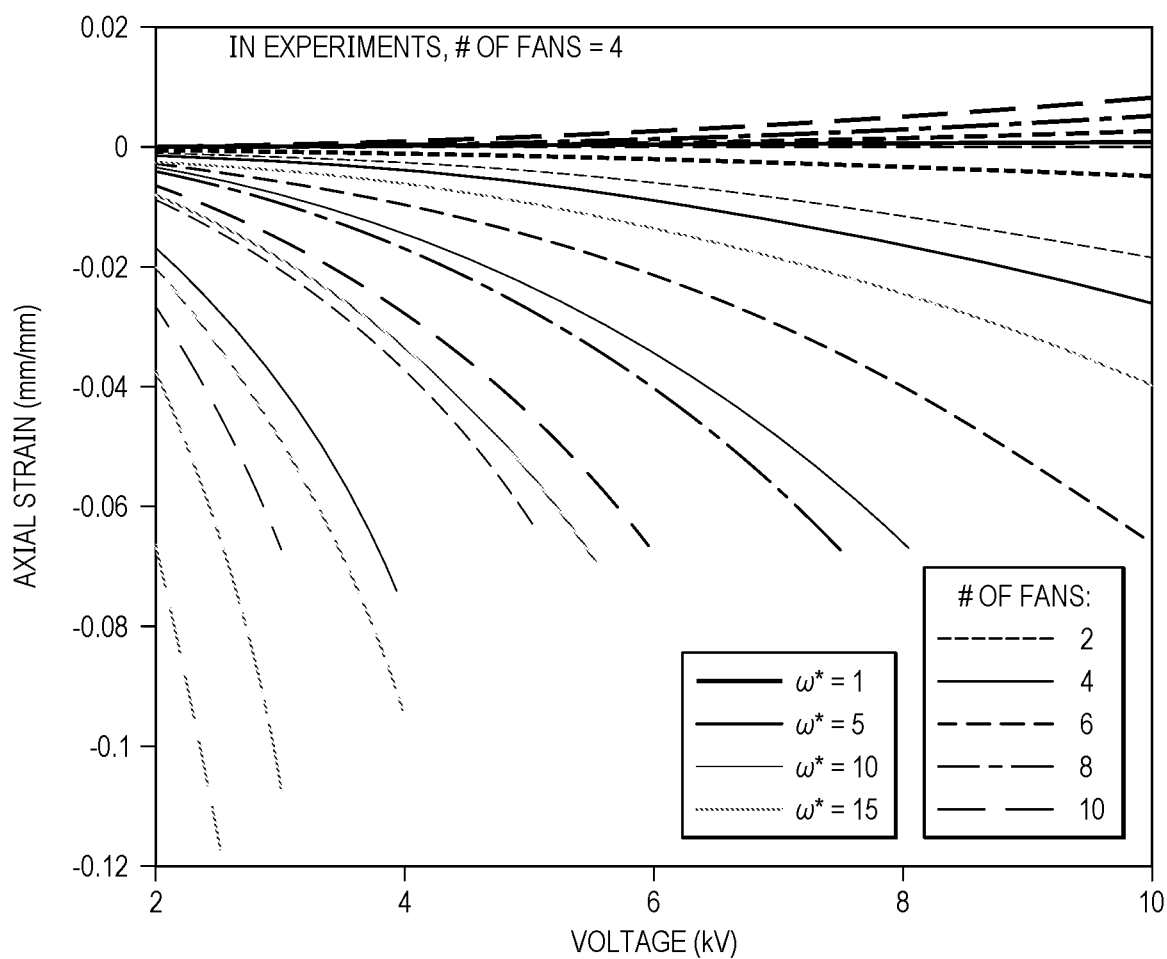
Figure 28C:
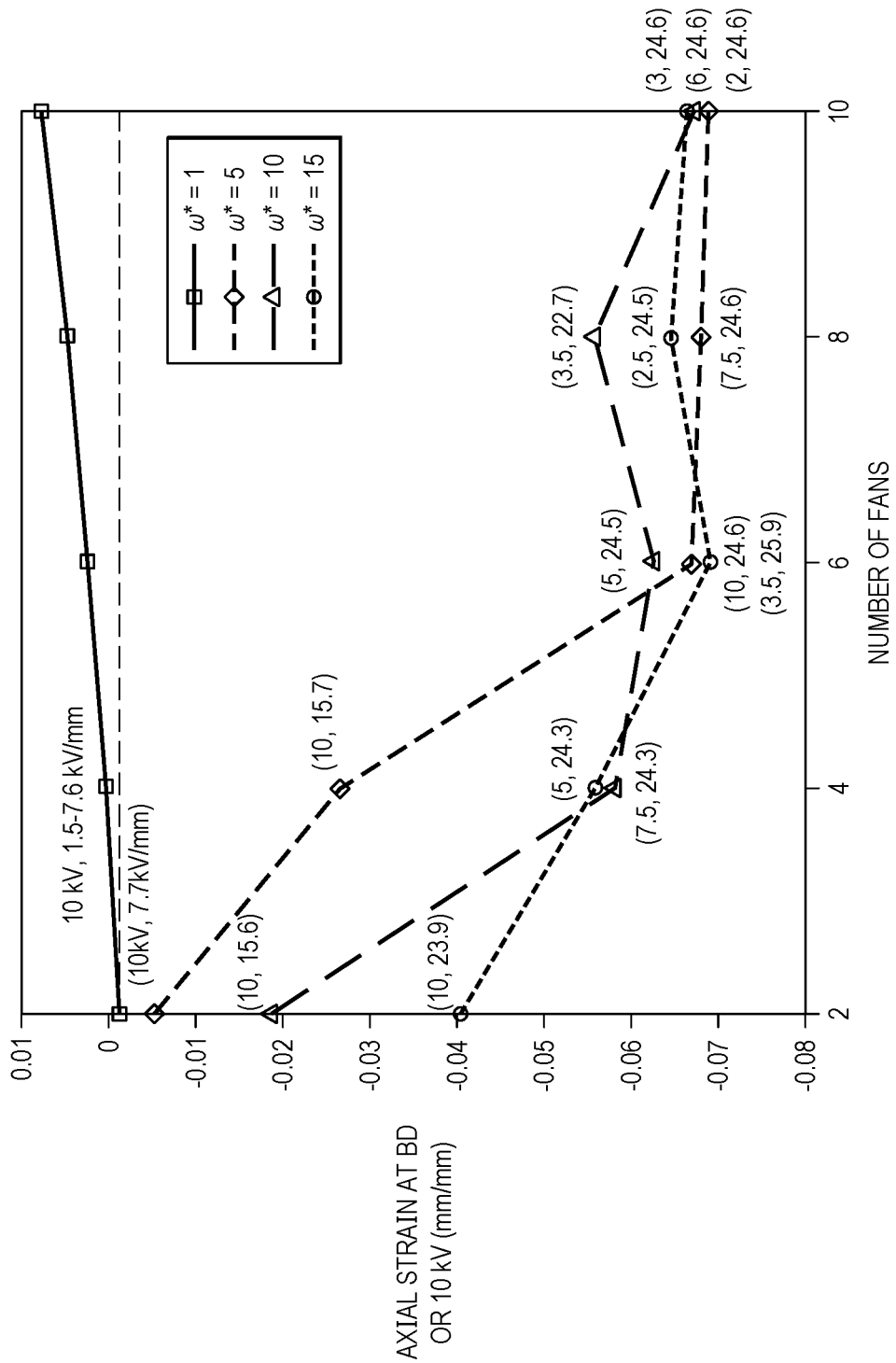
Figure 29C:
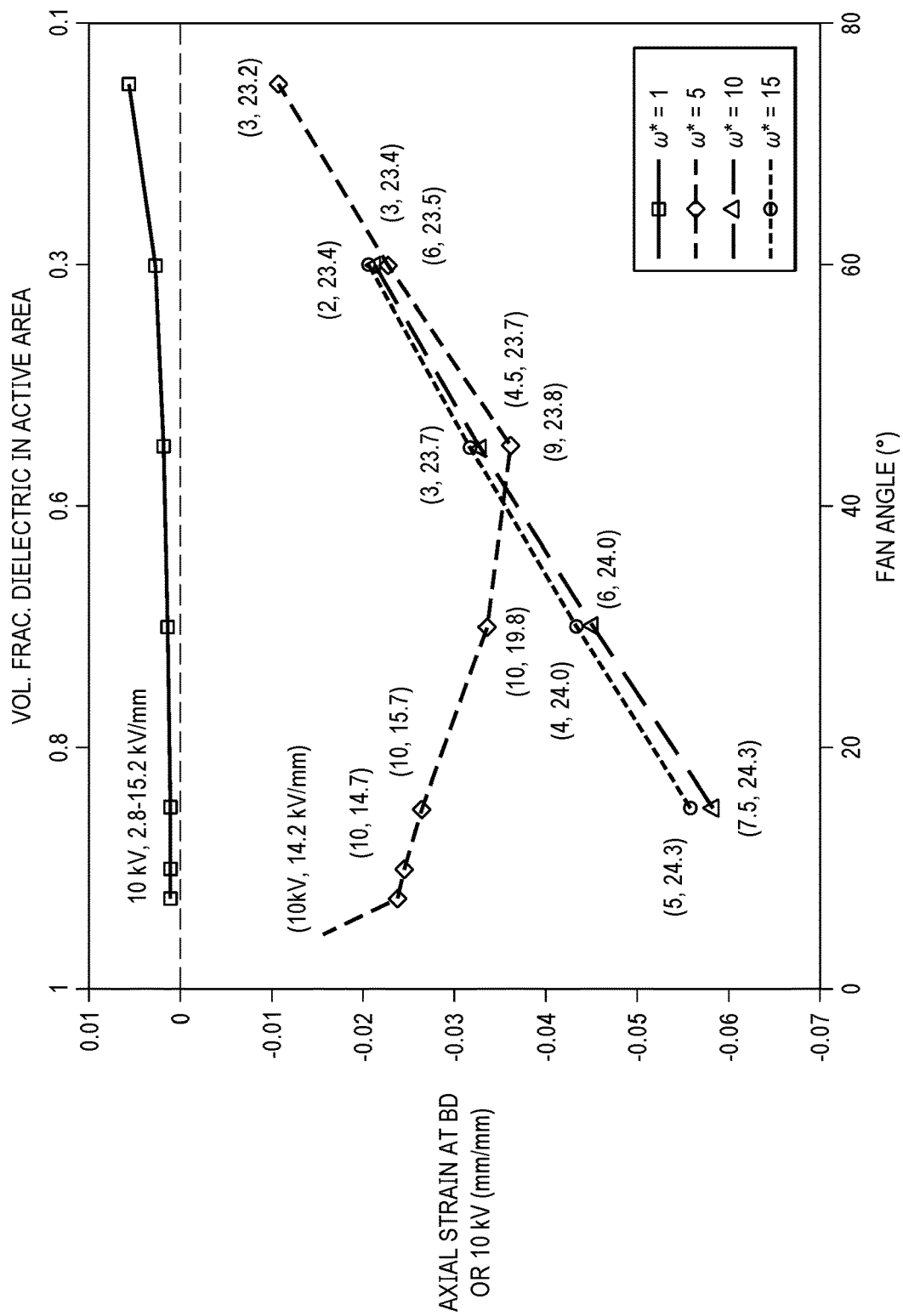

HDEAs with improved performance—specifically higher actuation strains and lower actuation voltages—can be fabricated using shell-fan-core nozzles with even finer features than those employed in the above-described work. To demonstrate this potential, simulations are conducted to predict axial strain for different nozzle geometries. First, for model validation and optimization, simulations are performed using the same nozzle geometry and ω* values as the experiments described above. The breakdown voltages for the simulations have been taken as the voltages for which the estimated electric field, E, falls between 23-26 kV/mm—the upper range from the experimental results (mean±s.d.). It is noted that a range is required because the simulations are run at specific voltage increments, not to specific electric fields. In one set of simulations, the individual effects of changing the diameter of the core portion of the core-fan outlet ("core diameter"), the inner diameter of the shell outlet, the number of fan outlets, and the angle ψ of the fan outlets ("fan angle") are systematically investigated, as shown by the data in FIGS. 26A-29C. It is noted that FIGS. 28A-28C show simulation results for varying numbers of fans and also fan angles, where the fan angles are chosen such that the volume fraction of dielectric in the active area (0.83) remains constant. Thus, for 2, 4, 6, 8, and 10 fans, the fan angles are 30°, 15°, 10°, 7.5°, and 6°, respectively, with all other geometric features of the filament (core diameter, shell inner diameter) being unchanged.

Figure 30:
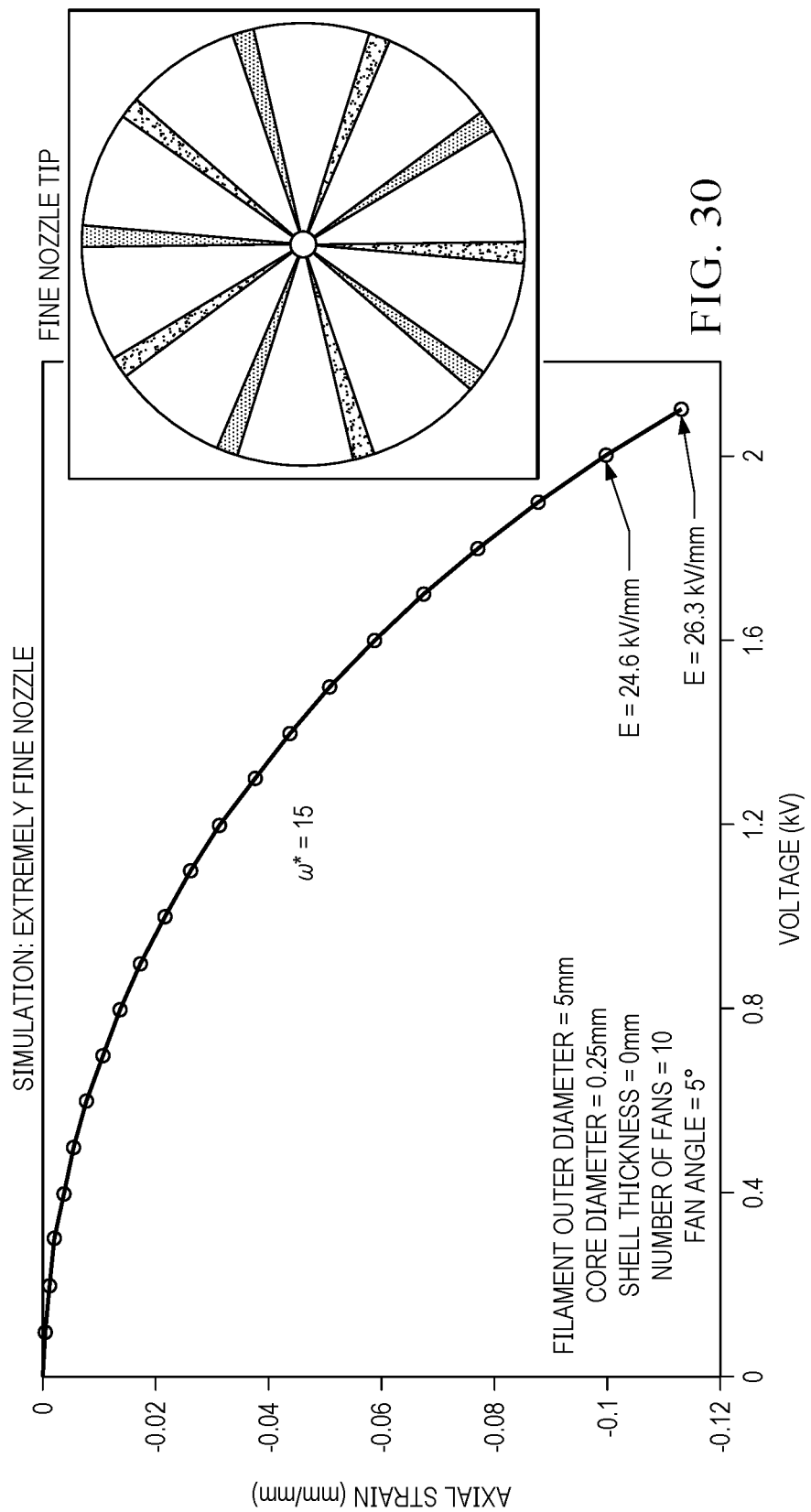
FIG. 30 shows simulated axial strain for a HDEA extruded from a 5-mm diameter nozzle with a core diameter of 0.25 mm, a shell thickness of 0 mm, and 10 fans with a fan angle of 5°, which corresponds to a dielectric volume fraction of 0.86 in the multimaterial filament.

In general, improved performance is observed for nozzles with a larger DEA active area (thinner shell, smaller core portion), a smaller spacing between the conductive traces and thus thinner dielectric layers (more fan outlets), and a higher dielectric volume fraction (smaller fan angles). Strategic combination of these four nozzle design strategies may yield significantly improved performance. As an example, a simulation is conducted with a 5-mm diameter nozzle with a core diameter of 0.25 mm, a shell thickness of 0 mm, and 10 fans with a fan angle of 5°, which corresponds to a dielectric volume fraction of 0.86. For this geometry, a strain of −10% is predicted for ω*=15 at an applied voltage of 2 kV and electric field of 24.6 kV/mm, as shown in FIG. 30. It is envisioned that multimaterial filaments with even finer features and improved actuation performance may be fabricated and bundled, akin to fiber bundles in skeletal muscle, to develop artificial muscles with larger actuation forces and more complex movements.

Accordingly, a method of printing HDEAs is described. As in the above general description of the method of printing multimaterial filaments with oriented, twisted and/or helical features, it is understood that references to "the nozzle 100" and/or "the printhead 200" in the context of the method described below may refer to any nozzle and/or printhead configured to print a multimaterial filament, including the nozzle 100 and/or the printhead 200 described in this disclosure. Referring to FIG. 10C, the method includes delivering flowable inks into the one or more internal passageways of the nozzle 100, extruding a multimaterial filament 120 comprising the flowable inks from the nozzle body 102 and, during the extrusion, rotating the nozzle 100 and optionally the ink cartridges about an axis and translating the nozzle 100 with respect to a substrate 130, thereby defining a print path, and depositing the multimaterial filament 120 on the substrate 130, which may be a print stage. As explained above, the print path may be advantageously in a normal direction away from the substrate, such that the multimaterial filament has an end supported by the substrate. In other words, a centerline of the nozzle body may be oriented at an angle $\theta_P$ with respect to the substrate of about 90°, and/or the multimaterial filament may be deposited on the substrate at an angle $\theta_D$ of about 90°. The axis about which the nozzle 100 rotates may be aligned with a centerline of the nozzle body 102. The method may further comprise exposing the multimaterial filament 120 to ultraviolet (UV) radiation to effect curing or crosslinking of one or more of the flowable inks after extrusion, as illustrated for one example in FIG. 10O. The multimaterial filament formed in the method may include conductive helical traces spaced apart from each other and embedded in a dielectric matrix. As explained above, the highly symmetric and helical geometry achievable in a vertical print configuration may be preferred to achieve axial actuation. However, bending actuation, which may result from imperfect or distorted helical geometries, may be acceptable or desired in some applications. Accordingly, references throughout the disclosure and claims to "helical" traces may encompass both helical and imperfectly helical (e.g., twisted or distorted) traces.

The dielectric matrix may comprise dielectric helical traces or layers that separate the conductive helical traces in an axial direction, and may further comprise a dielectric core extending along the axial direction. It is noted that, in some examples, the dielectric matrix may include only the dielectric helical traces, and the dielectric core may not be present, such that the multimaterial filament is hollow. More typically, however, the conductive helical traces wrap around the dielectric core. The dielectric core and the dielectric helical traces may be extruded from a core-fan outlet of the nozzle described above, where the dielectric core is extruded from the core portion and the dielectric helical traces are extruded through the fan portions. In addition, a dielectric shell may be extruded from a shell outlet of the nozzle described above, such that the dielectric helical traces are encapsulated by a surface layer that extends along the length of the multimaterial filament. The conductive helical traces may be extruded from the fan outlets. Accordingly, the dielectric helical traces, the dielectric core, and/or the dielectric shell may be described as continuous, seamless, and/or monolithic.

The multimaterial filament may include a dielectric volume fraction of at least about 0.2 at least about 0.5, at least about 0.75, at least about 0.80, or at least about 0.85, and/or up to less than 1.0, or up to about 0.99, where larger volume fractions may be preferable. The conductive helical traces may have a theoretical average helical angle over an entire active area in a range from greater than 0 to less than 90 degrees, or from about 30 degrees to about 80 degrees. For actuation of the helical DEA, alternating conductive helical traces may be connected to positive and negative terminals of a power supply, respectively. The helical DEA may exhibit an axial strain in a range from about 0.5 to about −0.5, from about 0.25 to about −0.25, or from about 0.1 to about −0.10 over a voltage range from greater than 0 to 20 kV, from greater than 0 to 10 kV, or from greater than 0 to 2 kV.

The flowable inks employed to form the helical DEA may include conductive and dielectric inks having rheological behavior as described above. The conductive helical traces may be formed from a conductive ink comprising a liquid metal or conductive particles dispersed in a liquid, where the liquid metal or conductive particles may comprise aluminum, carbon, chromium, cobalt, copper, gallium, gold, indium, iron, lead, lithium, magnesium, molybdenum, nickel, niobium, palladium, platinum, rhenium, silver, tantalum, tin, titanium, tungsten, vanadium, zinc, and/or zirconium. The dielectric ink may include a polymer or polymer resin that crosslinks or cures upon exposure to UV light. Accordingly, the dielectric matrix (e.g., the dielectric helical traces, core and/or shell) may comprise a polymer including acrylonitrile butadiene styrene (ABS), polylactic acid (PLA), poly(methyl methacrylate) (PMMA or acrylic), epoxy, polydimethylsiloxane (PDMS), polyimide (Nylon), polyimide (PI), polyethylene (PE), polypropylene (PP), polystyrene (PS), polytetrafluoroethylene (PTFE), polyvinylchloride (PVC), polyurethane PU), polycarbonate (PC), photocurable resin, epoxy, and/or a hydrogel. As described above, the nozzle employed for printing may include a plurality of inlets for delivery of flowable inks into the one or more internal passageways, where each inlet is in fluid communication with a dispensing end of an ink cartridge, and, during the extrusion, the nozzle and the ink cartridges may rotate together about the axis. A dimensionless rotation rate, $\omega^* = R\omega/v$, as defined above may be in a range from 0 to 5000, from 0 to 1000, from 0 to 100, from 0 to 15, or from 5 to 15. Other aspects of the method may be as described above.

The subject-matter of this disclosure may also relate to the following aspects, among others:

A first aspect relates to a printhead comprising: a plurality of ink cartridges; and a nozzle that includes: a nozzle body comprising an inlet end, an outlet end, and one or more internal passageways extending through the nozzle body from the inlet end to the outlet end, the one or more internal passageways terminating at one or more outlets at or near the outlet end; and a plurality of nozzle inlets at the inlet end for delivery of flowable inks into the one or more internal passageways, each nozzle inlet being in fluid communication with a dispensing end of one of the ink cartridges, wherein the nozzle and the ink cartridges are configured to rotate together about an axis during printing.

A second aspect relates to the printhead of the first aspect, further comprising a rotatable shaft coupled to a motor, wherein the nozzle and the ink cartridges are coupled to the rotatable shaft.

A third aspect relates to the printhead of the second aspect, wherein a centerline of the nozzle body is aligned with the rotatable shaft.

A fourth aspect relates to the printhead of the second or third aspects, further comprising a centering stage coupled to the rotatable shaft, the centering stage enabling adjustment of location and/or orientation of the nozzle.

A fifth aspect relates to the printhead of any of the second through the fourth aspects, further comprising a rotary union positioned between the ink cartridges and the motor for delivering pressurized gas to the ink cartridges during printing.

A sixth aspect relates to the printhead of the fifth aspect, wherein the rotary union comprises a rotatable inner portion in fluid communication with the ink cartridges and coupled to the rotatable shaft, and a stationary outer portion configured for connection to a gas supply and surrounding the inner portion A seventh aspect relates to the printhead of any preceding aspect, wherein the nozzle inlets extend radially away from a centerline of the nozzle body for connection to the dispensing ends of the ink cartridges.

An eighth aspect relates to the printhead of any preceding aspect, comprising from two to 100 ink cartridges.

A ninth aspect relates to the printhead of any preceding aspect, further comprising an ultraviolet (UV) light fixture positioned to impinge UV light on a multimaterial filament extruded from the nozzle body.

A tenth aspect relates to the printhead of any preceding aspect being mounted on a three-axis linear motion controller.

An eleventh aspect relates to the printhead of any preceding aspect, wherein the nozzle further comprises a tapered sleeve extending from the outlet end of the nozzle body, an upstream portion of the tapered sleeve having a first diameter large enough to encompass the one or more outlets, and a downstream portion of the tapered sleeve having a second diameter smaller than the first diameter.

A twelfth aspect relates to the printhead of the eleventh aspect, wherein the tapered sleeve is removably attached to or integrally formed with an external wall of the outlet end.

A thirteenth aspect relates to the printhead of the eleventh or twelfth aspect, wherein the tapered sleeve surrounds the outlet end, or is flush with the outlet end.

A fourteenth aspect relates to the printhead of any of the eleventh through the thirteenth aspects, wherein the tapered sleeve has a flat tip, such that a plane flush with a downstream outlet of the tapered sleeve is perpendicular to a centerline of the tapered sleeve.

A fifteenth aspect relates to the printhead of any of the eleventh through the fourteenth aspects, wherein the tapered sleeve has a beveled or bent tip, such that a plane flush with the downstream outlet is not perpendicular to the centerline of the tapered sleeve.

A sixteenth aspect relates to the printhead of any preceding aspect, wherein the nozzle body has a flat tip, such that a plane flush with the outlet end is perpendicular to a centerline of the nozzle body.

A seventeenth aspect relates to the printhead of any preceding aspect, wherein the nozzle body has a beveled or bent tip, such that a plane flush with the outlet end is not perpendicular to a centerline of the nozzle body.

An eighteenth aspect relates to the printhead of any preceding aspect, wherein the one or more outlets are configured such that a multimaterial filament extruded from the nozzle body during translation and rotation of the nozzle and the ink cartridges includes oriented, twisted and/or helical features.

A nineteenth aspect relates to the printhead of any preceding aspect, wherein the nozzle body comprises a plurality of the internal passageways and/or the outlets.

A twentieth aspect relates to the printhead of the nineteenth aspect, wherein the outlets are circumferentially and/or azimuthally heterogeneous.

A twenty-first aspect relates to the printhead of the nineteenth or twentieth aspect, wherein the internal passageways are defined by one or more internal walls.

A twenty-second aspect relates to the printhead of any of the nineteenth through the twenty-first aspects, wherein the outlets include fan outlets, each fan outlet being defined by a pair of radially aligned walls joined to a circumferentially aligned wall positioned a radial distance away from a centerline of the nozzle body.

A twenty-third aspect relates to the printhead of the twenty-second aspect, wherein the outlets further comprise a core-fan outlet comprising: a core portion positioned about the centerline and partly surrounded by the circumferentially aligned walls, and fan portions extending radially away from the core portion between the fan outlets.

A twenty-fourth aspect relates to the printhead of the twenty-third aspect, wherein the outlets further comprise a shell outlet surrounding the fan outlets and the fan portions, the shell outlet being separated from the fan outlets and the fan portions by a circumferentially continuous wall.

A twenty-fifth aspect relates to a nozzle for printing multimaterial filaments including oriented, twisted and/or helical features, the nozzle comprising: a nozzle body comprising an inlet end, an outlet end, and internal passageways extending therethrough from the inlet end to the outlet end, the inlet end being configured for delivery of a flowable ink into each of the internal passageways, the internal passageways being defined by one or more internal walls and terminating at outlets at or near the outlet end, wherein the outlets are configured such that a multimaterial filament extruded from the nozzle body during translation and rotation thereof includes oriented, twisted and/or helical features.

A twenty-sixth aspect relates to the nozzle of the twenty-fifth aspect, wherein the outlets are circumferentially and/or azimuthally heterogeneous.

A twenty-seventh aspect relates to the nozzle of the twenty-fifth or twenty-sixth aspect, wherein the one or more internal walls include radially aligned walls and circumferentially aligned walls.

A twenty-eighth aspect relates to the nozzle of any of the twenty-fifth through the twenty seventh aspects, wherein the outlets include fan outlets, each fan outlet being defined by a pair of radially aligned walls joined to a circumferentially aligned wall positioned a radial distance away from a centerline of the nozzle body.

A twenty-ninth aspect relates to the nozzle of the twenty-eighth aspect, wherein the outlets include a core-fan outlet comprising: a core portion positioned about the centerline and partly surrounded by the circumferentially aligned walls, and fan portions extending radially away from the core portion between the fan outlets.

A thirtieth aspect relates to the nozzle of the twenty-ninth aspect, wherein the outlets include a shell outlet surrounding the fan outlets and the fan portions, the shell outlet being separated from the fan outlets and the fan portions by a circumferentially continuous wall.

A thirty-first aspect relates to the nozzle of any of the twenty-eighth through the thirtieth aspects, comprising an even number of the fan outlets.

A thirty-second aspect relates to the nozzle of any of the twenty-eighth through the thirty-first aspects, comprising from 2 to 100 of the fan outlets.

A thirty-third aspect relates to the nozzle of any of the twenty-eighth through the thirty-second aspects, wherein each of the fan outlets spans an angle $\psi$ in a range from about 1° to about 160°.

A thirty-fourth aspect relates to the nozzle of any of the twenty-fifth through the thirty-third aspects, wherein, at the outlet end, the one or more internal walls are flush with, recessed from, and/or protuberant from an outer wall of the nozzle body.

A thirty-fifth aspect relates to a method of printing multimaterial filaments including oriented, twisted and/or helical features, the method comprising: delivering flowable inks into the internal passageways of the nozzle of any of the twenty-fifth through the thirty-fourth aspects; extruding a multimaterial filament from the nozzle body; during the extrusion, rotating the nozzle about an axis and translating the nozzle with respect to a substrate, thereby defining a print path; and depositing the multimaterial filament on the substrate, wherein the multimaterial filament includes one or more oriented, twisted and/or helical features.

A thirty-sixth aspect relates to the method of the thirty-fifth aspect, wherein the nozzle further comprises a plurality of inlets for delivery of flowable inks into the one or more internal passageways, each inlet being in fluid communication with a dispensing end of an ink cartridge, wherein, during the extrusion, the nozzle and the ink cartridges rotate together about the axis.

A thirty-seventh aspect relates to a method of printing multimaterial filaments including oriented, twisted and/or helical features, the method comprising: providing the printhead of any preceding aspect; delivering flowable inks into the one or more internal passageways of the nozzle; extruding a multimaterial filament from the nozzle body; during the extrusion, rotating the nozzle and the ink cartridges together about an axis, and translating the nozzle with respect to a substrate, thereby defining a print path; and depositing the multimaterial filament on the substrate, wherein the multimaterial filament includes one or more oriented, twisted and/or helical features.

A thirty-eighth aspect relates to the method of any of the thirty-fifth through the thirty-seventh aspects, wherein the axis is a centerline of the nozzle body.

A thirty-ninth aspect relates to the method of any of the thirty-fifth through the thirty-eighth aspects, wherein rotation of the nozzle during the extrusion is discontinuous, the nozzle body undergoing rotation at discrete locations along the print path.

A fortieth aspect relates to the method of the thirty-ninth aspect, wherein the one or more oriented, twisted and/or helical features include twists or bends formed in the multimaterial filament at the discrete locations.

A forty-first aspect relates to the method of any of the thirty-fifth through the thirty-eighth aspects, wherein rotation of the nozzle during the extrusion is continuous, the nozzle body undergoing rotation at all locations along the print path.

A forty-second aspect relates to the method of the forty-first aspect, wherein the one or more oriented, twisted and/or helical features include one or more twisted or helical traces extending along a length of the multimaterial filament.

A forty-third aspect relates to the method of the forty-second aspect, wherein the one or more twisted or helical traces are encapsulated by a surface layer extending along the length of the multimaterial filament.

A forty-fourth aspect relates to the method of the forty-second or forty-third aspect, wherein the one or more twisted or helical traces surround a core extending along the length of the multimaterial filament.

A forty-fifth aspect relates to the method of any of the thirty-fifth through the forty-fourth aspects, wherein the multimaterial filament is deposited in a 2D or 3D pattern on the substrate, the 2D or 3D pattern being determined by the print path.

A forty-sixth aspect relates to the method of any of the thirty-fifth through the forty-fifth aspects, further comprising exposing the multimaterial filament to ultraviolet radiation to effect curing of one or more of the flowable inks.

A forty-seventh aspect relates to the method of the forty-sixth aspect, wherein the exposure occurs prior to, while, and/or after depositing the multimaterial filament on the substrate.

A forty-eighth aspect relates to the method of any of the thirty-fifth through the forty-seventh aspects, wherein the centerline of the nozzle body is oriented at an angle $\theta_P$ with respect to the substrate of $\leq 90°$.

A forty-ninth aspect relates to the method of any of the thirty-fifth through the forty-eighth aspects, wherein the multimaterial filament is deposited on the substrate at an angle $\theta_D$ in a range from 0° to 90°.

A fiftieth aspect relates to the method of any of the thirty-fifth through the forty-ninth aspects, wherein a dimensionless rotation rate $\omega^* = R\omega/v$ is in a range from 0 to 5000, from 0 to 1000, from 0 to 100, or from 0 to 15, where R is inner radius of the nozzle body at the outlet end, $\omega$ is angular velocity of the nozzle body, and v is translational velocity of the nozzle body.

A fifty-first aspect relates to the method of any of the thirty-fifth through the fiftieth aspects, wherein a dimensionless printing gap height $h^* = h/2R$ is in a range from greater than 0 to 10, from greater than 0 to 7, or from greater than 0 to 4, where h is height of the nozzle body above the substrate and R is inner radius of the nozzle body at the outlet end.

A fifty-second aspect relates to the method of any of the thirty-fifth through the fifty-first aspects, wherein instabilities during extrusion lead to warping of the multimaterial filament, the warping comprising deviation from a nominally cylindrical filament geometry and/or deviation from the print path.

A fifty-third aspect relates to the method of any of the thirty-fifth through the fifty-second aspects, wherein the multimaterial filament comprises multiple materials selected from one or more polymers, one or more metals, one or more alloys, one or more semiconductors, one or more ceramics, one or more carbon-based materials, and/or one or more composites.

A fifty-fourth aspect relates to the method of the fifty-third aspect, wherein the one or more polymers are selected from the group consisting of: acrylonitrile butadiene styrene (ABS), polylactic acid (PLA), poly(methyl methacrylate) (PMMA or acrylic), epoxy, polydimethylsiloxane (PDMS), polyimide (Nylon), polyimide (PI), polyethylene (PE), polypropylene (PP), polystyrene (PS), polytetrafluorethylene (PTFE), polyvinylchloride (PVC), polyurethane PU), polycarbonate (PC), photocurable resin, epoxy, and a hydrogel.

A fifty-fifth aspect relates to the method of any of the thirty-fifth through the fifty-fourth aspects, wherein the multimaterial filament comprises a conductive material selected from the group consisting of: aluminum, carbon, chromium, cobalt, copper, gallium, gold, indium, iron, lead, lithium, magnesium, molybdenum, nickel, niobium, palladium, platinum, rhenium, silver, tantalum, tin, titanium, tungsten, vanadium, zinc, and zirconium.

A fifty-sixth aspect relates to the method of any of the thirty-fifth through the fifty-fifth aspects, wherein the multimaterial filament comprises two or more polymers, each polymer having a different stiffness.

A fifty-seventh aspect relates to the method of the fifty-sixth aspect, wherein the two or more polymers comprise a stiff polymer and a soft polymer, the stiff polymer having a stiffness higher than that of the soft polymer, wherein the stiffness of the stiff polymer is optionally at least one order of magnitude or at least two orders of magnitude higher than that of the soft polymer.

A fifty-eighth aspect relates to the method of the fifty-sixth or the fifty-seventh aspect, wherein the multimaterial filament comprises twisted or helical traces comprising the stiff polymer embedded in the soft polymer, the multimaterial filament thereby being configured for use as a springy filament.

A fifty-ninth aspect relates to the method of any of the thirty-fifth through the fifty-eighth aspects, wherein the multimaterial filament comprises conductive helical traces embedded in a dielectric matrix.

The sixtieth aspect relates to a method of making a helical dielectric elastomer, the method comprising: delivering flowable inks into the internal passageways of the nozzle of any of the twenty-fifth through the thirty-fourth aspects; extruding a multimaterial filament from the nozzle body; during the extrusion, rotating the nozzle about an axis and translating the nozzle with respect to a substrate, thereby defining a print path; and depositing the multimaterial filament on the substrate, wherein the multimaterial filament includes conductive helical traces embedded in a dielectric matrix.

A sixty-first aspect relates to the method of the sixtieth aspect, wherein the nozzle further comprises a plurality of inlets for delivery of flowable inks into the internal passageways, each inlet being in fluid communication with a dispensing end of an ink cartridge, wherein, during the extrusion, the nozzle and the ink cartridges rotate together about the axis.

A sixty-second aspect relates to a method of making a helical dielectric elastomer, the method comprising: providing the printhead of any preceding claim; delivering flowable inks into the internal passageways of the nozzle; extruding a multimaterial filament from the nozzle body; during the extrusion, rotating the nozzle and the ink cartridges together about an axis, and translating the nozzle with respect to a substrate, thereby defining a print path; and depositing the multimaterial filament on the substrate, wherein the multimaterial filament includes conductive helical traces embedded in a dielectric matrix.

A sixty-third aspect relates to the method of any one of the sixtieth through the sixty-second aspects, wherein the axis is a centerline of the nozzle body.

A sixty-fourth aspect relates to the method of any one of the sixtieth through the sixty-third aspects, wherein the print path is along a normal direction away from the substrate, the multimaterial filament having an end supported by the substrate.

A sixty-fifth aspect relates to the method of any one of the sixtieth through the sixty-fourth aspects, wherein a centerline of the nozzle body is oriented at an angle $\theta_P$ with respect to the substrate of about 90°.

A sixty-sixth aspect relates to the method of any one of the sixtieth through the sixty-fourth aspects, wherein the multimaterial filament is deposited on the substrate at an angle $\theta_D$ of about 90°.

A sixty-seventh aspect relates to the method of any one of the sixtieth through the sixty-sixth aspects, wherein a dimensionless rotation rate $\omega^* = R\omega/v$ is in a range from 0 to 5000, from 0 to 1000, from 0 to 100, from 0 to 15, or from 5 to 15, where R is inner radius of the nozzle body at the outlet end, $\omega$ is angular velocity, and v is translational velocity.

A sixty-eighth aspect relates to the method of any one of the sixtieth through the sixty-seventh aspects, wherein the dielectric matrix comprises dielectric helical traces separating the conductive helical traces along an axial direction of the multimaterial filament.

A sixty-ninth aspect relates to the method of any one of the sixtieth through the sixty-eighth aspects, wherein the dielectric matrix further comprises a dielectric core extending along an axial direction of the multimaterial filament, the conductive helical traces wrapping around the dielectric core, and/or wherein the dielectric matrix further comprises a dielectric shell encapsulating the conductive helical traces.

A seventieth aspect relates to the method of any one of the sixtieth through the sixty-ninth aspects, wherein the dielectric helical traces, the dielectric shell and/or the dielectric core are continuous, seamless, and/or monolithic.

A seventy-first aspect relates to the method of any one of the sixtieth through the seventieth aspects, wherein the conductive helical traces have a theoretical average helical angle over an entire active area in a range from greater than 0 to less than 90 degrees, or from about 30 degrees to about 80 degrees A seventy-second aspect relates to the method of any one of the sixtieth through the seventy-first aspects, wherein the multimaterial filament contains a dielectric volume fraction of at least about 0.2 at least about 0.5, at least about 0.75, at least about 0.80, or at least about 0.85, and/or up to less than 1.0, or up to about 0.99.

A seventy-third aspect relates to a helical dielectric elastomer actuator comprising: a multimaterial filament comprising conductive helical traces embedded in a dielectric matrix, wherein alternating conductive helical traces are configured for connection to positive and negative terminals of a power supply, respectively, for actuation.

A seventy-fourth aspect relates to the helical dielectric elastomer actuator of the seventy-third aspect, exhibiting an axial strain in a range from about 0.5 to about −0.5, from about 0.25 to about −0.25, or from about 0.1 to about −0.10 over a voltage range from greater than 0 to 20 kV, from greater than 0 to 10 kV, or from greater than 0 to 2 kV.

A seventy-fifth aspect relates to the helical dielectric elastomer actuator of the seventy-third or seventy-fourth aspect, wherein the dielectric matrix comprises dielectric helical traces separating the conductive helical traces along an axial direction of the multimaterial filament.

A seventy-sixth aspect relates to the helical dielectric elastomer actuator of any of the seventy-third through the seventy-fifth aspects, wherein the dielectric matrix comprises a dielectric core extending along an axial direction of the multimaterial filament, the conductive helical traces wrapping around the dielectric core, and/or wherein the dielectric matrix further comprises a dielectric shell encapsulating the conductive helical traces.

A seventy-seventh aspect relates to the helical dielectric elastomer actuator of the seventy-fifth or the seventy-sixth aspect, wherein the dielectric helical traces, dielectric shell, and/or the dielectric core are continuous, seamless, and/or monolithic.

A seventy-eighth aspect relates to the helical dielectric elastomer of any of the seventy-third through the seventy-seventh aspects, wherein a dimensionless rotation rate $\omega^*=R\omega/v$ is in a range from 0 to 5000, from 0 to 1000, from 0 to 100, from 0 to 15, or from 5 to 15, where R is inner radius of the nozzle body at the outlet end, $\omega$ is angular velocity, and v is translational velocity.

A seventy-ninth aspect relates to the helical dielectric elastomer of any of the seventy-third through the seventy-eighth aspects, wherein the conductive helical traces have a theoretical average helical angle over an entire active area in a range from greater than 0 to less than 90 degrees, or from about 30 degrees to about 80 degrees.

An eightieth aspect relates to the helical dielectric elastomer of any one of the seventy-third through the seventy-ninth aspects, wherein the multimaterial filament contains a dielectric volume fraction of at least about 0.2 at least about 0.5, at least about 0.75, at least about 0.80, or at least about 0.85, and/or up to less than 1.0, or up to about 0.99.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

In addition to the features mentioned in each of the independent aspects enumerated above, some examples may show, alone or in combination, the optional features mentioned in the dependent aspects and/or as disclosed in the description above and shown in the figures.

The invention claimed is:

1. A printhead comprising:
a plurality of ink cartridges; and
a nozzle comprising:
a nozzle body comprising an inlet end, an outlet end, and one or more internal passageways extending through the nozzle body from the inlet end to the outlet end, the one or more internal passageways terminating at one or more outlets at or near the outlet end; and
a plurality of nozzle inlets at the inlet end for delivery of flowable inks into the one or more internal passageways, each nozzle inlet being in fluid communication with a dispensing end of one of the ink cartridges,
wherein the nozzle and the ink cartridges are configured to rotate together about an axis during printing.

2. The printhead of claim 1, further comprising a rotatable shaft coupled to a motor, wherein the nozzle and the ink cartridges are coupled to the rotatable shaft.

3. The printhead of claim 2, further comprising a rotary union positioned between the ink cartridges and the motor for delivering pressurized gas to the ink cartridges during printing.

4. The printhead of claim 3, wherein the rotary union comprises a rotatable inner portion in fluid communication with the ink cartridges and coupled to the rotatable shaft, and a stationary outer portion configured for connection to a gas supply and surrounding the inner portion.

5. The printhead of claim 1, wherein the nozzle inlets extend radially away from a centerline of the nozzle body for connection to the dispensing ends of the ink cartridges.

6. The printhead of claim 1, comprising from two to 100 ink cartridges.

7. The printhead of claim 1, further comprising an ultraviolet (UV) light fixture positioned to impinge UV light on a multimaterial filament extruded from the nozzle body.

8. The printhead of claim 1 being mounted on a multi-axis linear motion controller.

9. The printhead of claim 1, wherein the nozzle further comprises a tapered sleeve extending from the outlet end of the nozzle body, an upstream portion of the tapered sleeve having a first diameter large enough to encompass the one or more outlets, and a downstream portion of the tapered sleeve having a second diameter smaller than the first diameter.

10. The printhead of claim 9, wherein the tapered sleeve is removably attached to or integrally formed with an external wall of the outlet end.

11. The printhead of claim 1, wherein the one or more outlets are configured such that a multimaterial filament extruded from the nozzle body during translation and rotation thereof includes oriented, twisted and/or helical features.

12. The printhead of claim 1, wherein the one or more outlets are circumferentially and/or azimuthally heterogeneous.

13. The printhead of claim 1, wherein the nozzle body has a beveled or bent tip.

14. A method of printing multimaterial filaments including oriented, twisted and/or helical features, the method comprising:
providing the printhead of claim 1;
delivering flowable inks into the one or more internal passageways of the nozzle;
extruding a multimaterial filament from the nozzle body;
during the extrusion, rotating the nozzle and the ink cartridges together about an axis, and translating the nozzle with respect to a substrate; and
depositing the multimaterial filament on the substrate, wherein the multimaterial filament includes one or more oriented, twisted and/or helical features.

15. The method of claim 14, wherein the axis is aligned with a centerline of the nozzle body.

16. The method of claim 14, wherein the axis is not aligned with a centerline of the nozzle body, the nozzle body being angled or tilted.

17. The method of claim 14, wherein the multimaterial filament is deposited in a 2D or 3D pattern on the substrate, the 2D or 3D pattern being determined by a print path of the nozzle.

18. The method of claim 14, wherein a centerline of the nozzle body is oriented vertically and the filament is deposited vertically as the nozzle moves in a normal direction away from the substrate.

19. The method of claim 14, wherein the substrate comprises a spool, and further comprising rotating the spool to collect the multimaterial filament as it is deposited.

20. The method of claim 14, further comprising impinging ultraviolet (UV) light on the multimaterial filament as it is extruded from the nozzle body.

* * * * *